(12) United States Patent
Deng et al.

(10) Patent No.: US 11,758,143 B2
(45) Date of Patent: Sep. 12, 2023

(54) MOTION VECTOR HANDLING IN GEOMETRY PARTITION MODE

(71) Applicants: Beijing Bytedance Network Technology Co., Ltd., Beijing (CN); Bytedance Inc., Los Angeles, CA (US)

(72) Inventors: Zhipin Deng, Beijing (CN); Li Zhang, San Diego, CA (US); Hongbin Liu, Beijing (CN); Kai Zhang, San Diego, CA (US); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/717,515

(22) Filed: Apr. 11, 2022

(65) Prior Publication Data

US 2022/0256166 A1 Aug. 11, 2022

Related U.S. Application Data

(63) Continuation of application No. PCT/CN2020/120113, filed on Oct. 10, 2020.

(30) Foreign Application Priority Data

Oct. 10, 2019 (WO) ................ PCT/CN2019/110490

(51) Int. Cl.
*H04N 19/186* (2014.01)
*H04N 19/70* (2014.01)
(Continued)

(52) U.S. Cl.
CPC ......... *H04N 19/137* (2014.11); *H04N 19/117* (2014.11); *H04N 19/132* (2014.11);
(Continued)

(58) Field of Classification Search
CPC .. H04N 19/137; H04N 19/117; H04N 19/132; H04N 19/159; H04N 19/176; H04N 19/186; H04N 19/70; H04N 19/80
(Continued)

(56) References Cited

U.S. PATENT DOCUMENTS

| 8,442,109 B2 | 5/2013 | Wang et al. |
| 9,271,006 B2 | 2/2016 | Huang et al. |

(Continued)

FOREIGN PATENT DOCUMENTS

| CN | 102547290 A | 7/2012 |
| CN | 102714735 A | 10/2012 |

(Continued)

OTHER PUBLICATIONS

Blaser et al. "Description of SDR and 360° Video Coding Technology Proposal by RWTH Aachen University," Joint Video Experts Team (JVET) of ITU-T SG 16 WP 3 and ISO/IEC JTC 1/SC 29/WG 11 10th Meeting: San Diego, US, Apr. 10-20, 2018, document JVET-J0023, 2018.

(Continued)

*Primary Examiner* — Albert Kir
(74) *Attorney, Agent, or Firm* — Perkins Coie LLP

(57) ABSTRACT

A method of video processing is described. The method includes performing a conversion between a current video block of a video and a bitstream representation of the video, wherein, during the conversion, a prediction of the current video block is determined as a weighted sum of two or more predictions of the current video block, and a motion vector storing process for the current video block is determined according to a rule, wherein the current video block uses a partitioning prediction mode that is a first mode which is based on multiple first partitioning schemes or a second mode which is based on multiple second partitioning (Continued)

schemes, and wherein the rule specifies that a process used for determining which motion vector and how many motion vectors are stored is same for the first mode or the second mode.

17 Claims, 23 Drawing Sheets

(51) Int. Cl.
    *H04N 19/137*     (2014.01)
    *H04N 19/117*     (2014.01)
    *H04N 19/132*     (2014.01)
    *H04N 19/159*     (2014.01)
    *H04N 19/176*     (2014.01)
    *H04N 19/80*     (2014.01)

(52) U.S. Cl.
    CPC ......... *H04N 19/159* (2014.11); *H04N 19/176* (2014.11); *H04N 19/186* (2014.11); *H04N 19/70* (2014.11); *H04N 19/80* (2014.11)

(58) Field of Classification Search
    USPC .................................................. 375/240.16
    See application file for complete search history.

(56) References Cited

U.S. PATENT DOCUMENTS

| | | | |
|---|---|---|---|
| 9,609,343 | B1 | 3/2017 | Chen et al. |
| 10,462,439 | B2 | 10/2019 | He et al. |
| 11,606,570 | B2 * | 3/2023 | Deng ............... H04N 19/70 |
| 2012/0087412 | A1 | 4/2012 | Chuang |
| 2012/0147961 | A1 | 6/2012 | Guo et al. |
| 2013/0170562 | A1 | 7/2013 | Van Der Auwera et al. |
| 2013/0195190 | A1 | 8/2013 | Lee et al. |
| 2014/0307780 | A1 | 10/2014 | Cohen et al. |
| 2015/0195573 | A1 | 7/2015 | Aflaki Beni et al. |
| 2017/0238020 | A1 | 8/2017 | Karczewicz et al. |
| 2018/0041778 | A1 | 2/2018 | Zhang et al. |
| 2018/0041779 | A1 | 2/2018 | Zhang et al. |
| 2019/0104303 | A1 | 4/2019 | Xiu et al. |
| 2019/0166382 | A1 | 5/2019 | He et al. |
| 2019/0200023 | A1 | 6/2019 | Hanhart et al. |
| 2019/0215532 | A1 | 7/2019 | He et al. |
| 2020/0296389 | A1 | 9/2020 | Wang et al. |
| 2021/0006787 | A1 | 1/2021 | Zhang et al. |
| 2021/0006788 | A1 | 1/2021 | Zhang et al. |
| 2021/0051324 | A1 | 2/2021 | Zhang et al. |
| 2021/0092379 | A1 | 3/2021 | Zhang et al. |
| 2021/0092392 | A1 * | 3/2021 | Reuze ............... H04N 19/176 |
| 2021/0112281 | A1 | 4/2021 | Wang |
| 2021/0136413 | A1 | 5/2021 | He et al. |
| 2021/0152846 | A1 | 5/2021 | Zhang et al. |
| 2021/0201539 | A1 | 7/2021 | Wang et al. |
| 2021/0203989 | A1 | 7/2021 | Wang et al. |
| 2021/0227206 | A1 * | 7/2021 | Chiu ............... H04N 19/105 |
| 2021/0227247 | A1 * | 7/2021 | Blaeser ............... H04N 19/52 |
| 2021/0250602 | A1 | 8/2021 | Zhang et al. |
| 2021/0258575 | A1 | 8/2021 | Zhang et al. |
| 2021/0266562 | A1 | 8/2021 | Zhang et al. |
| 2021/0314569 | A1 * | 10/2021 | Ahn ............... H04N 19/96 |
| 2021/0385451 | A1 | 12/2021 | Zhang et al. |
| 2022/0007053 | A1 | 1/2022 | Hanhart et al. |
| 2022/0210460 | A1 | 6/2022 | Deng et al. |
| 2022/0224897 | A1 * | 7/2022 | Zhang ............... H04N 19/119 |
| 2022/0224923 | A1 * | 7/2022 | Filippov ............... H04N 19/196 |
| 2023/0103542 | A1 * | 4/2023 | Jhu ............... H04N 19/577 375/240.16 |

FOREIGN PATENT DOCUMENTS

| | | | | |
|---|---|---|---|---|
| CN | 102884794 | A | 1/2013 | |
| CN | 105580364 | A | 5/2016 | |
| CN | 105934948 | A | 9/2016 | |
| CN | 106028048 | A | 10/2016 | |
| CN | 106105227 | A * | 11/2016 | ........... H04N 19/119 |
| CN | 109327703 | A | 2/2019 | |
| CN | 109716771 | A | 5/2019 | |
| CN | 109819255 | A | 5/2019 | |
| CN | 110312127 | A | 10/2019 | |
| EP | 2747426 | A2 | 6/2014 | |
| EP | 3935844 | A1 | 1/2022 | |
| EP | 3939273 | A1 | 1/2022 | |
| EP | 4020987 | A1 * | 6/2022 | |
| WO | 2011130186 | A2 | 10/2011 | |
| WO | 2013068562 | A1 | 5/2013 | |
| WO | 2014014276 | A1 | 1/2014 | |
| WO | 2018141416 | A1 | 8/2018 | |
| WO | 2019039323 | A1 | 2/2019 | |
| WO | 2019147910 | A1 | 8/2019 | |
| WO | 2019154936 | A1 | 8/2019 | |
| WO | 2019177429 | A1 | 9/2019 | |
| WO | 2019190181 | A1 | 10/2019 | |
| WO | 2020190468 | A1 | 9/2020 | |
| WO | WO-2020180155 | A1 * | 9/2020 | ........... H04N 19/107 |
| WO | 2020253830 | A1 | 12/2020 | |
| WO | WO-2020256377 | A1 * | 12/2020 | ........... H04N 19/119 |

OTHER PUBLICATIONS

Bross et al. "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O2001, 2019.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al. "Algorithm Description for Versatile Video Coding and Test Model 5 (VTM 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1002, 2019.
Deng et al. "Non-CE4: Alignment of Luma and Chroma Weights Calculation for TPM Blending," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0530, 2019.
Esenlik et al. "Non-CE4: Geometrical Partitioning for Inter Blocks," Joint Video Experts Team (JVET )of ITU-T SG 16 WP 3 and ISO/IEC JTC 1/SC 29/WG 1115th Meeting: Gothenburg, SE, Jul. 3-12, 2019, document JVET-00489, 2019.
Esenlik et al. "Non-CE4: Adaptive Blending Filtering for TPM," Joint Video Experts Team (JVET) of ITU-T SG 16 WP 3 and ISO/IEC JTC 1/SC 29/WG 11 15th Meeting: Gothenburg, SE, Jul. 3-12, 2019. document JVET-O0513, 2019.
Gao et al. "CE4: CE4-1.1, CE4-1.2 and CE4-1.14: Geometric Merge Mode (GEO)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0068, 2019.
"Information Technology—High Efficiency Coding and Media Delivery in Heterogeneous Environments—Part 2: High Efficiency Video Coding" Apr. 20, 2018, ISO/DIS 23008, 4th Edition.
Liao et al. "CE10.3.1.b: Triangular Prediction Unit Mode," Joint Video Exploration Team (JVET) of ITU-T SG 16 WP 3 and ISO/IEC JTC 1/SC 29/WG 11 12th Meeting: Macao, CN, Oct. 3-12, 2018, document JVET-L0124, 2018.
Lin, Po-Han. "Non-CE4: Modification of MV Storage in Triangle Merge Mode," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0314, 2019.
Meng et al. "CE4-Related: Simplification of Motion Vector Storage Operation for Triangle Merge Mode," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0418, 2019.

(56) References Cited

OTHER PUBLICATIONS

Naser et al. "Non-CE6 / Non-CE3: On ISP and Maximum Transform Size," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0699, 2019.

Park et al. "CE10-Related: Simplification of Triangular Partitions," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0352, 2019.

Reuze et al. "Non-CE4: Simplification of Bi-Prediction MV Generation for Triangle Partition Mode Storage," Joint Video Experts Team (JVET) of ITU-T SG 16 WP 3 and ISO/IEC JTC 1/SC 29/WG 1115th Meeting: Gothenburg, SE, Jul. 3-12, 2019. document JVET-O0411, 2019.

Zhang et al. "Non-CE4: Simplified Motion Field Storage for TPM," Joint Video Experts Team (JVET) of ITU-T SG 16 WP 3 and ISO/IEC JTC 1/SC 29/WG 11 15th Meeting: Gothenburg, SE, Jul. 3-12, 2019. document JVET-O0265, 2019.

Zhu et al. "Non-CE8: Disabling TPM Blending," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-O0563, 2019.

VTM software: https://vcgit.hhi.fraunhofer.de/jvet/VVCSoftware_VTM.git.

International Search Report and Written Opinion from International Patent Application No. PCT/CN2020/112779 dated Dec. 2, 2020 (12 pages).

International Search Report and Written Opinion from International Patent Application No. PCT/CN2020/112780 dated Nov. 30, 2020 (9 pages).

International Search Report and Written Opinion from International Patent Application No. PCT/CN2020/120112 dated Jan. 1, 2021 (10 pages).

International Search Report and Written Opinion from International Patent Application No. PCT/CN2020/120113 dated Jan. 4, 2021 (10 pages).

International Search Report and Written Opinion from International Patent Application No. PCT/CN2020/120114 dated Dec. 30, 2020 (9 pages).

International Search Report and Written Opinion from International Patent Application No. PCT/CN2020/120115 dated Jan. 12, 2021 (12 pages).

Non Final Office Action from U.S. Appl. No. 17/682,751 dated Jun. 24, 2022.

Deng et al. "CE4-1.14 Related: Block Size Limitation of Enabling TPM and GEO," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0663, 2019.

Sun et al. "CE4-related: On Simplification for GEO Weight Derivation," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0250, 2019.

Extended European Search Report from European Patent Application No. 20856664.6 dated Aug. 23, 2022 (12 pages).

Chen et al. "Description of Core Experiment 4 (CE4): Inter Prediction," Joint Video Experts Team (JVET) of ITU-T SG 16 WP 3 and ISO/IEC JTC 1/SC 29/WG 11 15th Meeting, Gothenburg, SE, Jul. 3-12, 2019, document JVET-O2024, p. 8, 2019. (cited in CN202080071369.5 OA1 mailed Mar. 17, 2023).

* cited by examiner

MOTION VECTOR HANDLING IN GEOMETRY PARTITION MODE

CROSS REFERENCE TO RELATED APPLICATIONS

This application is a continuation of International Patent Application No. PCT/CN2020/120113, filed on Oct. 10, 2020, which claims the priority to and benefits of International Patent Application No. PCT/CN2019/110490, filed on Oct. 10, 2019. All the aforementioned patent applications are hereby incorporated by reference in their entireties.

TECHNICAL FIELD

This patent document relates to video coding and decoding.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to video and image coding and decoding in which inter prediction is used with triangular or arbitrary geometry partitions of video blocks.

In one example aspect, a method of video processing is disclosed. The method includes performing a conversion between a current video block of a video and a bitstream representation of the video according to a rule, wherein a partitioning prediction mode is used for coding the current video block in which a final prediction is determined for the current video block as a weighted sum of two or more predictions of the current video block; wherein the partitioning prediction mode is a first mode which is based on multiple first partitioning schemes or a second mode which is based on multiple second partitioning schemes; and wherein the rule specifies a coding operation that is used for coding using the first mode or the second mode.

In another example aspect, another method of video processing is disclosed. The method includes performing a conversion between a current video block of a video and a bitstream representation of the video, wherein, during the conversion, a prediction of the current video block is determined as a weighted sum of two or more predictions of the current video block, and a motion vector storing process for the current video block is determined according to a rule, wherein the current video block uses a partitioning prediction mode that is a first mode which is based on multiple first partitioning schemes or a second mode which is based on multiple second partitioning schemes, and wherein the rule specifies that a process used for determining which motion vector and how many motion vectors are stored is same for the first mode or the second mode.

In one example aspect, a method of video processing is disclosed. The method includes performing a conversion between a current block of a video and a bitstream representation of the video, wherein, during the conversion, a prediction block for the current block is determined using motion information in a 4×4 unit, and wherein the current block is coded with a partitioning mode.

In one example aspect, a method of video processing is disclosed. The method includes performing a conversion between a current block of a video and a bitstream representation of the video, wherein the current block is coded using a partitioning mode, wherein, during the conversion, a prediction block for the current block is determined by blending two or more predictions in a blending area of the current video block according to a rule, and wherein the rule specifies that an L0 motion vector and an L1 motion vector are stored for sub-blocks that belong to the blending area of the current video block.

In one example aspect, a method of video processing is disclosed. The method includes making a determination, for a conversion between a current video block of a video and a bitstream representation of the video, to apply a deblocking process to a boundary inside the current video block according to a rule due to use of a partitioning prediction mode of the current video block; and performing the conversion according to the determination, wherein use the partitioning prediction mode includes determining a final prediction for the current video block as a weighted sum of two or more predictions of the current video block.

In one example aspect, a method of video processing is disclosed. The method includes determining, for a conversion between a current video block of a video and a bitstream representation of the video, whether to and/or how to apply a deblocking process to the current video block based on a type of a partitioning prediction mode of the current video block; and performing the conversion according to the determining, and wherein use of the partitioning prediction mode includes determining a final prediction for the current video block as a weighted sum of two or more predictions of the current video block.

In one example aspect, a method of video processing is disclosed. The method includes determining, for a conversion between a current video block of a video and a bitstream representation of the video, an applicability of an intra sub-partition (ISP) mode according to a rule that is independent of a maximum and/or minimum transform size for the current video block; and performing the conversion based on the determining.

In one example aspect, a method of video processing is disclosed. The method includes determining, for a conversion between a current video block of a video and a bitstream representation of the video, to apply an intra sub-partition (ISP) mode due to a size of the current video block being greater than a maximum transform size applicable to the current video block; and performing the conversion based on the determining.

In one example aspect, a method of video processing is disclosed. The method includes determining, for a conversion between a current video block of a video and a bitstream representation of the video, to apply a combined inter and intra prediction (CIIP) mode or a partitioning mode to the current video block due to a size of the current video block being greater than or equal to 128; and performing the conversion based on the determining.

In one example aspect, a method of video processing is disclosed. The method includes performing a conversion between a current video block and a bitstream representation of the video, wherein the bitstream representation conforms to a format rule that specifies information included in the bitstream representation based on a size of the current video block.

In one example aspect, a method of video processing is disclosed. The method includes performing a conversion between a current video block and a bitstream representation of the video, wherein the bitstream representation conforms to a format rule that specifies that a syntax element indicating use of an intra block copy (IBC) prediction mode is omitted from the bitstream representation in case that a width and/or height of the current video block is equal to or greater than X, whereby X is an integer.

In one example aspect, a method of video processing is disclosed. The method includes determining, for a conversion between a video comprising multiple color components and a bitstream representation of the video, deblocking parameter offsets used in a deblocking process for each component according to a rule; and performing the conversion based on the determining wherein the rule specifies that the deblocking parameter offsets at a picture level and/or a slice level are different for each component of the video.

In one example aspect, a method of video processing is disclosed. The method includes deriving, for a conversion between a chroma video block of a video and a bitstream representation of the video, chroma deblocking parameters based on a chroma quantization parameter (QP) that is determined according to a rule, wherein the chroma video block belongs to a coding unit and a slice; and performing the conversion based on the chroma deblocking parameters, and wherein the rule specifies that the chroma QP is based on a picture level chroma QP offset of the chroma video block and a coding unit level chroma QP offset but independent of a slice level chroma QP offset.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Embodiments of the disclosed technology may be applied to existing video coding standards (e.g., HEVC, H.265) and future standards to improve compression performance. Section headings are used in the present document to improve readability of the description and do not in any way limit the discussion or the embodiments (and/or implementations) to the respective sections only.

1. SUMMARY

This document is related to video coding technologies. Specifically, it is about inter prediction and related techniques in video coding. It may be applied to the existing video coding standard like HEVC, or the standard (Versatile Video Coding) to be finalized. It may be also applicable to future video coding standards or video codec.

2. INITIAL DISCUSSION

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

2.1. Extended Merge Prediction

In VTM, the merge candidate list is constructed by including the following five types of candidates in order:
1) Spatial MVP from spatial neighbour CUs
2) Temporal MVP from collocated CUs
3) History-based MVP from an FIFO table
4) Pairwise average MVP
5) Zero MVs.

The size of merge list is signalled in slice header and the maximum allowed size of merge list is 6 in VTM. For each CU code in merge mode, an index of best merge candidate is encoded using truncated unary binarization (TU). The first bin of the merge index is coded with context and bypass coding is used for other bins.

The generation process of each category of merge candidates is provided in this session.

2.1.1. Spatial Candidates Derivation

Figure 1:
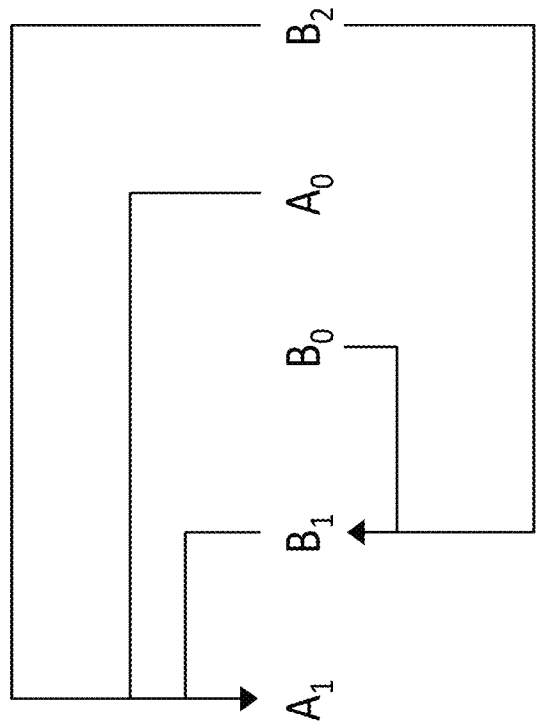
FIG. 1 shows example positions of spatial merge candidates.
Figure 2:
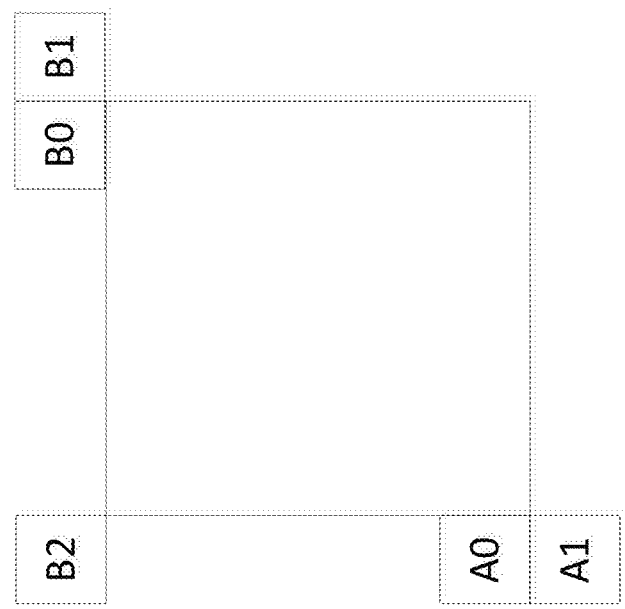
FIG. 2 shows examples of candidate pairs considered for redundancy check of spatial merge candidates.

The derivation of spatial merge candidates in VVC is same to that in HEVC. A maximum of four merge candidates are selected among candidates located in the positions depicted in FIG. 1. The order of derivation is $A_0$, $B_0$, $B_1$, $A_1$ and $B_2$. Position $B_2$ is considered only when any CU of position $A_0$, $B_0$, $B_1$, $A_1$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 2 are considered and a candidate is only added to the list if the corresponding candidate used for redundancy check has not the same motion information.

2.1.2. Temporal Candidates Derivation

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signaled in the slice header. The scaled motion vector for temporal merge candidate is obtained as illustrated by the dotted line in FIG. 3, which is scaled from the motion vector of the co-located CU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 4:
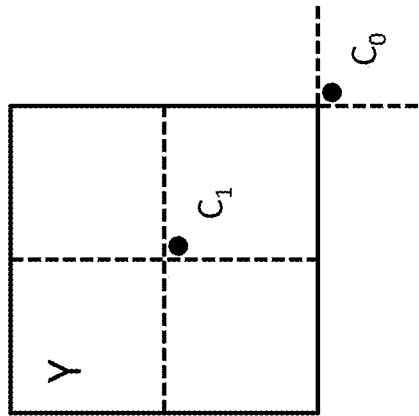
FIG. 4 shows examples of candidate positions for temporal merge candidate, C0 and C1.
Figure 3:
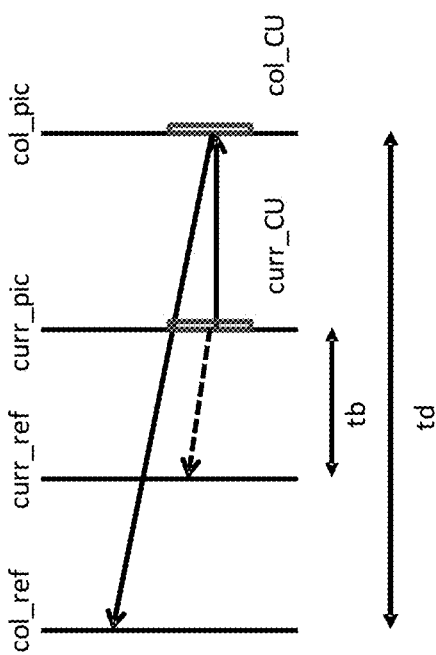
FIG. 3 is an illustration of motion vector scaling for temporal merge candidate.

FIG. 3 is an illustration of motion vector scaling for temporal merge candidate The position for the temporal candidate is selected between candidates C0 and C1, as depicted in FIG. 4. If CU at position C0 is not available, is intra coded, or is outside of the current row of CTUs, position C1 is used. Otherwise, position C0 is used in the derivation of the temporal merge candidate.

FIG. 4 shows examples of candidate positions for temporal merge candidate, C0 and C1.

2.1.3. History-Based Merge Candidates Derivation

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

In VTM the HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:
1. Number of HMPV candidates is used for merge list generation is set as (N<=4)?M:(8−N), wherein N indicates number of existing candidates in the merge list and M indicates number of available HMVP candidates in the table.
2. Once the total number of available merge candidates reaches the maximally allowed merge candidates minus 1, the merge candidate list construction process from HMVP is terminated.

2.1.4. Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

2.2. Triangle Partition for Inter Prediction

In VTM, a triangle partition mode (TPM) is supported for inter prediction. The triangle partition mode is only applied to CUs that are 64 samples or larger and are coded in skip or merge mode but not in a regular merge mode, or MMVD mode, or CIIP mode or subblock merge mode. A CU-level flag is used to indicate whether the triangle partition mode is applied or not.

Figure 5:
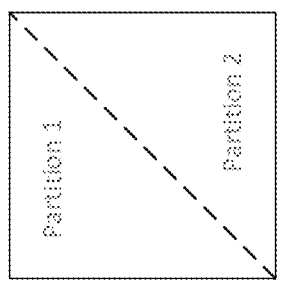
FIG. 5 shows an example of a triangle partition based inter prediction.
Figure 5:
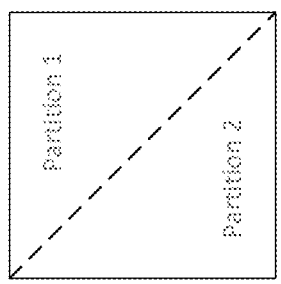

When this mode is used, a CU is split evenly into two triangle-shaped partitions, using either the diagonal split or the anti-diagonal split (FIG. 5). Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU. The uni-prediction motion for each partition is derived directly the merge candidate list constructed for extended merge prediction in 2.1, and the selection of a uni-prediction motion from a given merge candidate in the list is according to the procedure in 2.2.1.

FIG. 5 shows an example of a triangle partition based inter prediction.

If triangle partition mode is used for a current CU, then a flag indicating the direction of the triangle partition (diagonal or anti-diagonal), and two merge indices (one for each partition) are further signalled. After predicting each of the triangle partitions, the sample values along the diagonal or anti-diagonal edge are adjusted using a blending processing with adaptive weights. This is the prediction signal for the whole CU and transform and quantization process will be applied to the whole CU as in other prediction modes. Finally, the motion field of a CU predicted using the triangle partition mode is stored in 4×4 units as in 2.2.3.

2.2.1. Uni-Prediction Candidate List Construction

Figure 6:
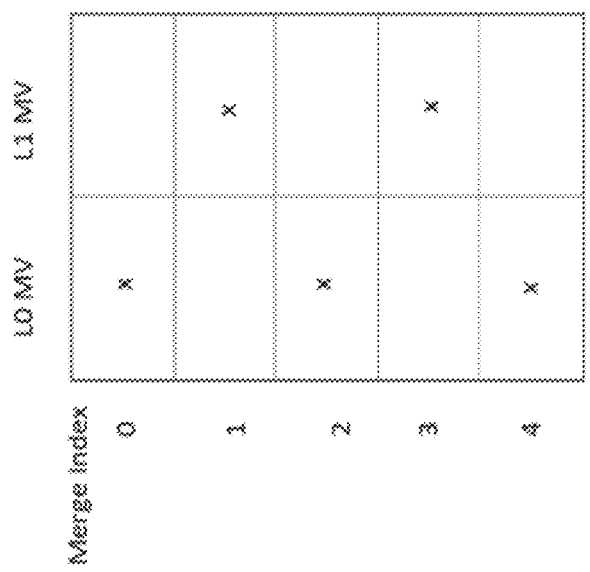
FIG. 6 shows an example of uni-prediction MV selection for triangle partition mode.

Given a merge candidate index, the uni-prediction motion vector is derived from the merge candidate list constructed for extended merge prediction using the process in 2.1, as exemplified in FIG. 6. For a candidate in the list, its LX motion vector with X equal to the parity of the merge candidate index value, is used as the uni-prediction motion vector for triangle partition mode. These motion vectors are marked with "x" in FIG. 6. In case a corresponding LX motion vector does not exist, the L(1−X) motion vector of the same candidate in the extended merge prediction candidate list is used as the uni-prediction motion vector for triangle partition mode.

2.2.2. Blending Along the Triangle Partition Edge

Figure 7:
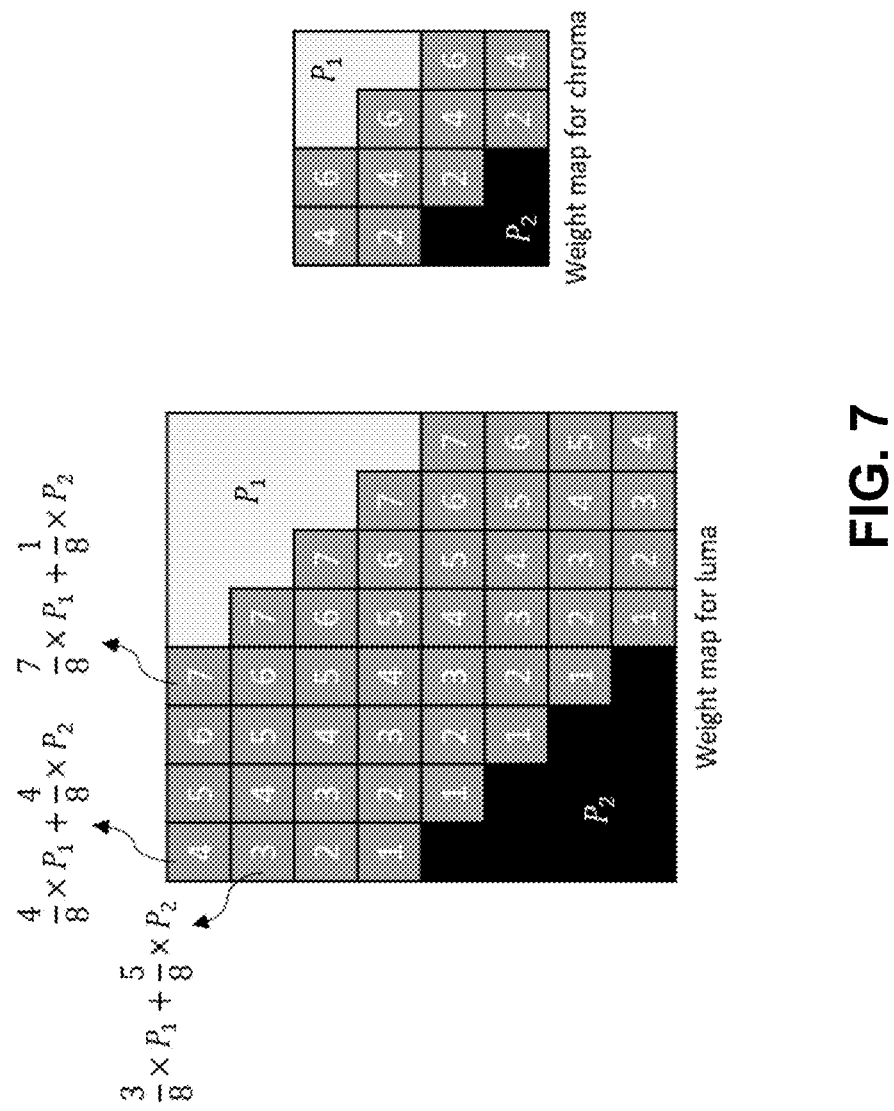
FIG. 7 shows examples of weights used in a blending process.

After predicting each triangle partition using its own motion, blending is applied to the two prediction signals to derive samples around the diagonal or anti-diagonal edge. The following weights are used in the blending process:

7/8, 6/8, 5/8, 4/8, 3/8, 2/8, 1/8} for luma and {6/8, 4/8, 2/8} for chroma, as shown in FIG. 7.

FIG. 7 shows an example of weights used in the blending process.

2.2.3. Motion Field Storage

The motion vectors of a CU coded in triangle partition mode are stored in 4×4 units. Depending on the position of each 4×4 unit, either uni-prediction or bi-prediction motion vectors are stored. Denote Mv1 and Mv2 as uni-prediction motion vectors for partition 1 and partition 2, respectively. If a 4×4 unit is located in the non-weighted area shown in the example of FIG. 7, either Mv1 or Mv2 is stored for that 4×4 unit. Otherwise, if the 4×4 unit is located in the weighted area, a bi-prediction motion vector is stored. The bi-prediction motion vector is derived from Mv1 and Mv2 according to the following process:

1) If Mv1 and Mv2 are from different reference picture lists (one from L0 and the other from L1), then Mv1 and Mv2 are simply combined to form the bi-prediction motion vector.
2) Otherwise, if Mv1 and Mv2 are from the same list, and without loss of generality, assume they are both from L0. In this case,
   2.a) If the reference picture of either Mv2 (or Mv1) appears in L1, then that Mv2 (or Mv1) is converted to a L1 motion vector using that reference picture in L1. Then the two motion vectors are combined to form the bi-prediction motion vector;

Otherwise, instead of bi-prediction motion, only uni-prediction motion Mv1 is stored.

2.3. Specification of Triangle Partition in VVC WD6

The following specification of deblocking filtering process is extracted from the latest VVC working draft JVET-O2001-vE.

2.3.1. Merge Data Syntax

|  | Descriptor |
|---|---|
| merge_data( x0, y0, cbWidth, cbHeight, chType ) { |  |
|   if ( CuPredMode [ chType ][ x0 ][ y0 ] == MODE_IBC ) { |  |
|     if( MaxNumIbcMergeCand>1 ) |  |
|       merge_idx[ x0 ][ y0 ] | ae(v) |
|   } else { |  |
|     if( MaxNumSubblockMergeCand>0 && cbWidth>=8 && cbHeight>=8 ) |  |
|       merge_subblock_flag[ x0 ][ y0 ] | ae(v) |
|     if( merge_subblock_flag[ x0 ][ y0 ] == 1) { |  |
|       if( MaxNumSubblockMergeCand>1 ) |  |
|         merge_subblock_idx[ x0 ][ y0 ] | ae(v) |
|     } else { |  |
|       if( ( cbWidth * cbHeight )>=64 && ( (sps_ciip_enabled_flag && |  |
|         cu_skip_flag[ x0 ][ y0 ]==0 && cbWidth<128 && cbHeight<128)|| |  |
|         ( sps_triangle_enabled_flag && MaxNumTriangleMergeCand>1 && |  |
|         slice_type==B ) ) ) |  |
|         regular_merg_flag[ x0][ y0 ] | ae(v) |
|       if ( regular_merge_flag[ x0 ][ y0 ]==1 ){ |  |
|         if( sps_mmvd_enabled_flag) |  |
|           mmvd_merge_flag[ x0 ][ y0 ] | ae(v) |
|         if( mmvd_merge_flag[ x0 ][ y0 ]==1 ) { |  |
|           if( MaxNumMergeCand>1 ) |  |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |

|  | Descriptor |
|---|---|
| ``        } else {``<br>``          if( MaxNumMergeCand>1 )``<br>``            merge_idx[ x0 ][ y0 ]``<br>``        }``<br>``      } else {``<br>``        if( sps_ciip_enabled_flag && sps_triangle_enabled_flag &&``<br>``          MaxNumTriangleMergeCand>1 && slice_type==B &&``<br>``          cu_skip_flag[ x0 ][ y0 ] == 0 &&``<br>``          ( cbWidth * cbHeight)>=64 && cbWidth<128 && cbHeight<128 ){``<br>``            ciip_flag[ x0 ][ y0 ]``<br>``          if( ciip_flag[ x0 ][ y0 ] && MaxNumMergeCand>1 )``<br>``            merge_idx[ x0 ][ y0 ]``<br>``          if( !ciip_flag[ x0 ][ y0 ] && MaxNumTriangleMergeCand>1 ) {``<br>``            merge_triangle_split_dir[ x0 ][ y0 ]``<br>``            merge_triangle_idx0[ x0 ][ y0 ]``<br>``            merge_triangle_idx1[ x0 ][ y0 ]``<br>``          }``<br>``        }``<br>``      }``<br>``    }``<br>``  }``<br>``}`` | <br><br>ae(v)<br><br><br><br><br><br><br>ae(v)<br><br>ae(v)<br><br>ae(v)<br>ae(v)<br>ae(v) |

2.3.2. Merge Data Semantics ciip_flag[x0][y0] specifies whether the combined inter-picture merge and intra-picture prediction is applied for the current coding unit. The array indices x0, y0 specify the location (x0, y0) of the top-left luma sample of the considered coding block relative to the top-left luma sample of the picture.

When ciip_flag[x0][y0] is not present, it is inferred as follows:

If all the following conditions are true, ciip_flag[x0][y0] is inferred to be equal to 1:
  sps_ciip_enabled_flag is equal to 1.
  general_merge_flag[x0][y0] is equal to 1.
  merge_subblock_flag[x0][y0] is equal to 0.
  regular_merge_flag[x0][y0] is equal to 0.
  cbWidth is less than 128.
  cbHeight is less than 128.
  cbWidth*cbHeight is greater than or equal to 64.

Otherwise, ciip_flag[x0][y0] is inferred to be equal to 0.
When ciip_flag[x0][y0] is equal to 1, the variable IntraPredModeY[x][y] with x=x0 . . . x0+cbWidth−1 and y=y0 . . . y0+cbHeight−1 is set to be equal to INTRA_PLANAR. The variable MergeTriangleFlag[x0][y0], which specifies whether triangular shape based motion compensation is used to generate the prediction samples of the current coding unit, when decoding a B slice, is derived as follows:

If all the following conditions are true, MergeTriangleFlag[x0][y0] is set equal to 1:
  sps_triangle_enabled_flag is equal to 1.
  slice_type is equal to B.
  general_merge_flag[x0][y0] is equal to 1.
  MaxNumTriangleMergeCand is greater than or equal to 2.
  cbWidth*cbHeight is greater than or equal to 64.
  regular_merge_flag[x0][y0] is equal to 0.
  merge_subblock_flag[x0][y0] is equal to 0.
  ciip_flag[x0][y0] is equal to 0.

Otherwise, MergeTriangleFlag[x0][y0] is set equal to 0.
merge_triangle_split_dir[x0][y0] specifies the splitting direction of merge triangle mode. The array indices x0, y0 specify the location (x0, y0) of the top-left luma sample of the considered coding block relative to the top-left luma sample of the picture.

When merge_triangle_split_dir[x0][y0] is not present, it is inferred to be equal to 0.
merge_triangle_idx0[x0][y0] specifies the first merging candidate index of the triangular shape based motion compensation candidate list where x0, y0 specify the location (x0, y0) of the top-left luma sample of the considered coding block relative to the top-left luma sample of the picture.

When merge_triangle_idx0[x0][y0] is not present, it is inferred to be equal to 0.
merge_triangle_idx1[x0][y0] specifies the second merging candidate index of the triangular shape based motion compensation candidate list where x0, y0 specify the location (x0, y0) of the top-left luma sample of the considered coding block relative to the top-left luma sample of the picture.

When merge_triangle_idx1[x0][y0] is not present, it is inferred to be equal to 0.

2.3.3. Derivation Process for Triangle Motion Vector Components and Reference Indices

2.3.3.1. General

Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.

Outputs of this process are:
  the luma motion vectors in 1/16 fractional-sample accuracy mvA and mvB,
  the chroma motion vectors in 1/32 fractional-sample accuracy mvCA and mvCB,
  the reference indices refIdxA and refIdxB,
  the prediction list flags predListFlagA and predListFlagB.

The derivation process for luma motion vectors for triangle merge mode as specified in clause 2.3.3.2 is invoked with the luma location (xCb, yCb), the variables cbWidth and cbHeight as inputs, and the output being the luma motion vectors mvA, mvB, the reference indices refIdxA, refIdxB and the prediction list flags predListFlagA and predListFlagB.

The derivation process for chroma motion vectors in clause 2.3.3.3 is invoked with mvA and refIdxA as input, and the output being mvCA.

The derivation process for chroma motion vectors in clause 2.3.33 is invoked with mvB and refIdxB as input, and the output being mvCB.

2.3.3.2. Derivation Process for Luma Motion Vectors for Merge Triangle Mode

This process is only invoked when MergeTriangleFlag[xCb][yCb] is equal to 1, where (xCb, yCb) specify the top-left sample of the current luma coding block relative to the top-left luma sample of the current picture.

Inputs to this process are:
  a luma location (xCb, yCb) of the top-left sample of the current luma coding block relative to the top-left luma sample of the current picture,
  a variable cbWidth specifying the width of the current coding block in luma samples,
  a variable cbHeight specifying the height of the current coding block in luma samples.

Outputs of this process are:
  the luma motion vectors in 1/16 fractional-sample accuracy mvA and mvB,
  the reference indices refIdxA and refIdxB,
  the prediction list flags predListFlagA and predListFlagB.

The motion vectors mvA and mvB, the reference indices refIdxA and refIdxB and the prediction list flags predListFlagA and predListFlagB are derived by the following ordered steps:

The derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], the bi-prediction weight index bcwIdx and the merging candidate list mergeCandList.

The variables m and n, being the merge index for triangle partition 0 and 1 respectively, are derived using merge_triangle_idx0[xCb][yCb] and merge_triangle_idx1[xCb][yCb] as follows:

$$m = merge\_triangle\_idx0[xCb][yCb] \quad (8\text{-}475)$$

$$n = merge\_triangle\_idx1[xCb][yCb] + (merge\_triangle\_idx1[xCb][yCb] >= m) ? 1:0 \quad (8\text{-}476)$$

Let refIdxL0M and refIdxL1M, predFlagL0M and predFlagL1M, and mvL0M and mvL1M be the reference indices, the prediction list utilization flags and the motion vectors of the merging candidate M at position m in the merging candidate list mergeCandList (M=mergeCandList[m]).

The variable X is set equal to (m & 0x01).
When predFlagLXM is equal to 0, X is set equal to (1−X).
The following applies:

$$mvA[0] = mvLXM[0] \quad (8\text{-}477)$$

$$mvA[1] = mvLXM[1] \quad (8\text{-}478)$$

$$refIdxA = refIdxLXM \quad (8\text{-}479)$$

$$predListFlagA = X \quad (8\text{-}480)$$

Let refIdxL0N and refIdxL1N, predFlagL0N and predFlagL1N, and mvL0N and mvL1N be the reference indices, the prediction list utilization flags and the motion vectors of the merging candidate N at position m in the merging candidate list mergeCandList (N=mergeCandList[n]).

The variable X is set equal to (n & 0x01).
When predFlagLXN is equal to 0, X is set equal to (1−X).

The following applies:

$$mvB[0] = mvLXN[0] \quad (8\text{-}481)$$

$$mvB[1] = mvLXN[1] \quad (8\text{-}482)$$

$$refIdxB = refIdxLXN \quad (8\text{-}483)$$

$$predListFlagB = X \quad (8\text{-}484)$$

2.3.3.3. Derivation Process for Chroma Motion Vectors

Input to this process are:
  a luma motion vector in 1/16 fractional-sample accuracy mvLX,
  the reference index refIdxLX.

Output of this process is a chroma motion vector in 1/32 fractional-sample accuracy mvCLX.

A chroma motion vector is derived from the corresponding luma motion vector.

The chroma motion vector mvCLX, is derived as follows:

$$mvCLX[0] = mvLX[0]*2/SubWidthC \quad (8\text{-}435)$$

$$mvCLX[1] = mvLX[1]*2/SubHeightC \quad (8\text{-}436)$$

2.3.4. Decoding Process for Triangle Inter Blocks 2.3.4.1. General

This process is invoked when decoding a coding unit with MergeTriangleFlag[xCb][yCb] equal to 1.

Inputs to this process are:
  a luma location (xCb, yCb) specifying the top-left sample of the current coding block relative to the top-left luma sample of the current picture,
  a variable cbWidth specifying the width of the current coding block in luma samples,
  a variable cbHeight specifying the height of the current coding block in luma samples,
  the luma motion vectors in 1/16 fractional-sample accuracy mvA and mvB,
  the chroma motion vectors mvCA and mvCB,
  the reference indices refIdxA and refIdxB,
  the prediction list flags predListFlagA and predListFlagB.

Outputs of this process are:
  an (cbWidth)×(cbHeight) array predSamples$_L$ of luma prediction samples,
  an (cbWidth/SubWidthC)×(cbHeight/SubHeightC) array predSamples$_{Cb}$ of chroma prediction samples for the component Cb,
  an (cbWidth/SubWidthC)×(cbHeight/SubHeightC) array predSamples$_{Cr}$ of chroma prediction samples for the component Cr.

Let predSamplesLA$_L$ and predSamplesLB$_L$ be (cbWidth)×(cbHeight) arrays of predicted luma sample values and, predSamplesLA$_{Cb}$, predSamplesLB$_{Cb}$, predSamplesLA$_{Cr}$ and predSamplesLB$_{Cr}$ be (cbWidth/SubWidthC)×(cbHeight/SubHeightC) arrays of predicted chroma sample values.

The predSamples$_L$, predSamples$_{Cb}$ and predSamples$_{Cr}$ are derived by the following ordered steps:

1. For N being each of A and B, the following applies:
   The reference picture consisting of an ordered two-dimensional array refPicLN$_L$ of luma samples and two ordered two-dimensional arrays refPicLN$_{Cb}$ and refPicLN$_{Cr}$ of chroma samples is derived by invoking the process specified in clause 8.5.6.2 in VVC WD6 with X set equal to predListFlagN and refIdxX set equal to refIdxN as input.
   The array predSamplesLN$_L$ is derived by invoking the fractional sample interpolation process specified in clause 8.5.6.3 in VVC WD6 with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array refPicLX$_L$ set equal to refPicLN$_L$, the variable bdofFlag set equal to FALSE, and the variable cIdx is set equal to 0 as inputs.

The array predSamplesLN$_{Cb}$ is derived by invoking the fractional sample interpolation process specified in clause 8.5.6.3 in VVC WD6 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cb}$ set equal to refPicLN$_{Cb}$, the variable bdofFlag set equal to FALSE, and the variable cIdx is set equal to 1 as inputs.

The array predSamplesLN$_{Cr}$ is derived by invoking the fractional sample interpolation process specified in clause 8.5.6.3 in VVC WD6 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cr}$ set equal to refPicLN$_{Cr}$, the variable bdofFlag set equal to FALSE, and the variable cIdx is set equal to 2 as inputs.

2. The partition direction of merge triangle mode variable triangleDir is set equal to merge_triangle_split_dir[xCb][yCb].

3. The prediction samples inside the current luma coding block, predSamples$_L$[x$_L$][y$_L$] with x$_L$=0 ... cbWidth−1 and y$_L$=0 ... cbHeight−1, are derived by invoking the weighted sample prediction process for triangle merge mode specified in clause 2.3.4.2 with the coding block width nCbW set equal to cbWidth, the coding block height nCbH set equal to cbHeight, the sample arrays predSamplesLA$_L$ and predSamplesLB$_L$, and the variables triangleDir, and cIdx equal to 0 as inputs.

4. The prediction samples inside the current chroma component Cb coding block, predSamples$_{Cb}$[x$_C$][y$_C$] with x$_C$=0 ... cbWidth/SubWidthC−1 and y$_C$=0 ... cbHeight/SubHeightC−1, are derived by invoking the weighted sample prediction process for triangle merge mode specified in clause 2.3.4.2 with the coding block width nCbW set equal to cbWidth/SubWidthC, the coding block height nCbH set equal to cbHeight/SubHeightC, the sample arrays predSamplesLA$_{Cb}$ and predSamplesLB$_{Cb}$, and the variables triangleDir, and cIdx equal to 1 as inputs.

5. The prediction samples inside the current chroma component Cr coding block, predSamples$_{Cr}$[x$_C$][y$_C$] with x$_C$=0 ... cbWidth/SubWidthC−1 and y$_C$=0 ... cbHeight/SubHeightC−1, are derived by invoking the weighted sample prediction process for triangle merge mode specified in clause 2.3.4.2 with the coding block width nCbW set equal to cbWidth/SubWidthC, the coding block height nCbH set equal to cbHeight/SubHeightC, the sample arrays predSamplesLA$_{Cr}$ and predSamplesLB$_{Cr}$, and the variables triangleDir, and cIdx equal to 2 as inputs.

6. The motion vector storing process for merge triangle mode specified in clause 2.3.4.3 is invoked with the luma coding block location (xCb, yCb), the luma coding block width cbWidth, the luma coding block height cbHeight, the partition direction triangleDir, the luma motion vectors mvA and mvB, the reference indices refIdxA and refIdxB, and the prediction list flags predListFlagA and predListFlagB as inputs.

2.3.4.2. Weighted Sample Prediction Process for Triangle Merge Mode

Inputs to this process are:
two variables nCbW and nCbH specifying the width and the height of the current coding block,
two (nCbW)×(nCbH) arrays predSamplesLA and predSamplesLB,
a variable triangleDir specifying the partition direction,
a variable cIdx specifying colour component index.

Output of this process is the (nCbW)×(nCbH) array pbSamples of prediction sample values.

The variable nCbR is derived as follows:

$$nCbR=(nCbW>nCbH)?(nCbW/nCbH):(nCbH/nCbW) \quad (8\text{-}841)$$

The variable bitDepth is derived as follows:
If cIdx is equal to 0, bitDepth is set equal to BitDepth$_Y$.
Otherwise, bitDepth is set equal to BitDepth$_C$.
Variables shift1 and offset1 are derived as follows:
The variable shift1 is set equal to Max(5, 17−bitDepth).
The variable offset1 is set equal to 1<<(shift1−1).

Depending on the values of triangleDir, wS and cIdx, the prediction samples pbSamples[x][y] with x=0 ... nCbW−1 and y=0 ... nCbH−1 are derived as follows:

The variable wIdx is derived as follows:
If cIdx is equal to 0 and triangleDir is equal to 0, the following applies:

$$wIdx=(nCbW>nCbH)?(Clip3(0,8,(x/nCbR-y)+4)): (Clip3(0,8,(x-y/nCbR)+4)) \quad (8\text{-}842)$$

Otherwise, if cIdx is equal to 0 and triangleDir is equal to 1, the following applies:

$$wIdx=(nCbW>nCbH)?(Clip3(0,8,(nCbH-1-x/nCbR-y)+4))(Clip3(0,8,(nCbW-1-x-y/nCbR)+4)) \quad (8\text{-}843)$$

Otherwise, if cIdx is greater than 0 and triangleDir is equal to 0, the following applies:

$$wIdx=(nCbW>nCbH)?(Clip3(0,4,(x/nCbR-y)+2)): (Clip3(0,4,(x-y/nCbR)+2)) \quad (8\text{-}844)$$

Otherwise (if cIdx is greater than 0 and triangleDir is equal to 1), the following applies:

$$wIdx=(nCbW>nCbH)?(Clip3(0,4,(nCbH-1-x/nCbR-y)+2))(Clip3(0,4,(nCbW-1-x-y/nCbR)+2)) \quad (8\text{-}845)$$

The variable wValue specifying the weight of the prediction sample is derived using wIdx and cIdx as follows:

$$wValue=(cIdx==0)?Clip3(0,8,wIdx):Clip3(0,8,wIdx*2) \quad (8\text{-}846)$$

The prediction sample values are derived as follows:

$$pbSamples[x][y]=Clip3(0,(1<<bitDepth)-1,(predSamplesLA[x][y]*wValue+predSamplesLB[x][y]*(8-wValue)+offset1)>>shift1) \quad (8\text{-}847)$$

2.3.4.3. Motion Vector Storing Process for Triangle Merge Mode

This process is invoked when decoding a coding unit with MergeTriangleFlag[xCb][yCb] equal to 1.

Inputs to this process are:
a luma location (xCb, yCb) specifying the top-left sample of the current coding block relative to the top-left luma sample of the current picture,
a variable cbWidth specifying the width of the current coding block in luma samples,
a variable cbHeight specifying the height of the current coding block in luma samples, a variable triangleDir specifying the partition direction,
the luma motion vectors in 1/16 fractional-sample accuracy mvA and mvB,
the reference indices refIdxA and refIdxB,
the prediction list flags predListFlagA and predListFlagB.

The variables numSbX and numSbY specifying the number of 4×4 blocks in the current coding block in horizontal and vertical direction are set equal to numSbX=cbWidth>>2 and numSbY=cbHeight>>2.

The variable minSb is set equal to Min(numSbX, numSbY)−1.

The variable cbRatio is derived as follows:

cbRatio=(cbWidth>cbHeight)?(cbWidth/cbHeight):(cbHeight/cbWidth)  (8-848)

For each 4×4 subblock at subblock index (xSbIdx, ySbIdx) with xSbIdx=0 . . . numSbX−1, and ySbIdx=0 . . . numSbY−1, the following applies:

The variables xIdx and yIdx are derived as follows:

xIdx=(cbWidth>cbHeight)?(xSbIdx/cbRatio):xSbIdx  (8-849)

yIdx=(cbWidth>cbHeight)?ySbIdx:(ySbIdx/cbRatio)  (8-850)

The variable sType is derived as follows:

If triangleDir is equal to 0, the following applies:

sType=(xIdx==yIdx)?2:((xIdx>yIdx)?0:1)  (8-851)

Otherwise (triangleDir is equal to 1), the following applies:

sType=(xIdx+yIdx==minSb)?2:((xIdx+yIdx<minSb)?0:1)  (8-852)

Depending on the value of sType, the following assignments are made:

If sType is equal to 0, the following applies:

predFlagL0=(predListFlagA==0)?1:0  (8-853)

predFlagL1=(predListFlagA==0)?0:1  (8-854)

refIdxL0=(predListFlagA==0)?refIdxA:−1  (8-855)

refIdxL1=(predListFlagA==0)?−1:refIdxA  (8-856)

mvL0[0]=(predListFlagA==0)?mvA[0]:0  (8-857)

mvL0[1]=(predListFlagA==0)?mvA[1]:0  (8-858)

mvL1[0]=(predListFlagA==0)?0:mvA[0]  (8-859)

mvL1[1]=(predListFlagA==0)?0:mvA[1]  (8-860)

Otherwise, if sType is equal to 1 or (sType is equal to 2 and predListFlagA+predListFlagB is not equal to 1), the following applies:

predFlagL0=(predListFlagB==0)?1:0  (8-861)

predFlagL1=(predListFlagB==0)?0:1  (8-862)

refIdxL0=(predListFlagB==0)?refIdxB:−1  (8-863)

refIdxL1=(predListFlagB==0)?−1:refIdxB  (8-864)

mvL0[0]=(predListFlagB==0)?mvB[0]:0  (8-865)

mvL0[1]=(predListFlagB==0)?mvB[1]:0  (8-866)

mvL1[0]=(predListFlagB==0)?0:mvB[0]  (8-867)

mvL1[1]=(predListFlagB==0)?0:mvB[1]  (8-868)

Otherwise (sType is equal to 2 and predListFlagA+predListFlagB is equal to 1), the following applies:

predFlagL0=1  (8-869)

predFlagL1=1  (8-870)

refIdxL0=(predListFlagA==0)?refIdxA:refIdxB  (8-871)

refIdxL1=(predListFlagA==0)?refIdxB:refIdxA  (8-872)

mvL0[0]=(predListFlagA==0)?mvA[0]:mvB[0]  (8-873)

mvL0[1]=(predListFlagA==0)?mvA[1]:mvB[1]  (8-874)

mvL1[0]=(predListFlagA==0)?mvB[0]:mvA[0]  (8-875)

mvL1[1]=(predListFlagA==0)?mvB[1]:mvA[1]  (8-876)

The following assignments are made for $x=0.3$ and $y=0.3$:

MvL0[(xSbIdx<<2)+$x$][(ySbIdx<<2)+$y$]=mvL0  (8-877)

MvL1[(xSbIdx<<2)+$x$][(ySbIdx<<2)+$y$]=mvL1  (8-878)

RefIdxL0[(xSbIdx<<2)+$x$][(ySbIdx<<2)+$y$]=refIdxL0  (8-879)

RedIdxL1[(xSbIdx<<2)+$x$][(ySbIdx<<2)+$y$]=refIdxL1  (8-880)

PredFlagL0[(xSbIdx<<2)+$x$][(ySbIdx<<2)+$y$]=predFlagL0  (8-881)

PredFlagL1[(xSbIdx<<2)+$x$][(ySbIdx<<2)+$y$]=predFlagL1  (8-882)

2.4. Geometric Merge Mode (GEO)

In JVET-P0068, GEO merge mode is being studied as an extension of the existing TPM in VVC. GEO uses the same prediction blending concept as TPM but extends the blending masks up to 140 different modes with 32 angles and 5 distance offsets. The blending masks of GEO modes are derived from the distance of the sample position and the split boundary using three look-up tables.

2.4.1. Concept Description

Figure 13A:
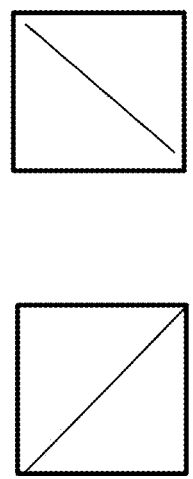
FIG. 13A shows an example of TPM design in VTM6.0.
Figure 13B:
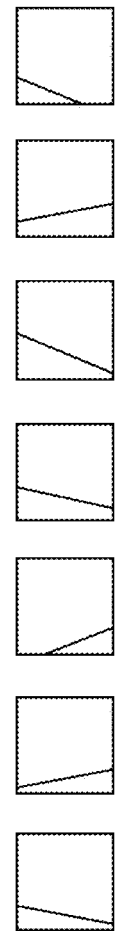
FIG. 13B shows an example of proposal of TPM design.

FIGS. 13A and 13B illustrate TPM in VTM-6.0 and additional shapes proposed for non-rectangular inter blocks.

Similarly to TPM proposed GEO partitioning for inter is allowed for uni-predicted blocks not smaller than 8×8 in order to have the same memory bandwidth with bi-predicted blocks at decoder side. Motion vector prediction for GEO partitioning is aligned with TPM. As well as in TPM blending between 2 predictions is applied on inner boundary.

Figure 14:
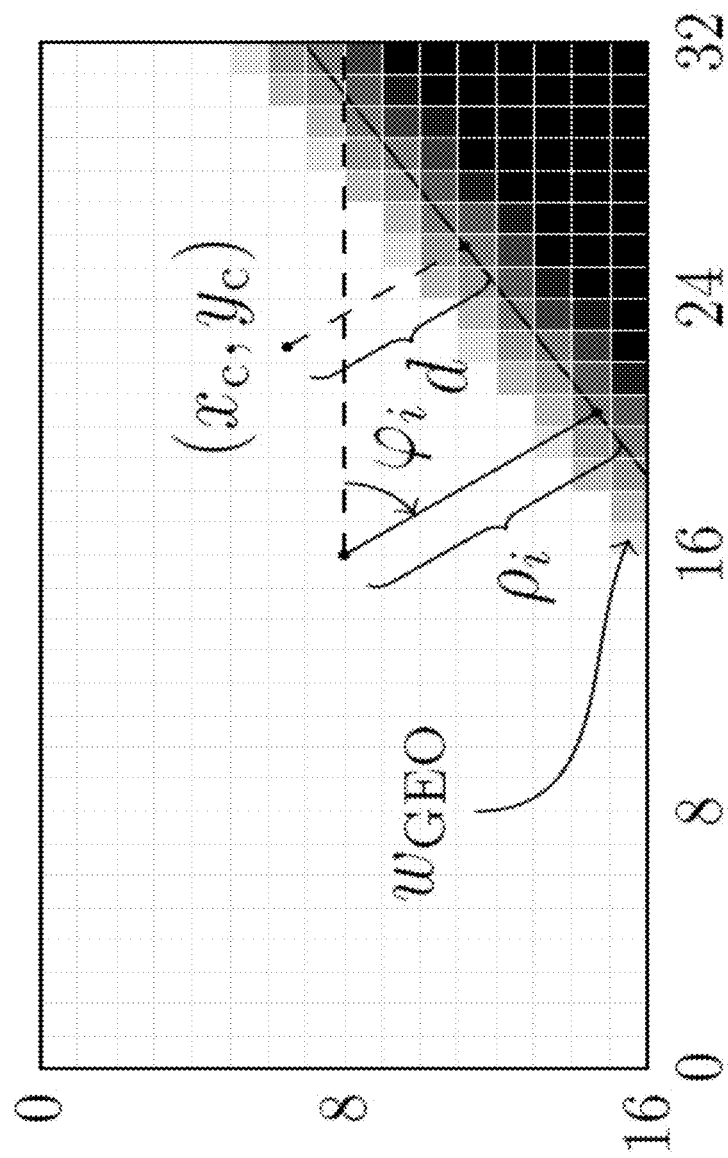
FIG. 14 shows an example of GEO split boundary description.

The split boundary of geometric merge mode is descripted by angle $\varphi_i$ and distance offset $\rho_i$ as shown in FIG. 14. Angle $\varphi_i$ represents a quantized angle between 0 and 360 degrees and distance offset $\rho_i$ represents a quantized offset of the largest distance $\rho_{max}$. In addition, the split directions overlapped with binary tree splits and TPM splits are excluded.

2.4.2. Angle and Distance Quantization.

Angles $\varphi_i$ is quantized between 0 and 360 degrees with a fix step.

Figure 15B:
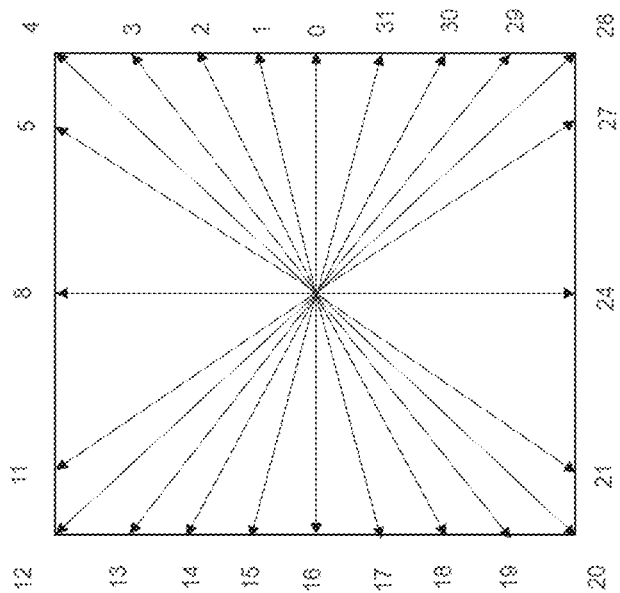
FIG. 15B shows an example for 24 angles scheme of angles quantization of geometric merge mode.
Figure 15A:
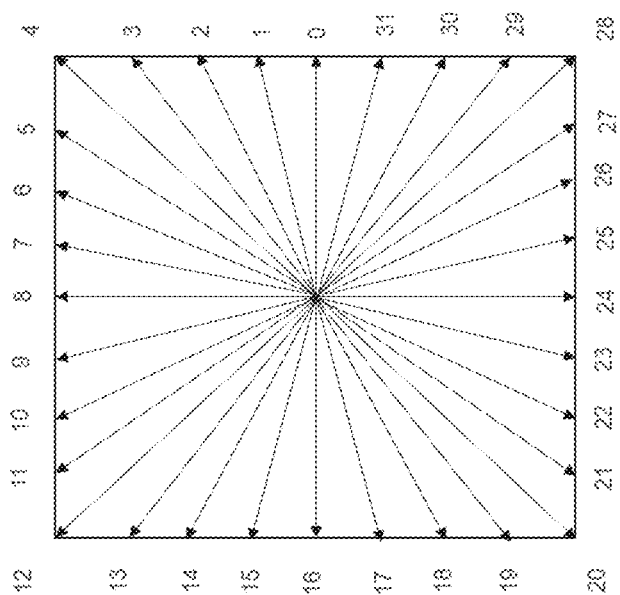
FIG. 15A shows an example for 32 angles scheme of angles quantization of geometric merge mode.

In CE4-1.1, CE4-1.2a with 108 modes and CE4-1.14, the angle $\varphi_i$ is quantized from between 0 and 360 degrees with step 11.25 degree, in total 32 angles as shown in FIG. 15a In CE4-1.2b with 80 modes, the angle $\varphi_i$ is still quantized with 11.25 degrees steps, however the near vertical direction angles (near horizontal split boundaries) are removed since in the nature values, objectives and motions are mostly horizontal. FIG. 15b illustrated the reduced to 24 angles schemes.

Distance $\varphi_i$ is quantized from the largest possible distance $\rho_{max}$ with a fixed step. The value of $\rho_{max}$ can be geometrically derived by Eq. (1) for either w or h is equal to 8 and scaled with log 2 scaled short edge length. For $\varphi$ is equal to 0 degree case, $\rho_{max}$ is equal to w/2 and for $\varphi$ is equal to 90 degree case, $\rho_{max}$ is equal to h/2 and. The shifted back "1.0" samples is to avoid that the split boundary is too close to the corner.

$$\rho_{max}(\varphi, w, h) = \cos(\varphi)\left(\frac{h}{2\tan\left(\frac{\pi}{2} - \varphi\right)} + \frac{w}{2}\right) - 1.0, 0 < \varphi < \frac{\pi}{2} \quad (1)$$

In CE4-1.1 and CE4-1.14, the distance $\varphi_i$ is quantized with 5 steps, considering 32 angles there is in total 140 split modes excludes the binary tree and TPM splits In CE4-1.2a with 108 modes, the distance $\varphi_i$ is quantized with 4 steps, considering 32 angles there is in total 108 split modes excludes the binary tree and TPM splits In CE4-1.2b with 80 modes, the distance $\varphi_i$ is quantized with 4 steps, considering 24 angles there is in total 80 split modes excludes the binary tree and TPM splits.

The number of angles, distances and modes for CE tests are summarized in Table 1:

TABLE 1

| number of angles, number of distances, number of split modes | | | |
|---|---|---|---|
| | CE4-1.1 | CE4-1.2a | CE4-1.2b |
| Number of angles | 32 | 32 | 24 |
| Number of distance | 5 | 4 | 4 |
| Number of split modes | 140 | 108 | 80 |

2.4.3. Blending Operation for Luma Blocks

Same as TPM mode, in geometric merge mode, the final predictor $P_B$ with the 3 bits blending mask $W_0$ and $W_1$ as in Eq. (2)

$$P_B = (W_0 P_0 + W_1 P_1 + 4) >> 3 \quad (2)$$

The blending masks of geometric merge mode are derived from the distance of the sample position and the split boundary using look-up tables with Eq. (3), (4) and (5)

$$distFromLine = ((x << 1) + 1) * Dis[displacementX] + ((y << 1) + 1)) * Dis[displacementY] - rho \quad (3)$$

$$distScaled = Clip3(0, 26, (abs(distFromLine) + 4) >> 3) \quad (4)$$

$$sampleWeightL[x][y] = distFromLine <= 0 ? GeoFilter[distScaled] : 8 - GeoFilter[distScaled] \quad (5)$$

Where 3 look-up tables, Dis[.] with 32 entries, StepDis[.] with 36 entries and GeoFilter[.] with 26 entries are involved.

The bottom-left sample of current block is guaranteed to be predicted from $P_0$. In other words, when the distFromLine of the bottom-left sample is negative, $W_0$ is equal to sampleWeightL[x][y] and Wiis equal to 8−$W_0$. Otherwise (the distFromLine of the bottom-left sample is positive), $W_1$ is equal to sampleWeightL[x][y] and $W_0$ is equal to 8−$W_1$ The real computational complexity of geometric blending mask derivation is from Eq. (3), since all rest operations are using look-up table.

In VTM software implementation, the Eq. (3) requires 1 addition per sample and 1 addition per sample row, for example in an 8×8 CU, 1.125 additions and 0.015625 multiplications are required per sample;

In order to parallel processing each 4×4 Units, for example in an 8×8 CU, 1.25 additions and 0.0625 multiplications are required per sample;

In order to parallel processing each line (8×8 CU for example), 1 additions and 0.125 multiplications are required per sample;

In order to parallel processing all samples in a CU, for each samples 2 multiplications and 1 additions are required.

The worst case (8×8) per sample computation complexity is summarized in table 2:

TABLE 2

| worst case complexity analysing | | | | |
|---|---|---|---|---|
| Operations (per pixel) | Non-Parallel Processing | 4 × 4 subblock based parallel | Line based parallel | Sample based parallel |
| Mults | 0.015625 | 0.0625 | 0.125 | 2 |
| Adds | 1.125 | 1.25 | 1 | 1 |
| Shifts | 3 | 3 | 3 | 3 |

For more details regarding the blending operation, please refer to the accompanying draft specification modifications document, section "8.5.7.3 Weighted sample prediction process for geometric merge mode"

2.4.4. Blending Operation for Chroma Blocks

The sample weights calculated for the luma samples are subsampled and are used for chroma blending without any computation. The chroma sample weight at coordinate (x,y) is set equal to luma sample weight at coordinate (2x,2y) w.r.t. the top-left sample of luma block.

2.4.5. Motion Vector Derivation

Same merge list derivation process that is used for TPM is used for deriving motion vectors of each partition of the GEO block. Each partition is predicted only by uni-prediction.

2.4.6. Motion Vector Storage

In CE4-1.1 and CE4-1.2, luma sample weights at the four corners of a 4×4 motion storage unit is summed up. Then the sum is compared with 2 thresholds to decide whether one of two uni-prediction motion information or bi-prediction motion information is stored. The bi-prediction motion information is derived using the same process as TPM.

In CE4-1.14, the motion vector storage process is further simplified. The distance between the central position of a 4×4 motion storage unit and the split boundary is calculated and compared with a fixed threshold to decide whether uni- or bi prediction motion information is storage for this 4×4 motion storage unit. The sign of the distance is indicate which uni-prediction motion information should be stored in uni-prediction storage case. In CE4-1.14 the dependency of blending mask and motion storage are removed.

2.4.7. Mode Signalling

According to the proposed method the GEO mode is signalled as an additional merge mode together with TPM mode.

TABLE 3

| Syntax elements introduced by the proposal |
|---|
| if( !ciip_flag[ x0 ][ y0 ] && MaxNumTriangleMergeCand>1 ) { |
|   if (cbWidth>=8 && cbHeight>=8 ) |
|     merge_geo_flag[ x0 ][ y0 ]     ae(v) |
|   if ( merge_geo_flag[ x0 ][ y0 ] ) |
|     merge_geo_idx[ x0 ][ y0 ]     ae(v) |
|   else |
|     merge_triangle_split_dir[ x0 ][ y0 ]     ae(v) |

TABLE 3-continued

| Syntax elements introduced by the proposal | |
|---|---|
| merge_triangle_idx0[ x0 ][ y0 ] | ae(v) |
| merge_triangle_idx1[ x0 ][ y0 ] | ae(v) |
| } | |

The merge_geo_flag[ ][ ] is signaled with 4 CABAC context models, first 3 are derived depending on the mode of above and left neighbouring blocks, the $4^{th}$ is derived depending the aspect ratio of the current block. merge_geo_flag[ ][ ] is indicate whether current block is using GEO mode or TPM mode, which is similar as a "most probable mode" flag.

The geo_partition_idx[ ][ ] is used as an index to the lookup table that stores the angle $\varphi_i$ and distance $\varphi_i$ pairs. The geo_partition_idx coded truncated binary and binarized using bypass.

3. EXAMPLES OF TECHNICAL PROBLEMS SOLVED BY THE TECHNICAL SOLUTIONS DESCRIBED HEREIN

Figure 8:
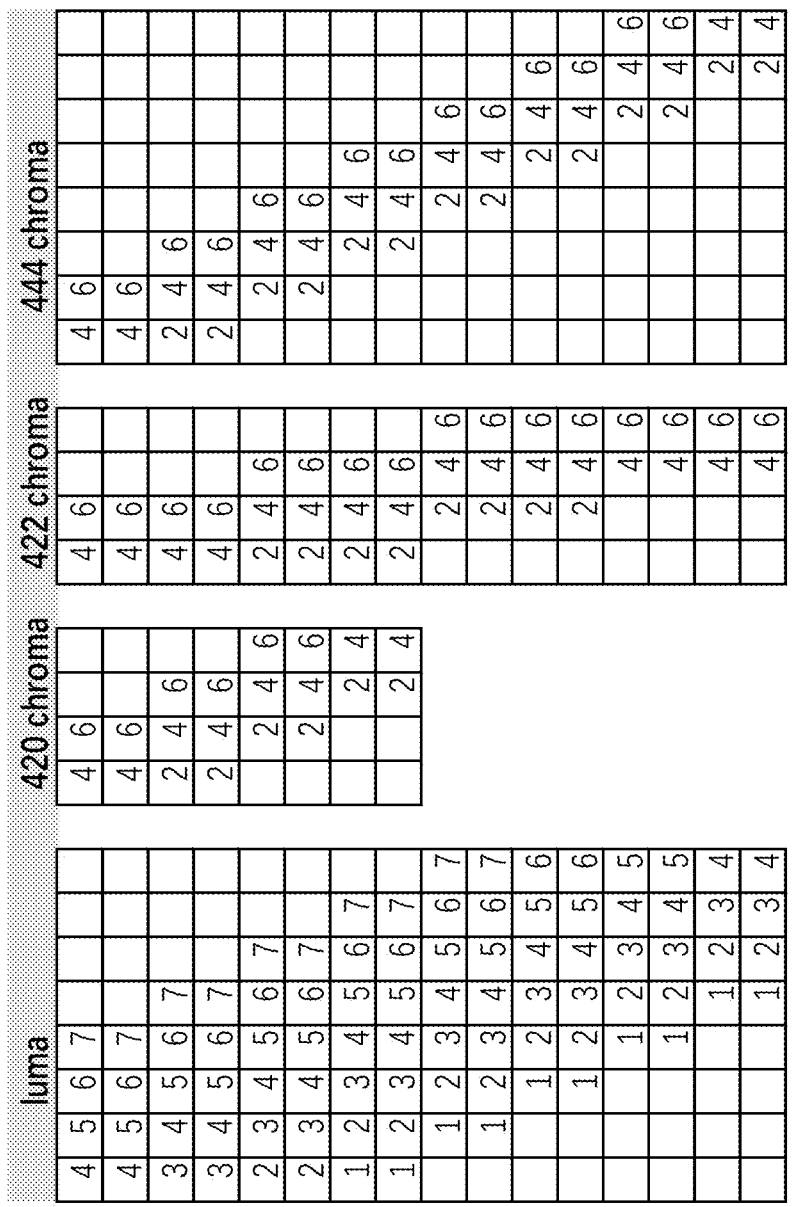
FIG. 8 shows an example of weights used in the blending process for an 8×16 TPM block (WD6).

There are several problems in the latest VVC working draft WD6 (JVET-O2001-v14), which are described below.
(1) In WD6, for the blending process of two triangle partitions, the chroma weights does not align with luma weights, as shown in FIG. 8, which may cause visual artifact.
(2) In WD6, the settings of weights for triangle prediction didn't consider multiple chroma formats such as 4:2:2 and 4:4:4, as shown in FIG. 8.
(3) In WD6, only even weights are allowed for chroma, which is not consistent with luma as both even and odd integers are allowed for luma components, as shown in FIG. 8.
(4) In WD6, TPM is allowed for 4×N and N×4 blocks, in which all pixels are required to perform weighted blending, which may be not desirable.
(5) In WD6, TPM is allowed for blocks with width and height ratio greater than 2, which may be not desirable.
(6) The GEO and TPM are separately applied with independent signaling and independent calculation of blending weight masks and motion storage masks.

FIG. 8 shows an example of weights used in the blending process for an 8×16 TPM block (WD6).

4. EXAMPLES OF EMBODIMENTS AND TECHNIQUES

The items listed below should be considered as examples to explain general concepts. These items should not be interpreted in a narrow way. Furthermore, these items can be combined in any manner.

The term 'TPM' may represent a coding method that split one block into two or more sub-regions, and transform is applied to the whole block. The term 'TPM' may indicate the triangle prediction mode and/or the geometric merge mode which is an extension of triangle prediction mode.

Weighted Samples in the TPM Blending Process
1. The weights of TPM chroma prediction samples may align with the weights of collocated luma prediction samples.
    a) In one example, weights for TPM coded chroma blocks (e.g., Cb block and/or Cr block) may be set according to the weights of collocated luma block.
    b) In one example, weights for a TPM coded chroma block maybe a subset of the weights of collocated luma block.
    c) In one example, a chroma block with dimensions M×N may be assigned with the same weight as a luma block with dimensions M×N for each position inside the block.
2. The weights of TPM chroma prediction samples may be dependent on the collocated luma block width and height, and/or color formats, including the chroma subsampling ratio.
    a) In one example, for 4:4:4 chroma format, the weight of a TPM chroma prediction sample may be same as the weight of collocated luma prediction sample for each position inside the block.
    b) In one example, for 4:2:0 and 4:2:2 chroma formats, the weights of TPM chroma prediction samples may be subsampled from the weights of TPMluma prediction samples.
        i. For a W×H TPM prediction block, with W as the block width and H as the block height, subWidthC and subHeightC denote the chroma subsampling ratio in width and height directions, respectively. Suppose the weights of luma prediction block is denoted by a two-dimensional array WeightY[x][y], with x=0 ... (W−1), y=0 ... (H−1), then the weights for the collocated chroma prediction block, WeightC [x][y], with x=0 ... (W/subWidthC−1), y=0 ... (H/subHeightC−1), may be calculated by WeightY [f(x)][g(y)].
            1) In on example, f(x)=x*subWidthC+offsetX, g(y)= y*subHeightC+OffsetY, e.g. OffsetX=OffsetY=0.
        ii. Suppose the weight for a position (x, y) in a W×H TPM luma block are calculated by w(x,y), e.g. w(x,y)=a*x+b*y+c, where x=0 ... W−1 and y=0 ... H−1 are coordinates of luma samples, and a, b, c are integers depending on W and/or H. In one example, the weight for a position (x', y') in the collocated TPM chroma block may be calculated as w(f(x'), g(y')), e.g. w(f(x'), g(y'))=a* (subWidthC*x')+b*(subHeightC*y')+c, where x'=0 ... W/subWidthC−1 and y'=0 ... H/subHeightC−1 are coordinates of chroma samples.
    c) In one example, the weights used in TPM may only depend on the dimensions (width or/and height) of the block and may be the same for different color components.
        i. For example, chroma component with size W*H may use the same weights as luma component with size W*H.
        ii. In one example, when the weight is not defined for a luma block size, TPM may be disabled for the chroma block of such size.
    d) In one example, the weights used in TPM may depend on both the dimensions (width or/and height) of the block and the color component of the block.
        i. In one example, the weights may be different for different color components.
        ii. In one example, the weights may be same for the two chroma components.
            1) Alternatively, furthermore, the weights used for luma component and chroma component may be different.
3. The weights of TPM prediction samples may be equal to an integer number X.

a) In one example, either an odd integer number or an even integer number may be assigned as the weight X (such as X=0 . . . 8) of a TPM chroma prediction sample.
b) The weight for a TPM luma/chroma prediction sample may be clipped to a range [M, N], such as M=0, N=8.
c) In one example, a TPM weight may be lower than zero.
4. In one example, the blending weight mask of TPM/GEO block may be pre-defined as N tables (such as N>0).
5. In one example, the blending weight mask of TPM/GEO block may be calculated from computing equations.

General Issues of TPM

Denote the block width as W and the block height as H.
6. Whether to enable or disable TPM may depend on the ratios of block width and height e.g., max(H, W)/min(H, W).
  a) Alternatively, whether to enable or disable TPM may depend on the differences between block width and height, e.g., Abs(Log 2(cbWidth)−Log 2(cbHeight)) wherein Abs(x) returns the absolute value of x and Log 2(x) returns the log base 2 of a number x.
  b) TPM may be not allowed for blocks with width to height ratio or height to width ratio greater than X (e.g., X=2).
    i. In one example, for a W×H prediction block, TPM may be disabled if W/H>2.
    ii. In one example, for a W×H prediction block, TPM may be disabled if H/W>2.
7. Whether TPM is allowed or not may be dependent on the maximum transform size.
  a) In one example, TPM may be not allowed for a block with width or/and height larger than the maximum transform size.
8. Whether TPM is allowed or not may be dependent on the maximum CU size.
  a) In one example, TPM may be not allowed for a block with block width or/and height equal to the maximum CU size
9. TPM may be not allowed for blocks with block width larger than N or/and block height larger than M.
  a) In one example, N=M=64.
10. TPM may be not allowed for blocks with block width equal to N or/and block height equal to M.
  a) In one example, N=M=4.
11. TPM may be not allowed for a certain chroma formats.
  a) In one example, TPM may be not allowed for 4:0:0 chroma format.
  b) In one example, TPM may be not allowed for 4:4:4 chroma format.
  c) In one example, TPM may be not allowed for 4:2:2 chroma format.
12. TPM may be not allowed if the resolution of two reference pictures used in TPM are different.
  a) Alternatively, TPM may be not allowed if the resolution of one reference pictures used in TPM is different to the resolution of the current picture.
13. When TPM is disabled or not allowed, the TPM syntax elements (such as merge_triangle_split_dir, merge_triangle_idx0, and merge_triangle_idx1) may be not signaled.
  a) When a syntax element is not signaled, it may be inferred to be 0.
  b) When TPM is disabled or not allowed, the TPM related semantic variables (such as MergeTriangleFlag) may be inferred to be 0.
14. The above bullets may be applied to triangle prediction mode (TPM) and/or the geometric merge mode (GEO). In other words, TPM may refer to GEO.

Unification of TPM and GEO
15. The TPM and GEO may be unified.
  a) In one example, TPM may be treated as a subset of GEO.
    i. Alternatively, GEO may be treated as a subset of TPM.
    ii. For example, if a coding tool A (or equivalently a "mode A", or shortly "A") (such as TPM) is treated as a subset of coding tool B (or equivalently a "mode B", or shortly "B") (such as GEO), then methods disclosed below may be applied.
      1) A and B may be signaled as one mode.
        a) In one example, mode A and mode B may share the same control flag(s) at SPS/VPS/APS/PPS/Slice/Sub-Picture/Tile/Brick/VPDU/CTU/TU/CU/PU/Picture Header/Slice Header level.
        b) In one example, mode A may be signaled as a subset of B.
          i. For example, B is defined as a prediction mode which contains N (such as N>1) sub-modes denoted as $\{M_0, M_1, M_2 \ldots, M_{N-1}\}$, and A may be defined as a prediction mode which contains X sub-modes (such as X<N) denoted as $\{M_0, M_{k0}, M_{k1} \ldots, M_{xK-1}\}$, where $\{M_0, M_{k0}, M_{k1} \ldots, M_{kX-1}\}$ is a subset of $\{M_0, M_1, M_2 \ldots, M_{N-1}\}$.
          ii. In one example, a first syntax element is signaled to indicate whether mode B is applied. A second syntax element to indicate whether mode A is applied is signaled depending on whether mode B is applied.
            1. In one example, the second syntax element is signaled only when mode B is applied.
      2) A and B may share at least one computing logic to generate the blending weight mask.
        a) In one example, the blending weight masks for A and B may be derived from the same loop-up-table.
      3) A and B may share at least one computing logic to generate the motion storage mask.
        a) In one example, the motion storage masks for A and B may be derived from the same loop-up-table.
  b) In one example, at least one computing logic may be used to calculate the blending weights for both TPM mode and GEO mode.
    i. In one example, the computing logic for TPM may be used for GEO.
      1) Alternatively, the computing logic for GEO may be used for TPM.
  c) In one example, at least one computing logic may be used to calculate the motion storage masks for both TPM mode and GEO mode.
    i. In one example, the computing logic for TPM may be used for GEO.
      1) Alternatively, the computing logic for GEO may be used for TPM.

Motion storage mask generation of TPM/GEO
16. The motion vector storage mask of TPM may be generated in the same way as GEO.
  a) Alternatively, the motion vector storage mask of GEO may be generated in the same way as TPM.
  b) In one example, a motion vector storage mask to indicate the inter-prediction direction (such as uni-prediction or bi-prediction) for a specific combination of block width and block height may be generated and/or stored.

i. In one example, the motion vector storage mask may only be generated for allowable combination of block width and block height.
c) In one example, each element of a motion vector storage mask indicates which motion vector among the two sub-partitions is stored and/or how many motion vectors (such as one motion vector or two motion vectors), and/or the inter-prediction direction (such as uni-prediction or bi-prediction) are stored for a 4×4 sub-block.
d) In one example, the motion vector storage mask of TPM/GEO block may be pre-defined as N tables (such as N>0).
e) In one example, the motion vector storage mask of TPM/GEO block may be calculated from computing equations.

17. The motion vector of TPM/GEO may be stored in unit of 4×4.
    a) In one example, each of the two sub-partitions of TPM/GEO has its own motion vector for motion compensation, however, the motion vector stored for spatial/temporal motion vector candidates is in unit of 4×4.
        i. In one example, each 4×4 sub-block of TPM/GEO may have different motion vectors stored in buffer.
18. Both the L0 motion vector and L1 motion vector may be stored for sub-blocks belong to the blending area of TPM/GEO.
    a) In one example, the blending area may indicate the region that are overlapped by both two sub-partitions.
    b) In one example, for those 4×4 sub-blocks outside the blending area of a TPM/GEO block, uni-prediction (such as L0 or L1) motion vector of the sub-partition may be stored.
    c) In one example, for those 4×4 sub-blocks belong to the blending area of a TPM/GEO block, bi-prediction motion vectors of both sub-partitions may be stored.
    d) In one example, for those 4×4 sub-blocks belong to the blending area of a TPM/GEO block, if both sub-partitions have motion vectors from the same direction, the Min/Max/Average/Weighted motion vector among the two motion vectors may be stored.

Deblocking of TPM and GEO
19. Whether to and/or how to apply the deblocking process on a coding block may depend on whether the coding block is coded with TPM or GEO mode.
    a) In one example, a boundary between two sub-blocks in two different partitions may be filtered in the deblocking filter stage.
        i. In one example, Boundary Strength (BS) is equal to 1 in this case.
        ii. In one example, Boundary Strength (BS) is equal to 2 in this case.
20. Deblocking may be triggered for a boundary between two sub-blocks in a TPM-coded/GEO-coded block.
    a) In one example, if one of the two sub-blocks aside the inner TU edges of a TPM/GEO mode has non-zero coefficient, then deblocking may be triggered, regardless of whether there is motion difference between the two sub-blocks.
    b) There may be no non-zero coefficients in both sub-blocks.
        i. In one example, if the two sub-blocks aside the inner TU edges of a TPM/GEO mode have all zero coefficient, but the motion difference of the two sub-blocks is large enough, then deblocking may still be triggered.
        ii. Alternatively, if the two sub-blocks aside the inner TU edges of a TPM/GEO mode have all zero coefficient, but the motion difference of the two sub-blocks is large enough, then deblocking may be NOT triggered.
    c) Whether to trigger deblocking or not for an edge of two sub-blocks coded in TPM/GEO mode may be dependent on whether it is a TU edge or a MV edge of the two sub-blocks.
        i. Deblocking may be triggered if the motion difference is large enough for an MV edge of a TPM/GEO mode.
        ii. Deblocking may be triggered if there is non-zero coefficient exists in the sub-block asides to a TU edge of a TPM/GEO mode.
        iii. When a filtering edge is both a TU edge or an MV edge, deblocking may be triggered if either one of below condition is meet
            1) If the motion difference is large enough.
            2) There is non-zero coefficient in either of the two sub-block asides.
    d) The "TU edge" mentioned above denotes the actual transform unit edge, and "MV edge" mentioned above indicates a PU edge or a sub-block edge which is aligned with the filtering grid.
    e) The "motion difference" mentioned above may indicate below cases.
        i. motion vector difference of the two sub-blocks is greater than T (such as T=1 pel, or ½ pel, or 8 in units of 1/16 luma samples)
        ii. different reference frame indexes
        iii. different reference POC
        iv. different number of reference frames.

On Configurable CTU Size and Maximum Transform Size
21. Whether to apply ISP or not may not dependent on the maximum transform size and/or minimum transform size.
    a) In one example, the signaling of ISP flag (such as intra_subpartitions_mode_flag) may NOT dependent on whether the width of current block is less than or equal to the maximum transform size, and/or may NOT dependent on whether the height of current block is less than or equal to maximum transform size.
    b) In one example, the signaling of ISP flag (such as intra_subpartitions_mode_flag) may NOT dependent on whether the width multiplied by the height of current block is greater than the square of the minimum transform size.
    c) In one example, the signaling of ISP flag (such as intra_subpartitions_mode_flag) may dependent on whether the width multiplied by the height of current block is greater than 16.
    d) In one example, the signaling of ISP flag (such as intra_subpartitions_mode_flag) may dependent on whether the width of current block is less than or equal to 64, and/or dependent on whether the height of current block is less than or equal to 64
22. ISP may be applied when the dimension of the coding block is greater than the maximum transform size.
    a) In one example, when the ISP coding block is greater than the maximum transform size, the ISP block may be implicitly split by a recursive way until the sub-partition reaches the size of 64.
    b) In one example, when the ISP coding block is greater than the maximum transform size, the ISP block may be implicitly split by a recursive way until the sub-partition reaches the size of maximum transform size.

23. CIIP and/or TPM and/or GEO may be applied when the dimension of the coding block is greater than or equal to 128.
   a) In one example, maximum CTU size may be set to greater than 128.
   b) In one example, CIIP may be used for blocks with block dimension greater than or equal to 128.
   c) In one example, TPM and/or GEO may be applied for blocks with block dimension greater than 128.
24. The merge data may be signaled when the dimension of the coding block is greater than 128.
   a) In one example, the merge flags (such as regular_merge_flag, mmvd_merge_flag, mmvd_cand_flag, mmvd_distance_idx, mmvd_direction_idx, merge_idx, ciip_flag, merge_triangle_split_dir, merge_triangle_idx0, merge_triangle_idx1) may be dependent on whether the dimension of the coding block is less than the maximum CTU size.
25. The value of pred_mode_ibc_flag may be inferred to be 0 if the block width and/or the block height are equal to or greater than X (such as X=64 or 128).
   a) In one example, the value of pred_mode_ibc_flag may be inferred to be 0 if the block width and the block height are greater than 64.
   b) In one example, the value of pred_mode_ibc_flag may be inferred to be 0 if the block width or the block height is greater than 64.
26. The cu_skip_flag and/or pred_mode_flag may be signalled when the dimension of coding block is greater than 128.

General Deblocking

27. Picture level deblocking parameter offsets for β and tC may be different for each component.
   a) In one example, picture level deblocking parameter offsets for luma, Cb and Cr may be different and indicated by different syntax elements.
   b) Alternatively, furthermore, the picture level deblocking parameter offset for joint_cb_cr coding mode may be different and indicated by a different syntax element.
28. Slice level deblocking parameter offsets for β and tC may be different for each component.
   a) In one example, slice level deblocking parameter offsets for luma, Cb and Cr may be different and indicated by different syntax element.
   b) Alternatively, furthermore, the picture level deblocking parameter offset for joint_cb_cr coding mode may be different and indicated by a different syntax element.
29. Chroma QP used to derive chroma deblocking parameters may be based on picture level chroma QP offset and CU-level chroma QP offset, but independent of slice level chroma QP offset.
   a) In one example, chroma QP used to derive chroma deblocking parameters may depend on pps_cb_qp_offset, pps_cr_qp_offset, pps_cbcr_qp_offset, CuQpOffset$_{Cb}$, CuQpOffsetc$_{Cr}$ and CuQpOffset$_{CbCr}$, but independent of slice_cb_qp_offset, slice_cr_qp_offset and slice_cbcr_qp_offset.

5. EMBODIMENTS

Below are example embodiments, which could be applied to VVC specification. The modifications are based on the latest VVC working draft (JVET-O2001-v04). Newly added parts are highlighted in bold and Italic, and the deleted parts from VVC working draft are marked with double brackets (e.g., denotes the deletion of the character "a").

5.1. Embodiment #1 on TPM Luma and Chroma Weights Illustration

Figure 9:
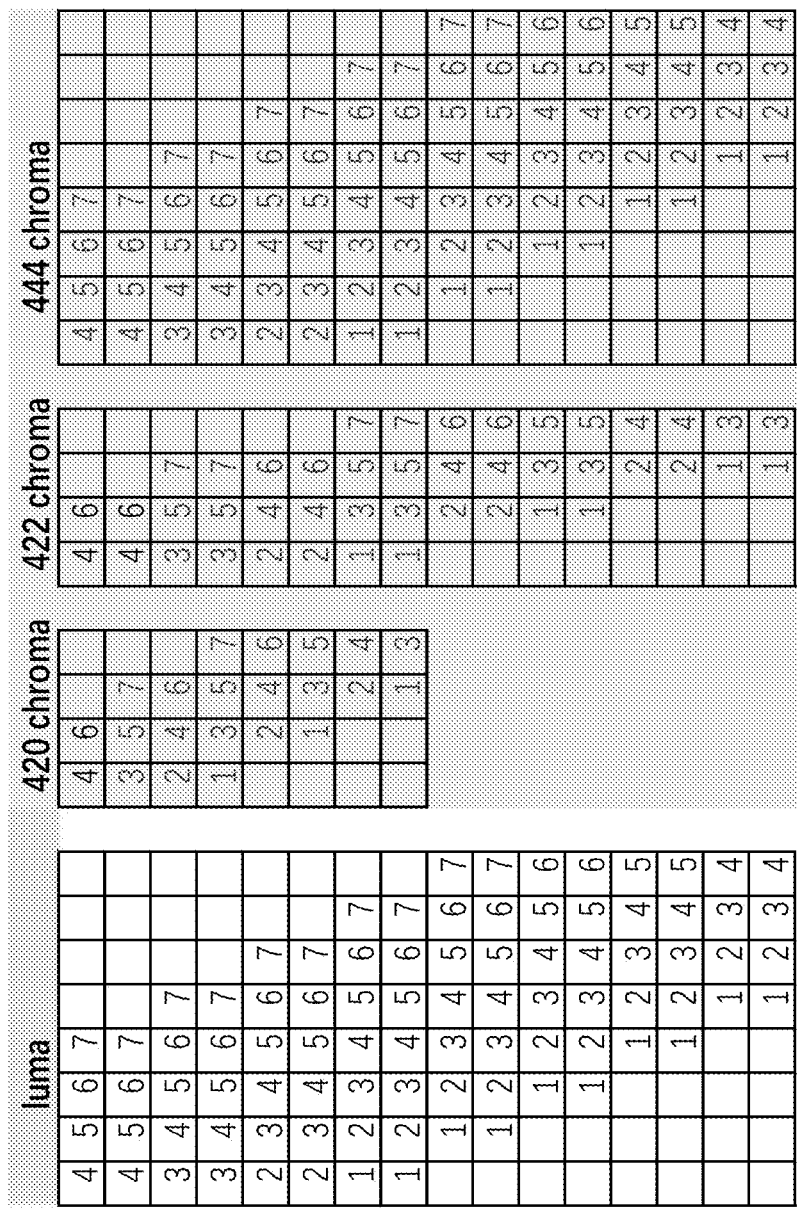
FIG. 9 shows an example weights setting for an 8×16 TPM prediction block.

The TPM chroma weights align with luma weights according to block width, block height, and chroma subsampling ratio. FIG. 9 shows an example weights setting for an 8×16 TPM prediction block.

5.2. Embodiment #2 on TPM Chroma Weights Align with TPM Luma Weights 8.5.7 Decoding Process for Triangle Inter Blocks
8.5.7.1 General
This process is invoked when decoding a coding unit with MergeTriangleFlag[xCb][yCb] equal to 1.
Inputs to this process are:
   a luma location (xCb, yCb) specifying the top-left sample of the current coding block relative to the top-left luma sample of the current picture,
   a variable cbWidth specifying the width of the current coding block in luma samples,
   a variable cbHeight specifying the height of the current coding block in luma samples,
   the luma motion vectors in 1/16 fractional-sample accuracy mvA and mvB,
   the chroma motion vectors mvCA and mvCB,
   the reference indices refIdxA and refIdxB,
   the prediction list flags predListFlagA and predListFlagB.
Outputs of this process are:
   an (cbWidth)×(cbHeight) array predSamples$_L$ of luma prediction samples,
   an (cbWidth/SubWidthC)×(cbHeight/SubHeightC) array predSamples$_{Cb}$ of chroma prediction samples for the component Cb,
   an (cbWidth/SubWidthC)×(cbHeight/SubHeightC) array predSamples$_{Cr}$ of chroma prediction samples for the component Cr.
Let predSamplesLA$_L$ and predSamplesLB$_L$ be (cbWidth)×(cbHeight) arrays of predicted luma sample values and, predSamplesLA$_{Cb}$, predSamplesLB$_{Cb}$, predSamplesLA$_{Cr}$ and predSamplesLB$_{Cr}$ be (cbWidth/SubWidthC)×(cbHeight/SubHeightC) arrays of predicted chroma sample values.
The predSamples$_L$, predSamples$_{Cb}$ and predSamples$_{Cr}$ are derived by the following ordered steps:
   1. For N being each of A and B, the following applies:
      The reference picture consisting of an ordered two-dimensional array refPicLN$_L$ of luma samples and two ordered two-dimensional arrays refPicLN$_{Cb}$ and refPicLN$_{Cr}$ of chroma samples is derived by invoking the process specified in clause 8.5.6.2 in VVC WD6 with X set equal to predListFlagN and refIdxX set equal to refIdxN as input.
      The array predSamplesLN$_L$ is derived by invoking the fractional sample interpolation process specified in clause 8.5.6.3 with the luma location (xCb, yCb), the luma coding block width sbWidth set equal to cbWidth, the luma coding block height sbHeight set equal to cbHeight, the motion vector offset mvOffset set equal to (0, 0), the motion vector mvLX set equal to mvN and the reference array refPicLX$_L$ set equal to refPicLN$_L$, the variable bdofFlag set equal to FALSE, and the variable cIdx is set equal to 0 as inputs.

The array predSamplesLN$_{Cb}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cb}$ set equal to refPicLN$_{Cb}$, the variable bdofFlag set equal to FALSE, and the variable cIdx is set equal to 1 as inputs.

The array predSamplesLN$_{Cr}$ is derived by invoking the fractional sample interpolation process specified in clause 8.5.6.3 with the luma location (xCb, yCb), the coding block width sbWidth set equal to cbWidth/SubWidthC, the coding block height sbHeight set equal to cbHeight/SubHeightC, the motion vector offset mvOffset set equal to (0, 0), the motion vector mvLX set equal to mvCN, and the reference array refPicLX$_{Cr}$ set equal to refPicLN$_{Cr}$, the variable bdofFlag set equal to FALSE, and the variable cIdx is set equal to 2 as inputs.

2. The partition direction of merge triangle mode variable triangleDir is set equal to merge_triangle_split_dir[xCb][yCb].
3. The prediction samples inside the current luma coding block, predSamplesL[xL][yL] with xL=0 . . . cbWidth−1 and yL=0 . . . cbHeight−1, are derived by invoking the weighted sample prediction process for triangle merge mode specified in clause 8.5.7.2 with the coding block width nCbW set equal to cbWidth, the coding block height nCbH set equal to cbHeight, the sample arrays predSamplesLAL and predSamplesLBL, and the variables triangleDir, and cIdx equal to 0 as inputs.
4. The prediction samples inside the current chroma component Cb coding block, predSamplesCb[xC][yC] with xC=0 . . . cbWidth/SubWidthC−1 and yC=0 . . . cbHeight/SubHeightC−1, are derived by invoking the weighted sample prediction process for triangle merge mode specified in clause 8.5.7.2 with the luma coding block width nCbW set equal to cbWidth, the luma coding block height nCbH set equal to cbHeight, the sample arrays predSamplesLACb and predSamplesLBCb, and the variables triangleDir, and cIdx equal to 1 as inputs.
5. The prediction samples inside the current chroma component Cr coding block, predSamplesCr[xC][yC] with xC=0 . . . cbWidth/SubWidthC−1 and yC=0 . . . cbHeight/SubHeightC−1, are derived by invoking the weighted sample prediction process for triangle merge mode specified in clause 8.5.7.2 with the luma coding block width nCbW set equal to cbWidth, the luma coding block height nCbH set equal to cbHeight, the sample arrays predSamplesLACr and predSamplesLBCr, and the variables triangleDir, and cIdx equal to 2 as inputs.
6. The motion vector storing process for merge triangle mode specified in clause 8.5.7.3 is invoked with the luma coding block location (xCb, yCb), the luma coding block width cbWidth, the luma coding block height cbHeight, the partition direction triangleDir, the luma motion vectors mvA and mvB, the reference indices refIdxA and refIdxB, and the prediction list flags predListFlagA and predListFlagB as inputs.

8.5.7.2 Weighted Sample Prediction Process for Triangle Merge Mode

Inputs to this process are:
two variables nCbW and nCbH specifying the width and the height of the current luma coding block,
two (nCbW/SubWidthC)×(nCbH/SubHeightC) arrays predSamplesLA and predSamplesLB,
a variable triangleDir specifying the partition direction,
a variable cIdx specifying colour component index.

Output of this process is the (nCbW/SubWidthC)×(nCbH/SubHeightC) array pbSamples of prediction sample values.

The variable nCbR is derived as follows:

$$nCbR=(nCbW>nCbH)?(nCbW/nCbH):(nCbH/nCbW) \quad (8\text{-}841)$$

The variable bitDepth is derived as follows:
If cIdx is equal to 0, bitDepth is set equal to BitDepth$_Y$.
Otherwise, bitDepth is set equal to BitDepth$_C$.

Variables shift1 and offset1 are derived as follows:
The variable shift1 is set equal to Max(5, 17−bitDepth).
The variable offset1 is set equal to 1<<(shift1−1).

Depending on the values of triangleDir, the prediction samples pbSamples[x][y] with x=0 . . . nCbW/SubWidthC−1 and y=0 . . . nCbH/SubHeightC−1 are derived as follows:

The variables xIdx and yIdx are derived as follows:

$$xIdx=(cIdx==0)?x:x*SubWidthC$$

$$yIdx=(cIdx==0)?y:y*SubHeightC$$

The variable wValue specifying the weight of the prediction sample is derived as follows:
If triangleDir is equal to 0, the following applies:

$$wValue=(nCbW>nCbH)?(Clip3(0,8,(xIdx/nCbR-yIdx)+4)):(Clip3(0,8,(xIdx-yIdx/nCbR)+4)) \quad (8\text{-}842)$$

Otherwise (triangleDir is equal to 1), the following applies:

$$wValue=(nCbW>nCbH)?(Clip3(0,8,(nCbH-1-xIdx/nCbR-yIdx)+4))(Clip3(0,8,(nCbW-1-xIdx-yIdx/nCbR)+4)) \quad (8\text{-}843)$$

The prediction sample values are derived as follows:

$$pbSamples[x][y]=Clip3(0,(1<<bitDepth)-1,(predSamplesLA[x][y]*wValue+predSamplesLB[x][y]*(8-wValue)+offset1)>>shift1) \quad (8\text{-}847)$$

5.3. Embodiment #3 on TPM Conditioned on Block Width Height Ratio 7.3.8.7 Merge Data Syntax

| | Descriptor |
|---|---|
| merge_data( x0, y0, cbWidth, cbHeight, chType ) { | |
|   if ( CuPredMode[ chType ][ x0 ][ y0 ] == MODE_IBC ) { | |
|     if( MaxNumIbcMergeCand>1 ) | |
|       merge_idx[ x0 ][ y0 ] | ae(v) |
|   } else { | |
|     if( MaxNumSubblockMergeCand>0 && cbWidth>=8 && cbHeight>=8 ) | |
|       merge_subblock_flag[ x0 ][ y0 ] | ae(v) |

|  | Descriptor |
|---|---|
| ```
if( merge_subblock_flag[ x0 ][ y0 ] == 1 ) {
   if( MaxNumSubblockMergeCand>1 )
      merge_subblock_idx[ x0 ][ y0 ]
} else {
   if( ( cbWidth * cbHeight )>=64 && ( (sps_ciip_enabled_flag &&
      cu_skip_flag[ x0 ][ y0 ]==0 && cbWidth<128 && cbHeight<128) ||
      ( sps_triangle_enabled_flag && MaxNumTriangleMergeCand>1 &&
      slice_type ==B &&
         Abs( Log2( cbWidth ) − Log2( cbHeight ) ) <= 2 ) ) )
      regular_merge_flag[ x0 ][ y0 ]
   if ( regular_merge_flag[ x0 ][ y0 ]==1 ){
      if( sps_mmvd_enabled_flag )
         mmvd_merge_flag[ x0 ][ y0 ]
      if( mmvd_merge_flag[ x0 ][ y0 ]==1 ) {
         if( MaxNumMergeCand>1 )
            mmvd_cand_flag[ x0 ][ y0 ]
         mmvd_distance_idx[ x0 ][ y0 ]
         mmvd_direction_idx[ x0 ][ y0 ]
      } else {
         if( MaxNumMergeCand>1 )
            merge_idx[ x0 ][ y0 ]
      }
   } else {
      if( sps_ciip_enabled_flag && sps_triangle_enabled_flag &&
         MaxNumTriangleMergeCand>1 && slice type==B &&
         cu_skip_flag[ x0 ][ y0 ] == 0 &&
         ( cbWidth * cbHeight )>=64 && cbWidth<128 && cbHeight<128 &&
            Abs( Log2( cbWidth ) − Log2( cbHeight ) )<=2 ) {
         ciip_flag[ x0 ][ y0 ]
      if( ciip_flag[ x0 ][ y0 ] && MaxNumMergeCand>1 )
         merge_idx[ x0 ][ y0 ]
      if( !ciip_flag[ x0 ][ y0 ] && MaxNumTriangleMergeCand>1) {
         merge_triangle_split_dir[ x0 ][ y0 ]
         merge_triangle_idx0[ x0 ][ y0 ]
         merge_triangle_idx1[ x0 ][ y0 ]
      }
   }
  }
}
``` | ae(v)<br><br><br><br><br><br><br><br>ae(v)<br><br><br>ae(v)<br><br><br>ae(v)<br>ae(v)<br>ae(v)<br><br><br><br>ae(v)<br><br><br><br><br><br><br><br>ae(v)<br><br>ae(v)<br><br>ae(v)<br>ae(v)<br>ae(v) |

7.4.9.7 Merge Data Semantics

The variable MergeTriangleFlag[x0][y0], which specifies whether triangular shape based motion compensation is used to generate the prediction samples of the current coding unit, when decoding a B slice, is derived as follows:

If all the following conditions are true, MergeTriangleFlag[x0][y0] is set equal to 1:
sps_triangle_enabled_flag is equal to 1.
slice_type is equal to B.
general_merge_flag[x0][y0] is equal to 1.
MaxNumTriangleMergeCand is greater than or equal to 2.
cbWidth*cbHeight is greater than or equal to 64.
regular_merge_flag[x0][y0] is equal to 0.
merge_subblock_flag[x0][y0] is equal to 0.
ciip_flag[x0][y0] is equal to 0.
Abs(Log 2(cbWidth)−Log 2(cbHeight)) is less than or equal to 2

Otherwise, MergeTriangleFlag[x0][y0] is set equal to 0.

5.4. Embodiment #4 on TPM Conditioned on Block Width<128 and Height<128

7.3.8.7 Merge Data Syntax

|  | Descriptor |
|---|---|
| ```
merge data( x0, y0, cbWidth, cbHeight, chType ) {
   if ( CuPredMode[ chType ][ x0 ][ y0 ] ==MODE_IBC ) {
      if( MaxNumIbcMergeCand>1 )
         merge_idx[ x0 ][ y0 ]
   } else {
      if( MaxNumSubblockMergeCand>0 && cbWidth>=8 && cbHeight>=8 )
         merge_subblock_flag[ x0 ][ y0 ]
      if( merge_subblock_flag[ x0 ][ y0 ] == 1 ) {
         if( MaxNumSubblockMergeCand>1 )
            merge_subblock_idx[ x0 ][ y0 ]
      } else {
         if( ( cbWidth * cbHeight )>=64 && cbWidth<128 && cbHeight<128
            && ( (sps_ciip_enabled_flag &&
               cu_skip_flag[ x0 ][ y0 ]==0 [[&& cbWidth<128 && cbHeight<128]])
               ||
               ( sps_triangle_enabled_flag && MaxNumTriangleMergeCand>1 &&
``` | <br><br>ae(v)<br><br><br>ae(v)<br><br><br>ae(v) |

|  | Descriptor |
|---|---|
|         slice_type==B ) ) ) | |
|         regular_merge_flag[ x0 ][ y0 ] | ae(v) |
|       if ( regular_ merge_flag[ x0 ][ y0 ]==1 ){ | |
|         if( sps_mmvd_enabled_flag ) | |
|           mmvd_merge_flag[ x0 ][ y0 ] | ae(v) |
|         if( mmvd_merge_flag[ x0 ][ y0 ]==1 ) { | |
|           if( MaxNumMergeCand>1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |
|         } else { | |
|           if( MaxNumMergeCand>1 ) | |
|             merge_idx[ x0 ][ y0 ] | ae(v) |
|         } | |
|       } else { | |
|         if( sps_ciip_enabled_flag && sps_triangle_enabled_flag && | |
|           MaxNumTriangleMergeCand>1 && slice type ==B && | |
|           cu_skip_flag[ x0 ][ y0 ] == 0 && | |
|           ( cbWidth * cbHeight )>=64 && cbWidth<128 && cbHeight<128 ) | |
| { | |
|           ciip_flag[ x0 ][ y0 ] | ae(v) |
|         if( ciip_flag[ x0 ][ y0 ] && MaxNumMergeCand>1 ) | |
|           merge_idx[ x0 ][ y0 ] | ae(v) |
|         if( !ciip_flag[ x0 ][ y0 ] && MaxNumTriangleMergeCand>1) { | |
|           merge_triangle_split_dir[ x0 ][ y0 ] | ae(v) |
|           merge_triangle_idx0[ x0 ][ y0 ] | ae(v) |
|           merge_triangle_idx1[ x0 ][ y0 ] | ae(v) |
|         } | |
|       } | |
|     } | |
|   } | |

7.4.9.7 Merge Data Semantics

The variable MergeTriangleFlag[x0][y0], which specifies whether triangular shape based motion compensation is used to generate the prediction samples of the current coding unit, when decoding a B slice, is derived as follows:

If all the following conditions are true, MergeTriangleFlag[x0][y0] is set equal to 1:
sps_triangle_enabled_flag is equal to 1.
slice_type is equal to B.
general_merge_flag[x0][y0] is equal to 1.
MaxNumTriangleMergeCand is greater than or equal to 2.
cbWidth*cbHeight is greater than or equal to 64.
regular_merge_flag[x0][y0] is equal to 0.
merge_subblock_flag[x0][y0] is equal to 0.
ciip_flag[x0][y0] is equal to 0.
cbWidth is less than 128.
cbHeight is less than 128.
Otherwise, MergeTriangleFlag[x0][y0] is set equal to 0.

5.5. Embodiment #5 on TPM Conditioned on Block Width>4 and Height>4

7.3.8.7 Merge Data Syntax

|  | Descriptor |
|---|---|
| merge_data( x0, y0, cbWidth, cbHeight, chType ) { | |
|   if ( CuPredMode[ chType ][ x0 ][ y0 ] == MODE_IBC ) { | |
|     if( MaxNumIbcMergeCand>1 ) | |
|       merge_idx[ x0 ][ y0 ] | ae(v) |
|   } else { | |
|     if( MaxNumSubblockMergeCand>0 && cbWidth>=8 && cbHeight>=8 ) | |
|       merge_subblock_flag[ x0 ][ y0 ] | ae(v) |
|     if( merge_subblock_flag[ x0 ][ y0 ] == 1 ) { | |
|       if( MaxNumSubblockMergeCand>1 ) | |
|         merge_subblock_idx[ x0 ][ y0 ] | ae(v) |
|     } else { | |
|       if( ( cbWidth * cbHeight)>=64 && ( (sps_ciip_enabled_flag && | |
|         cu_skip_flag[ x0 ][ y0 ]==0 && cbWidth<128 && cbHeight<128) \|\| | |
|         ( sps_triangle_enabled_flag && MaxNumTriangleMergeCand>1 && | |
|         slice_type ==B && | |
|         cbWidth>4 && cbHeight>4) ) ) | |
|         regular_merge_flag[ x0 ][ y0 ] | ae(v) |
|       if ( regular_merge_flag[ x0 ][ y0 ]==1 ) { | |
|         if( sps_mmvd_enabled_flag) | |
|           mmvd_merge_flag[ x0 ][ y0 ] | ae(v) |
|         if( mmvd_merge_flag[ x0 ][ y0 ]==1 ) { | |
|           if( MaxNumMergeCand>1 ) | |
|             mmvd_cand_flag[ x0 ][ y0 ] | ae(v) |
|           mmvd_distance_idx[ x0 ][ y0 ] | ae(v) |
|           mmvd_direction_idx[ x0 ][ y0 ] | ae(v) |

| | Descriptor |
|---|---|
| ``` 
    } else {
      if( MaxNumMergeCand>1 )
        merge_idx[ x0 ][ y0 ]
    }
  } else {
    if( sps_ciip_enabled_flag && sps_triangle_enabled_flag &&
      MaxNumTriangleMergeCand>1 && slice_type ==B &&
      cu_skip_flag[ x0 ][ y0 ] == 0 &&
      ( cbWidth * cbHeight )>=64 && cbWidth<128 && cbHeight<128 &&
      cbWidth>4 && cbHeight>4) {
      ciip_flag[ x0 ][ y0 ]
      if( ciip_flag[ x0 ][ y0 ] && MaxNumMergeCand>1 )
        merge_idx[ x0 ][ y0 ]
      if( !ciip_flag[ x0 ][ y0 ] && MaxNumTriangleMergeCand>1) {
        merge_triangle_split_dir[ x0 ][ y0 ]
        merge_triangle_idx0[ x0 ][ y0 ]
        merge_triangle_idx1[ x0 ][ y0 ]
      }
    }
  }
}
``` | ae(v)<br><br><br><br><br><br><br><br><br>ae(v)<br><br>ae(v)<br><br>ae(v)<br>ae(v)<br>ae(v) |

7.4.9.7 Merge Data Semantics

The variable MergeTriangleFlag[x0][y0], which specifies whether triangular shape based motion compensation is used to generate the prediction samples of the current coding unit, when decoding a B slice, is derived as follows:

If all the following conditions are true, MergeTriangleFlag[x0][y0] is set equal to 1:
sps_triangle_enabled_flag is equal to 1.
slice_type is equal to B.
general_merge_flag[x0][y0] is equal to 1.
MaxNumTriangleMergeCand is greater than or equal to 2.
cbWidth*cbHeight is greater than or equal to 64.
regular_merge_flag[x0][y0] is equal to 0.
merge_subblock_flag[x0][y0] is equal to 0.
ciip_flag[x0][y0] is equal to 0.
cbWidth is greater than 4
cbHeight is greater than 4
Otherwise, MergeTriangleFlag[x0][y0] is set equal to 0.

5.6. Embodiment #6 on ISP Signaling Independent with the Minimum Transform Size and Maximum Transform Size 7.3.8.5 Coding Unit Syntax

| | Descriptor |
|---|---|
| ```
coding_unit( x0, y0, cbWidth, cbHeight, cqtDepth, treeType, modeType) {
...
  else {
    if( sps_mrl_enabled_flag && ( ( y0 %CtbSizeY ) > 0 ) )
      intra_luma_ref_idx[ x0 ][ y0 ]
    if ( sps_isp_enabled_flag && intra_luma_ref_idx[ x0 ][ y0 ]==0 [[&&
      ( cbWidth<=MaxTbSizeY && cbHeight<=MaxTbSizeY )]] &&
      ( cbWidth * cbHeight>MinTbSizeY * MinTbSizeY ) )
      intra_subpartitions_mode_flag[ x0 ][ y0 ]
    if( intra_subpartitions_mode_flag[ x0 ][ y0 ]==1 )
      intra_subpartitions_split_flag[ x0 ][ y0 ]
    if( intra_luma_ref_idx[ x0 ][ y0 ]==0 )
      intra_luma_mpm_flag[ x0 ][ y0 ]
    if( intra_luma_mpm_flag[ x0 ][ y0 ] ) {
      if( intra_luma_ref_idx[ x0 ][ y0 ]==0 )
        intra_luma_not_planar_flag[ x0 ][ y0 ]
      if( intra_luma_not_planar_flag[ x0 ][ y0 ] 0 )
        intra_luma_mpm_idx[ x0 ][ y0 ]
    } else
    ...
``` | <br><br><br><br>ae(v)<br><br><br><br>ae(v)<br><br>ae(v)<br><br>ae(v)<br><br><br>ae(v)<br><br>a e(v) |

5.7. Embodiment #7 on ISP Applied to Blocks Larger than Maximum Transform Size

7.3.8.6 Coding Unit Syntax

| | Descriptor |
|---|---|
| coding_unit( x0, y0, cbWidth, cbHeight, cqtDepth, treeType, modeType) { | |
| ... | |
|   else { | |
|     if( sps_mrl_enabled_flag && ( ( y0 %CtbSizeY ) > 0 ) ) | |
|       intra_luma_ref_idx[ x0 ][ y0 ] | ae(v) |
|     if ( sps_isp_enabled_flag && intra_luma_ref_idx[ x0 ][ y0 ]==0 && | |
|       ( cbWidth<=[[MaxTbSizeY]]64 && cbHeight<=[[MaxTbSizeY]]64 ) && | |
|       ( cbWidth * cbHeight>MinTbSizeY * MinTbSizeY ) ) | |
|       intra_subpartitions_mode_flag[ x0 ][ y0 ] | ae(v) |
|     if( intra_subpartitions_mode_flag[ x0 ][ y0 ]==1 ) | |
|       intra_subpartitions_split_flag[ x0 ][ y0 ] | ae(v) |
|     if( intra_luma_ref_idx[ x0 ][ y0 ]==0 ) | |
|       intra_luma_mpm_flag[ x0 ][ y0 ] | ae(v) |
|     if( intra_luma_mpm_flag[ x0 ][ y0 ] ) { | |
|       if( intra_luma_ref_idx[ x0 ][ y0 ]==0 ) | |
|         intra_luma_not_planar_flag[ x0 ][ y0 ] | ae(v) |
|       if( intra_luma_not_planar_flag[ x0 ][ y0 ] ) | |
|         intra_luma_mpm_idx[ x0 ][ y0 ] | ae(v) |
|     } else | |
| ... | |

5.8. Embodiment #8 on ISP Applied to Block Size Greater than 16 Pixels

7.3.8.7 Coding Unit Syntax

| | Descriptor |
|---|---|
| coding_unit(x0, y0, cbWidth, cbHeight, cqtDepth, treeType, modeType) { | |
| ... | |
|   else { | |
|     if( sps_mrl_enabled_flag && ( ( y0 %CtbSizeY ) > 0 ) ) | |
|       intra_luma_ref_idx[ x0 ][ y0 ] | ae(v) |
|     if ( sps_isp_enabled_flag && intra_luma_ref_idx[ x0 ][ y0 ]==0 && | |
|       ( cbWidth<=MaxTbSizeY && cbHeight<=MaxTbSizeY) && | |
|       ( cbWidth * cbHeight>[[MinTbSizeY * MinTbSizeY]]16) ) | |
|       intra_subpartitions_mode_flag[ x0 ][ y0 ] | ae(v) |
|     if( intra_subpartitions_mode_flag[ x0 ][ y0 ]==1 ) | |
|       intra_subpartitions_split_flag[ x0 ][ y0 ] | ae(v) |
|     if( intra_luma_ref_idx[ x0 ][ y0 ]==0 ) | |
|       intra_luma_mpm_flag[ x0 ][ y0 ] | ae(v) |
|     if( intra_luma_mpm_flag[ x0 ][ y0 ] ) { | |
|       if( intra_luma_ref_idx[ x0 ][ y0 ]==0 ) | |
|         intra_luma_not_planar_flag[ x0 ][ y0 ] | ae(v) |
|       if( intra_luma_not_planar_flag[ x0 ][ y0 ] ) | |
|         intra_luma_mpm_idx[ x0 ][ y0 ] | ae(v) |
|     } else | |
| ... | |

5.9. An Example of MV Rounding

Changes on the Working Draft
The working draft specified in JVET-O2001-v14 are changed as below. The newly added parts are highlighted in bold and Italic. The removed parts are marked with double brackets.
8.5.5.3 Derivation Process for Subblock-Based Temporal Merging Candidates
Inputs to this process are:
...
Outputs of this process are:
...
...

The rounding process for motion vectors as specified in clause 8.5.2.14 is invoked with mvX set equal to tempMv[0], rightShift set equal to 4, and leftShift set equal to 0 as inputs and the rounded tempMv[0] as output.

The rounding process for motion vectors as specified in clause 8.5.2.14 is invoked with mvX set equal to tempMv[1], rightShift set equal to 4, and leftShift set equal to 0 as inputs and the rounded tempMv[1] as output.

For xSbIdx=0 ... numSbX−1 and ySbIdx=0 ... numSbY−1, the motion vectors mvLXSbCol[xSbIdx][ySbIdx] and prediction list utilization flags predFlagLXSbCol[xSbIdx][ySbIdx] are derived as follows:

The luma location (xSb, ySb) specifying the top-left sample of the current coding subblock relative to the top-left luma sample of the current picture is derived as follows:

xSb=xCb+xSbIdx*sbWilth+sbWidth/2 (8-551)

ySb=yCb+ySbIdx*sbHeight+sbHeight/2 (8-552)

The location (xColSb, yColSb) of the collocated subblock inside ColPic is derived as follows.
The following applies:

yColSb=Clip3(yCtb,Min(CurPicHeightInSamplesY−1,yCtb+(1<<CtbLog 2SizeY)−1),ySb+tempMv[1]) (8-553)

If subpic_treated_as_pic_flag[SubPicIdx] is equal to 1, the following applies:

xColSb=Clip3(xCtb,Min(SubPicRightBoundaryPos, xCtb+(1<<CtbLog 2SizeY)+3),xSb+tempMv[0]) (8-554)

Otherwise (subpic_treated_as_pic_flag[SubPicIdx] is equal to 0), the following applies:

xColSb=Clip3(xCtb,Min(CurPicWidthInSamplesY−1, xCtb+(1<<CtbLog 2SizeY)+3),xSb+tempMv[0]) (8-555)

8.5.5.4 Derivation Process for Subblock-Based Temporal Merging Base Motion Data
Inputs to this process are:
 . . .
Outputs of this process are:
 . . .
The variable tempMv is set as follows:

tempMv[0]=0 (8-558)

tempMv[1]=0 (8-559)

The variable currPic specifies the current picture.
When availableFlagA$_1$ is equal to TRUE, the following applies:
 If all of the following conditions are true, tempMv is set equal to mvL0A$_1$:
  predFlagL0A$_1$ is equal to 1,
  DiffPicOrderCnt(ColPic, RefPicList[0][refIdxL0A$_1$]) is equal to 0,
 Otherwise, if all of the following conditions are true, tempMv is set equal to mvL1A$_1$:
  slice_type is equal to B,
  predFlagL1A$_1$ is equal to 1,
  DiffPicOrderCnt(ColPic, RefPicList[1][refIdxL1A$_1$]) is equal to 0.
 The rounding process for motion vectors as specified in clause 8.5.2.14 is invoked with mvX set equal to tempMv[0], rightShift set equal to 4, and leftShift set equal to 0 as inputs and the rounded tempMv[0] as output.
 The rounding process for motion vectors as specified in clause 8.5.2.14 is invoked with mvX set equal to tempMv[1], rightShift set equal to 4, and leftShift set equal to 0 as inputs and the rounded tempMv[1] as output.
The location (xColCb, yColCb) of the collocated block inside ColPic is derived as follows.
The following applies:

yColCb=Clip3(yCtb,Min(CurPicHeightInSamplesY−1,yCtb+(1<<CtbLog 2SizeY)−1),yColCtrCb+tempMv[1]) (8-560)

If subpic_treated_as_pic_flag[SubPicIdx] is equal to 1, the following applies:

xColCb=Clip3(xCtb,Min(SubPicRightBoundaryPos, xCtb+(1<<CtbLog 2SizeY)+3),xColCtrCb+tempMv[0]) (8-561)

Otherwise (subpic_treated_as_pic_flag[SubPicIdx] is equal to o, the following applies:

xColCb=Clip3(xCtb,Min(CurPicWidthInSamplesY−1,xCtb+(1<<CtbLog 2SizeY)+3),xColCtrCb+tempMv[0]) (8-562)

5.10. An Example of Sub-TMVP 8.5.5.2 Derivation Process for Motion Vectors and Reference Indices in Subblock Merge Mode
Inputs to this process are:
 a luma location (xCb, yCb) of the top-left sample of the current luma coding block relative to the top-left luma sample of the current picture,
 two variables cbWidth and cbHeight specifying the width and the height of the luma coding block.
Outputs of this process are:
 the number of luma coding subblocks in horizontal direction numSbX and in vertical direction numSbY,
 the reference indices refIdxL0 and refIdxL1,
 the prediction list utilization flag arrays predFlagL0[xSbIdx][ySbIdx] and predFlagL1[xSbIdx][ySbIdx],
 the luma subblock motion vector arrays in 1/16 fractional-sample accuracy mvL0[xSbIdx][ySbIdx] and mvL1[xSbIdx][ySbIdx] with xSbIdx=0 . . . numSbX−1, ySbIdx=0 . . . numSbY−1,
 the chroma subblock motion vector arrays in 1/32 fractional-sample accuracy mvCL0[xSbIdx][ySbIdx] and mvCL1[xSbIdx][ySbIdx] with xSbIdx=0 . . . numSbX−1,ySbIdx=0 . . . numSbY−1,
 the bi-prediction weight index bcwIdx.
The variables numSbXAff and numSbYAff are set as below.

numSbXAff=cbWidth>>2 numSbYAff=cbHeight>>2

The variables numSbX, numSbY and the subblock merging candidate list, subblock MergeCandList are derived by the following ordered steps:
 1. When sps_sbtmvp_enabled_flag is equal to 1, the following applies:
  For the derivation of availableFlagA$_1$, refIdxLXA$_1$, predFlagLXA$_1$ and mvLXA$_1$ the following applies:
   The luma location (xNbA$_1$,yNbA$_1$) inside the neighbouring luma coding block is set equal to (xCb−1, yCb+cbHeight−1).
   The derivation process for neighbouring block availability as specified in clause 6.4.4 is invoked with the current luma location (xCurr,yCurr) set equal to (xCb,yCb), the neighbouring luma location (xNbA$_1$,yNbA$_1$), check PredModeY set equal to TRUE, and cIdxset equal to 0 as inputs, and the output is assigned to the block availability flag available A$_1$.
   The variables availableFlagA$_1$, refIdxLXA$_1$, predFlagLXA$_1$ and mvLXA$_1$ are derived as follows:
    If availableA$_1$ is equal to FALSE, availableFlagA$_1$ is set equal to 0, both components of mvLXA$_1$ are set equal to 0, refIdxLXA$_1$ is set equal to −1 and predFlagLXA$_1$ is set equal to 0, with X being 0 or 1, and bcwIdxA$_1$ is set equal to 0.
    Otherwise, availableFlagA$_1$ is set equal to 1 and the following assignments are made:

$$mvLXA_1 = MvLX[xNbA_1][yNbA_1] \quad (8\text{-}498)$$

$$refIdxLXA_1 = RefIdxLX[xNbA_1][yNbA_1] \quad (8\text{-}499)$$

$$predFagLXA_1 = PredFlagLX[xNbA_1][yNbA_1] \quad (8\text{-}500)$$

The derivation process for subblock-based temporal merging candidates as specified in clause 8.5.5.3 is invoked with the luma location (xCb,yCb), the luma coding block width cbWidth, the luma coding block height cbHeight, the availability flag availableFlagA$_1$, the reference index refIdxLXA$_1$, the prediction list utilization flag predFlagLXA$_1$, and the motion vector mvLXA$_1$ as inputs and the output being the availability flag availableFlagSbCol, the number of luma coding subblocks in horizontal direction numSbXCol and in vertical direction numSbYCol, the reference indices refIdxLXSbCol, the luma motion vectors mvLXSbCol[xSbIdx][ySbIdx] and the prediction list utilization flags predFlagLXSbCol[xSbIdx][ySbIdx] with xSbIdx=0 . . . numSbXCol−1, ySbIdx=0 . . . numSbYCol−1 and X being 0 or 1.

2. When sps_affine_enabled_flag is equal to 1, the sample locations (xNbA$_0$,yNbA$_0$), (xNbA$_1$,yNbA$_1$), (xNbA$_2$,yNbA$_2$), (xNbB$_0$,yNbB$_0$), (xNbB$_1$,yNbB$_1$), (xNbB$_2$,yNbB$_2$), (xNbB$_3$,yNbB$_3$), and the variables numSbXAff and numSbYAff are derived as follows:

$$(xA_0, yA_0) = (xCb-1, yCb+cbHeight) \quad (8\text{-}501)$$

$$(xA_1, yA_1) = (xCb-1, yCb+cbHeight-1) \quad (8\text{-}502)$$

$$(xA_2, yA_2) = (xCb-1, yCb) \quad (8\text{-}503)$$

$$(xB_0, yB_0) = (xCb+cbWidth, yCb-1) \quad (8\text{-}504)$$

$$(xB_1, yB_1) = (xCb+cbWidth-1, yCb-1) \quad (8\text{-}505)$$

$$(xB_2, yB_2) = (xCb-1, yCb-1) \quad (8\text{-}506)$$

$$(xB_3, yB_3) = (xCb, yCb-1) \quad (8\text{-}507)$$

3. When sps_affine_enabled_flag is equal to 1, the variable availableFlagA is set equal to FALSE and the following applies for (xNbA$_k$,yNbA$_k$) from (xNbA$_0$,yNbA$_0$) to (xNbA$_1$,yNbA$_1$):
. . .

8. When numCurrMergeCand is less than MaxNumSubblockMergeCand, the following is repeated until numCurrMergeCand is equal to MaxNumSubblockMergeCand, with mvZero[0] and mvZero[1] both being equal to 0:

The reference indices, the prediction list utilization flags and the motion vectors of zeroCand$_m$ with m equal to (numCurrMergeCand−numOrigMergeCand) are derived as follows:

$$refIdxL0ZeroCand_m = 0 \quad (8\text{-}515)$$

$$predFlagL0ZeroCand_m = 1 \quad (8\text{-}516)$$

$$cpMvL0ZeroCand_m[0] = mvZero \quad (8\text{-}517)$$

$$cpMvL0ZeroCand_m[1] = mvZero \quad (8\text{-}518)$$

$$cpMvL0ZeroCand_m[2] = mvZero \quad (8\text{-}519)$$

$$refIdxL1ZeroCand_m = (slice\_type == B) ? 0 : -1 \quad (8\text{-}520)$$

$$predFlagL1ZeroCand_m = (slice\_type == B) ? 1 : 0 \quad (8\text{-}521)$$

$$cpMvL1ZeroCand_m[0] = mvZero \quad (8\text{-}522)$$

$$cpMvL1ZeroCand_m[1] = mvZero \quad (8\text{-}523)$$

$$cpMvL1ZeroCand_m[2] = mvZero \quad (8\text{-}524)$$

$$motionModelIdcZeroCand_m = 1 \quad (8\text{-}525)$$

$$bcwIdxZeroCand_m = 0 \quad (8\text{-}526)$$

The candidate zeroCand$_m$ with m equal to (numCurrMergeCand−numOrigMergeCand) is added at the end of subblockMergeCandList and numCurrMergeCand is incremented by 1 as follows:

$$subblockMergeCandList[numCurrMergeCand++] = zeroCand_m \quad (8\text{-}527)$$

The variables refIdxL0, refIdxL1, predFlagL0[xSbIdx][ySbIdx], predFlagL1[xSbIdx][ySbIdx], mvL0[xSbIdx][ySbIdx], mvL1[xSbIdx][ySbIdx], mvCL0[xSbIdx][ySbIdx], and mvCL1[xSbIdx][ySbIdx] with xSbIdx=0 . . . numSbX−1, ySbIdx=0 . . . numSbY−1 are derived as follows:

If subblockMergeCandList[merge_subblock_idx[xCb][yCb]] is equal to SbCol, numSbX is set equal to numSbXCol, numSbY is set equal to numSbYCol, the bi-prediction weight index bcwIdx is set equal to 0 and the following applies with X being 0 or 1:

$$refIdxLX = refIdxLXSbCol \quad (8\text{-}528)$$

For xSbIdx=0 . . . numSbX−1, ySbIdx=0 . . . numSbY−1, the following applies:

$$predFlagLX[xSbIdx][ySbIdx] = predFlagLXSbCol[xSbIdx][ySbIdx] \quad (8\text{-}529)$$

$$mvLX[xSbIdx][ySbIdx][0] = mvLXSbCol[xSbIdx][ySbIdx][0] \quad (8\text{-}530)$$

$$mvLX[xSbIdx][ySbIdx][1] = mvLXSbCol[xSbIdx][ySbIdx][1] \quad (8\text{-}531)$$

When predFlagLX[xSbIdx][ySbIdx], is equal to 1, the derivation process for chroma motion vectors in clause 8.5.2.13 is invoked with mvLX[xSbIdx][ySbIdx] and refIdxLX as inputs, and the output being mvCLX[xSbIdx][ySbIdx].

The following assignment is made for x=xCb . . . xCb+cbWidth−1 and y=yCb . . . yCb+cbHeight−1:

$$MotionModelIdc[x][y] = 0 \quad (8\text{-}532)$$

Figure 10:
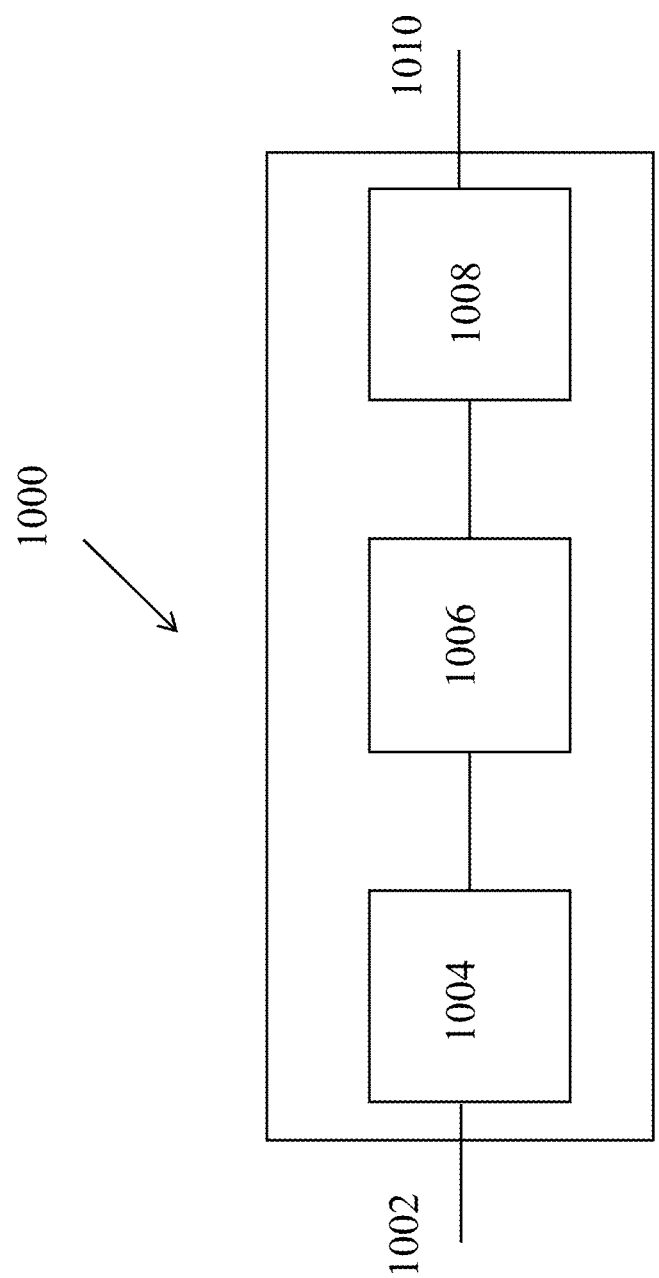
FIG. 10 is a block diagram of an example video processing system in which disclosed techniques may be implemented.

Otherwise (subblockMergeCandList[merge_subblock_idx[xCb][yCb]] is not equal to SbCol), numSbX is set equal to numSbXAff; numSbY is set equal to numSbYAff and the following applies with X being 0 or 1:

The following assignments are made with N being the candidate at position merge_subblock_idx[xCb][yCb] in the subblock merging candidate list subblockMergeCandList (N=subblockMergeCandList[merge_subblock_idx[xCb][yCb]]):

FIG. 10 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1000 may include a coding component 1004 that may implement the various coding or encoding methods described in the present document. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 11:
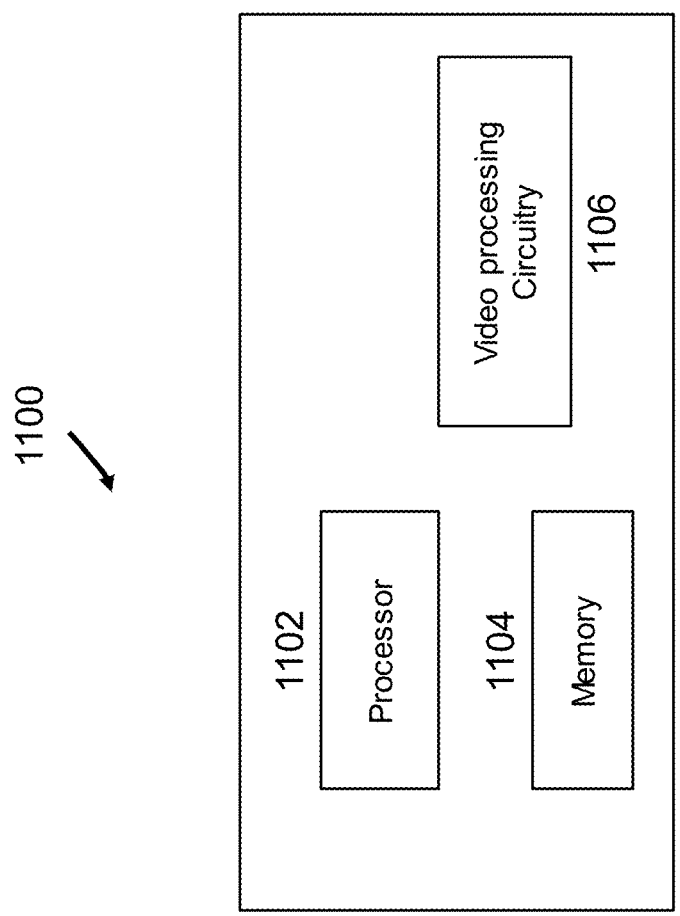
FIG. 11 is a block diagram of an example implementation of a hardware platform for video processing.

FIG. 11 is a block diagram of a video processing apparatus 1100. The apparatus 1100 may be used to implement one or more of the methods described herein. The apparatus 1100 may be embodied in a smartphone, tablet, computer, Internet of Things (IoT) receiver, and so on. The apparatus 1100 may include one or more processors 1102, one or more memories 1104 and video processing hardware 1106. The processor(s) 1102 may be configured to implement one or more methods described in the present document. The memory (memories) 1104 may be used for storing data and code used for implementing the methods and techniques described herein. The video processing hardware 1106 may be used to implement, in hardware circuitry, some techniques described in the present document. In some embodiments, the hardware 1106 may be entirely or partly in the processor 1101, e.g., as a graphics processor.

Figure 16:
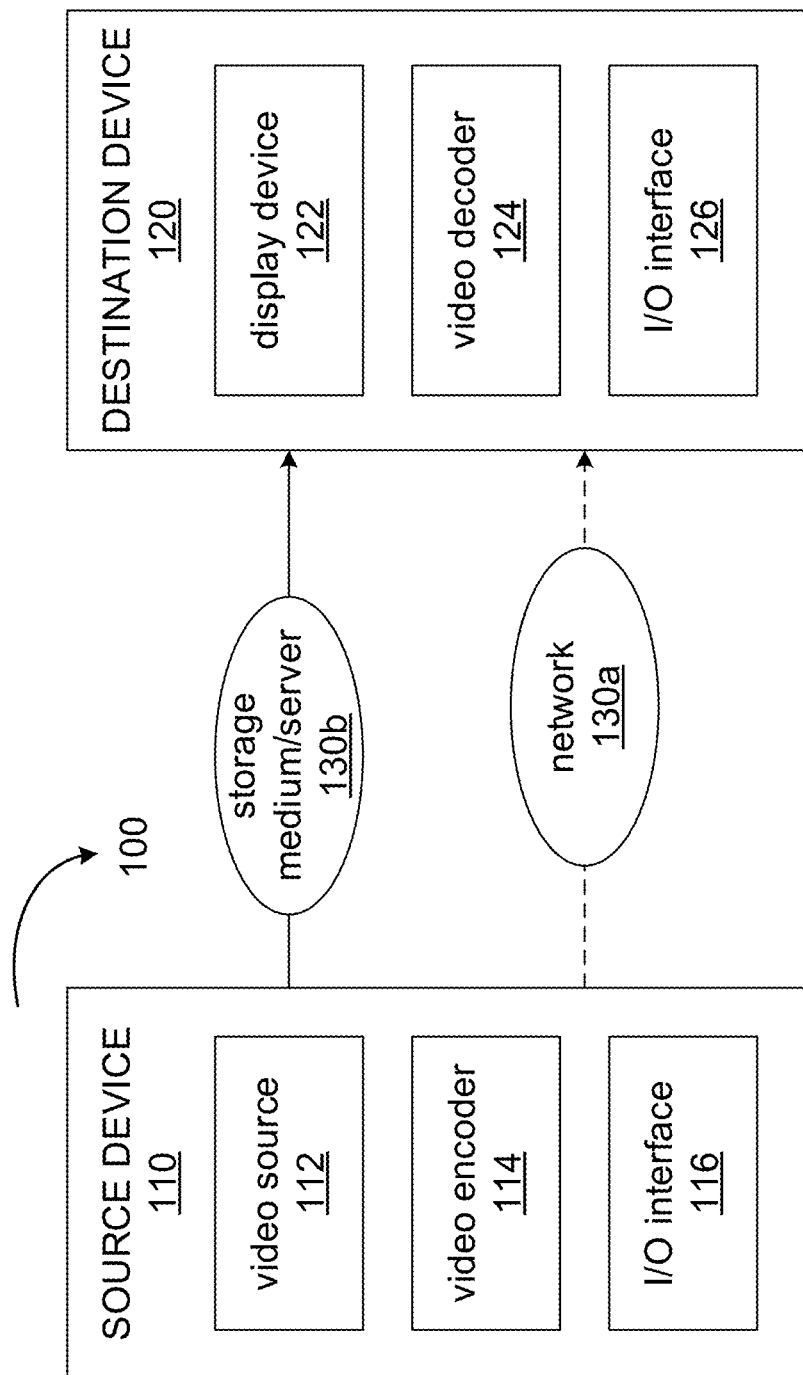
FIG. 16 is a block diagram that illustrates an example video coding system.

FIG. 16 is a block diagram that illustrates an example video coding system 100 that may utilize the techniques of this disclosure.

As shown in FIG. 16, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 17:
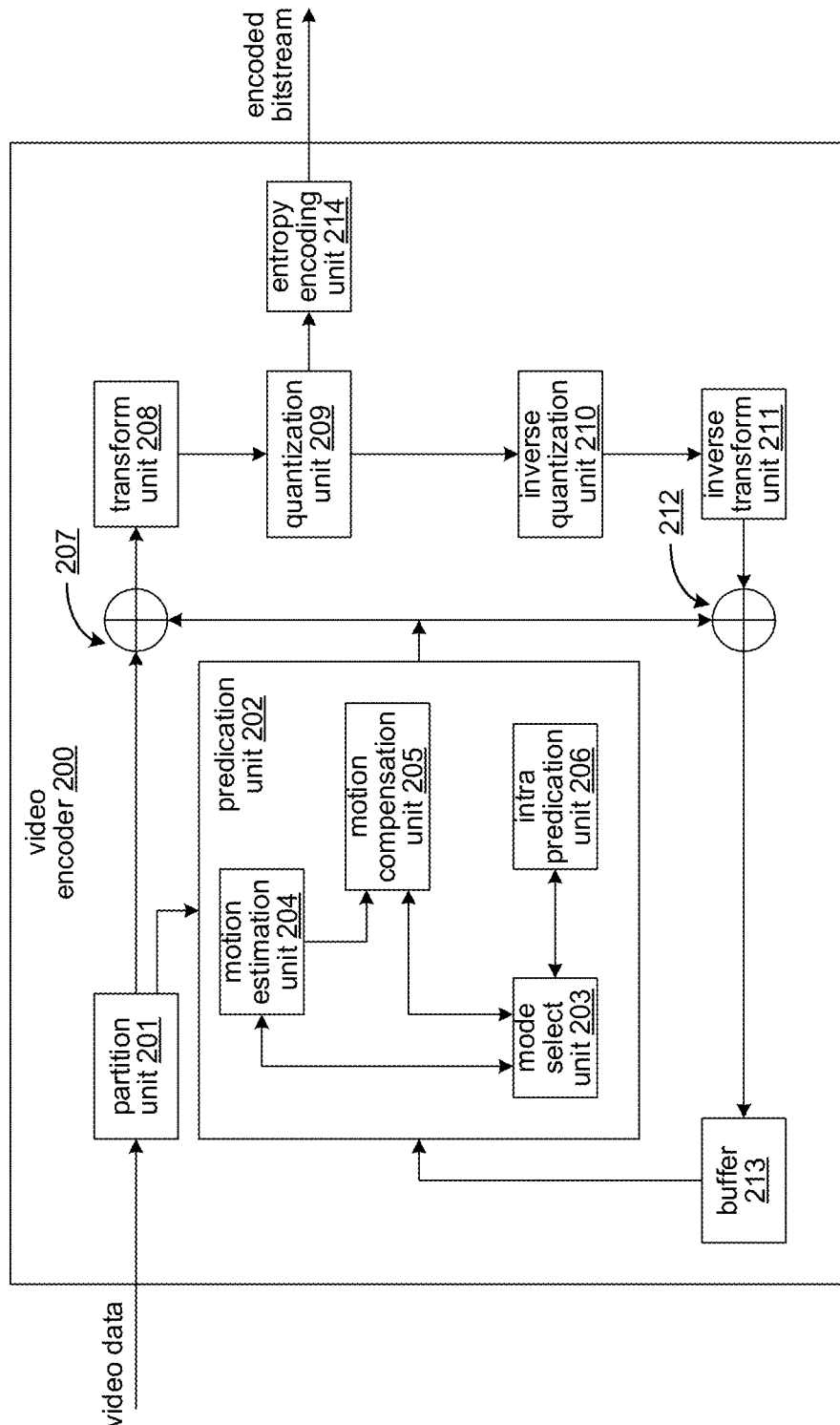
FIG. 17 is a block diagram that illustrates an encoder in accordance with some embodiments of the disclosed technology.

FIG. 17 is a block diagram illustrating an example of video encoder 200, which may be video encoder 114 in the system 100 illustrated in FIG. 16.

Video encoder 200 may be configured to perform any or all of the techniques of this disclosure. In the example of FIG. 17, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 17 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 18:
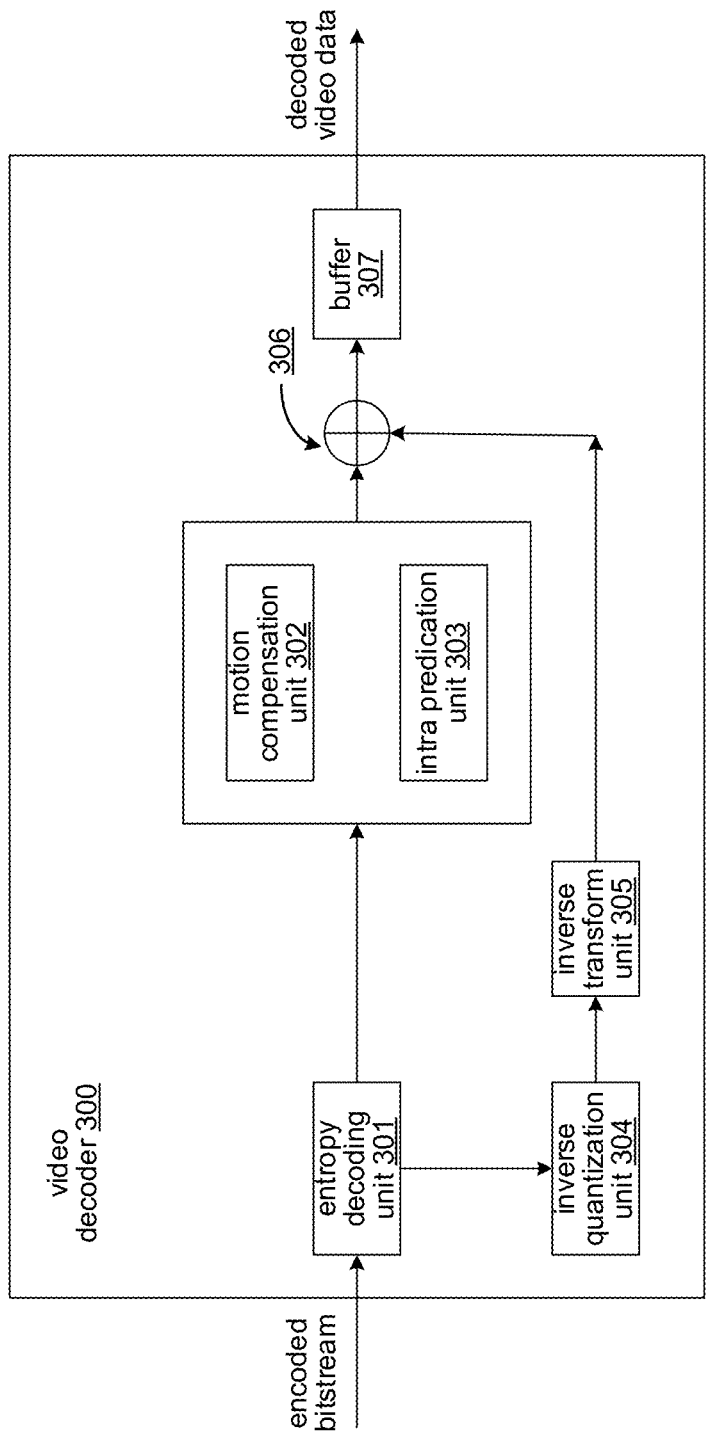
FIG. 18 is a block diagram that illustrates a decoder in accordance with some embodiments of the disclosed technology.

FIG. 18 is a block diagram illustrating an example of video decoder 300 which may be video decoder 114 in the system 100 illustrated in FIG. 16.

The video decoder 300 may be configured to perform any or all of the techniques of this disclosure. In the example of FIG. 18, the video decoder 300 includes a plurality of functional components. The techniques described in this disclosure may be shared among the various components of the video decoder 300. In some examples, a processor may be configured to perform any or all of the techniques described in this disclosure.

In the example of FIG. 18, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (e.g., FIG. 17).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bit stream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present document, the term "video processing" may refer to video encoding video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The following first set of clauses may be implemented in some embodiments.

The following clauses may be implemented together with additional techniques described in items listed in the previous section (e.g., item 1).

Figure 12:
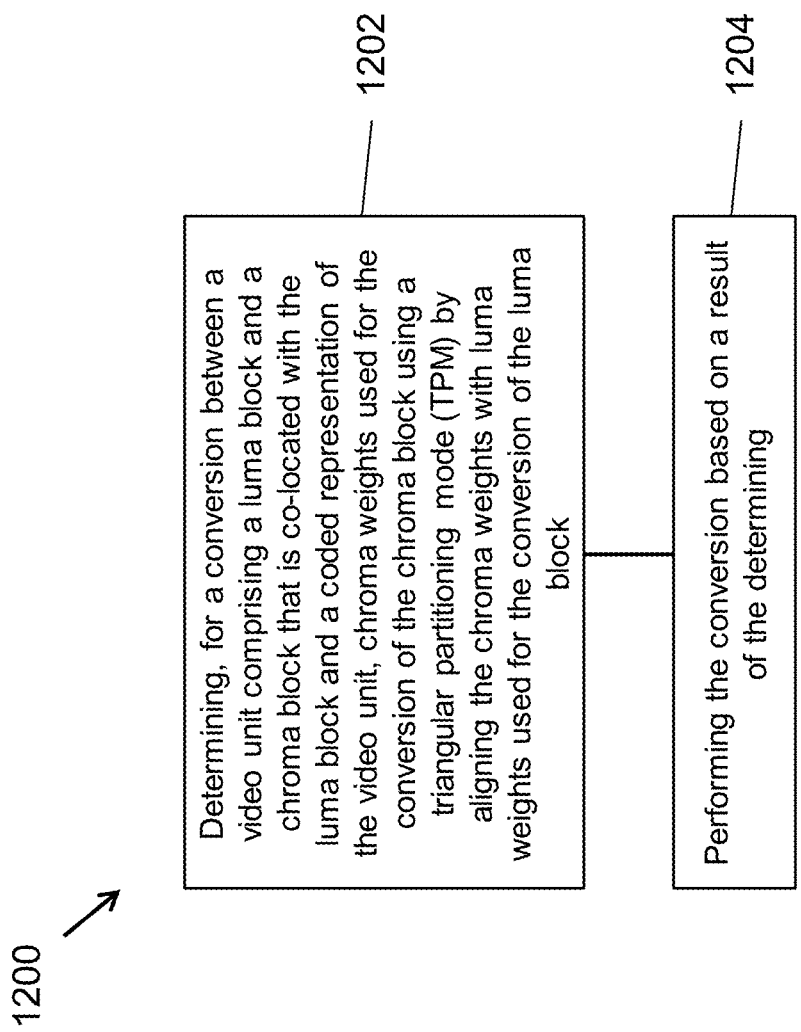
FIG. 12 is a flowchart for an example method of video processing.

1. A method of video processing (e.g., method 1200 shown in FIG. 12), comprising: determining (1202), for a conversion between a video unit comprising a luma block and a chroma block that is co-located with the luma block and a coded representation of the video unit, chroma weights used for the conversion of the chroma block using a triangular partitioning mode (TPM) by aligning the chroma weights with luma weights used for the conversion of the luma block; and performing (1204) the conversion based on a result of the determining.

2. The method of clause 1, wherein the chroma weights are determined as a function of the luma weights.

3. The method of any of clauses 1-2, wherein the chroma weights are a subset of the luma weights.

4. The method of any of clauses 1-3, wherein chroma weights are equal to luma weights for a equal-sized portion of the luma block that coincides with the chroma block.

The following clauses may be implemented together with additional techniques described in items listed in the previous section (e.g., item 2).

5. A method of video processing, comprising: determining, for a conversion between a video unit comprising a luma block and a chroma block that is co-located with the luma block and a coded representation of the video unit, chroma weights used for the conversion of the chroma block using a triangular partitioning mode (TPM) based on a characteristic of the luma block or a characteristic of the video unit; and performing the conversion based on a result of the determining.

6. The method of clause 5, wherein the characteristic of the luma block includes a height or a width of the luma block.

7. The method of any of clauses 5-6, wherein the characteristic of the video unit includes a color format of the video unit or a chroma subsampling ratio of the video unit.

8. The method of any of clauses 5-7, wherein the chroma weights further depend on a color component identity of the chroma block.

The following clauses may be implemented together with additional techniques described in items listed in the previous section (e.g., item 3).

9. The method of any of clauses 1-8, wherein the chroma weights and/or the luma weights are equal to an integer.

The following clauses may be implemented together with additional techniques described in items listed in the previous section (e.g., item 4).

10. A method of video processing, comprising: determining, for a conversion between a video unit of a video comprising a luma block and a chroma block that is co-located with the luma block and a coded representation of the video unit, whether a triangular partitioning mode (TPM) is used for the conversion based on a characteristic the video unit; and performing the conversion based on a result of the determining.

11. The method of clause 10, wherein the characteristic is a dimension ratio is equal to max(H,W)/min(H, W), where max and min are maximum and minimum functions, and H and W are a height and a width in pixels of the video unit.

12. The method of clause 10, wherein the characteristic is a dimension ratio is equal to Abs(Log 2(cbWidth)−Log 2(cbHeight)), where Abs is absolute function, cbWidth and cbHeight are a pixel width and a pixel height of the chroma block.

13. The method of clause 10, wherein the result of the determining is that the TPM is disabled due to the dimension ratio being greater than 2.

The following clauses may be implemented together with additional techniques described in items listed in the previous section (e.g., item 5).

14. The method of clause 10, wherein the characteristic of the video unit comprises a maximum transform size used for the conversion of the video.

15. The method of clause 14, wherein the determining disables use of the TPM due to the video unit having a height or a width greater than the maximum transform size.

The following clauses may be implemented together with additional techniques described in items listed in the previous section (e.g., item 6).

16. The method of clause 10, wherein the characteristic of the video unit comprises a maximum coding unit size used during the conversion of the video.

17. The method of clause 16, wherein the determining disables use of the TMP due to a height or a width of the unit being equal to the maximum coding unit size.

The following clauses may be implemented together with additional techniques described in items listed in the previous section (e.g., item 7).

18. The method of clause 10, wherein the characteristic of the video unit comprises a height or a width of the video unit, and wherein the determining disables use of TMP due to the height being greater than N or the width being greater that M.

The following clauses may be implemented together with additional techniques described in items listed in the previous section (e.g., item 8).

19. The method of clause 10, wherein the characteristic of the video unit comprises a height or a width of the video unit, and wherein the determining disables use of TMP due to the height being N or the width being M.

The following clauses may be implemented together with additional techniques described in items listed in the previous section (e.g., item 9).

20. The method of clause 10, wherein the characteristic of the video unit comprises a chroma format of the video unit, and wherein the determining disables use of TMP due to the chroma format being a specific format.

21. The method of clause 20, wherein the specific format is 4:0:0.

The following clauses may be implemented together with additional techniques described in items listed in the previous section (e.g., item 10).

22. The method of clause 1, wherein the characteristic of the video unit comprises resolutions of reference pictures used in the conversion of the video unit, and wherein the determining disables use of TMP due to the resolutions being different from each other.

The following clauses may be implemented together with additional techniques described in items listed in the previous section (e.g., item 11).

23. The method of any of above clauses, wherein the coded representation omits a syntax element for TMP syntax elements in case that the TPM mode is determined to be disabled.

24. The method of any of clauses 1 to 23, wherein the conversion comprises encoding the video into the coded representation.

25. The method of any of clauses 1 to 23, wherein the conversion comprises decoding the coded representation to generate pixel values of the video.

26. A video decoding apparatus comprising a processor configured to implement a method recited in one or more of clauses 1 to 25.

27. A video encoding apparatus comprising a processor configured to implement a method recited in one or more of clauses 1 to 25.

28. A computer program product having computer code stored thereon, the code, when executed by a processor, causes the processor to implement a method recited in any of clauses 1 to 25.

29. A method, apparatus or system described in the present document.

The second set of clauses describe certain features and aspects of the disclosed techniques in the previous section (e.g., item 15).

Figure 19:
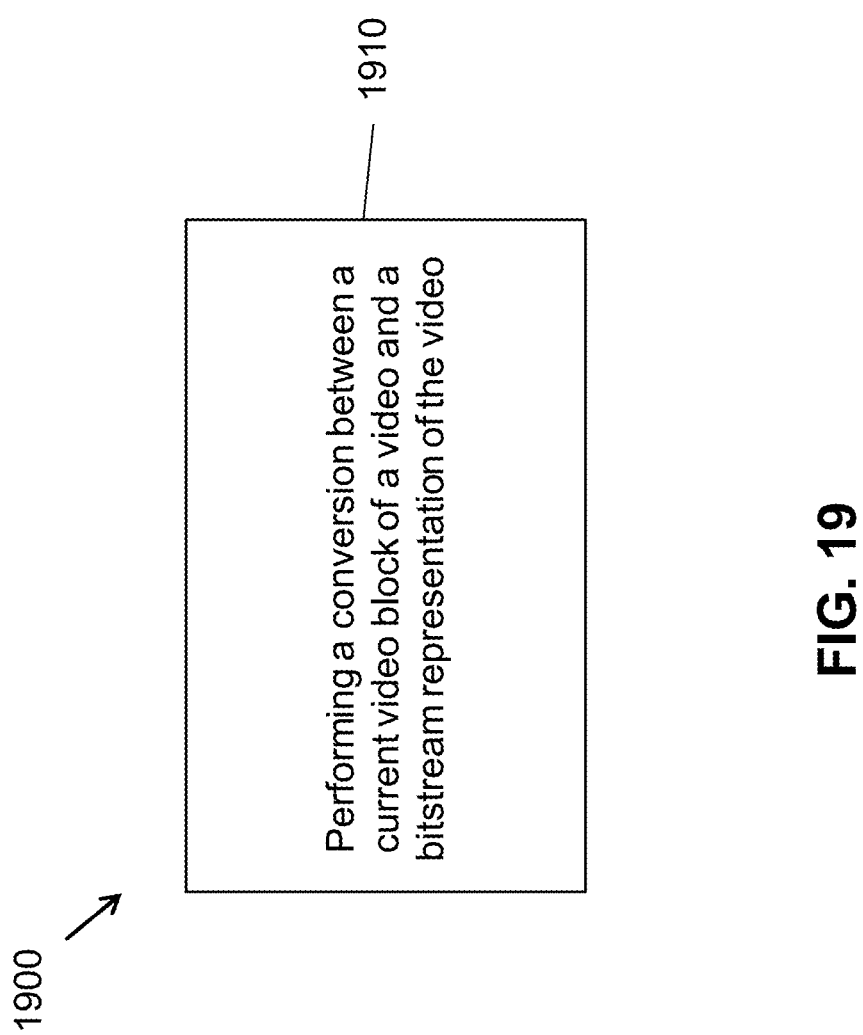
FIG. 19 shows a flowchart for an example method of video processing based on some implementations of the disclosed technology.

1. A method (e.g., method 1900 shown in FIG. 19) of video processing, comprising: performing (1910) a conversion between a current video block of a video and a bitstream representation of the video according to a rule, wherein a partitioning prediction mode is used for coding the current video block in which a final prediction is determined for the current video block as a weighted sum of two or more predictions of the current video block; wherein the partitioning prediction mode is a first mode which is based on multiple first partitioning schemes or a second mode which is based on multiple second partitioning schemes; and wherein the rule specifies a coding operation that is used for coding using the first mode or the second mode.

2. The method of clause 1, wherein the first mode is a triangular partitioning mode and the second mode is a geometric partitioning mode.

3. The method of clause 1 or 2, wherein the multiple first partitioning schemes are a subset of the multiple second partitioning schemes.

4. The method of clause 2, wherein the geometric partitioning mode includes the multiple second partitioning schemes and wherein at least one of the multiple second partitioning schemes divides the current video block into two sub-partitions such that at least one of the two sub-partitions is non-square and non-rectangular.

5. The method of clause 2, wherein the geometric partitioning mode comprises a triangular partitioning mode.

6. The method of clause 1, wherein the first mode is a triangular partitioning mode and the second mode is a non-triangular partitioning mode.

7. The method of clause 1, where the partitioning prediction mode is a geometric partitioning mode that splits the current video block that is a rectangular block into either two triangular sub-partitions or two non-triangular sub-partitions.

8. The method of clause 1, wherein the rule specifies that the first mode and the second mode is signaled as a single mode.

9. The method of clause 8, wherein the first mode and the second mode share a same control flag at a sequence parameter set (SPS), a video parameter set (VPS), an active parameter set (APS), a picture parameter set (PPS), a slice, a sub-picture, a tile, a brick, a virtual pipeline data unit (VPDU), a coding tree unit (CTU), a transform unit (TU), a coding unit (CU), a prediction unit (PU), a picture header, or a slice header level.

10. The method of clause 8, wherein the first mode is signaled as a subset of the second mode.

11. The method of clause 10, wherein the second mode is defined as a prediction mode that contains N sub-modes and denoted as $\{M_0, M_1, M_2, \ldots, M_{N-1}\}$, and the first mode is defined as another prediction mode which contains X sub-modes and denoted as $\{M_0, M_{k0}, M_{k1}, \ldots, M_{kX-1}\}$, where $\{M_0, M_{k0}, M_{k1}, \ldots, M_{kX-1}\}$ is a subset of $\{M_0, M_1, M_2, \ldots, M_{N-1}\}$, whereby N is an integer greater than 1 and greater than X.

12. The method of clause 5, wherein a first syntax element is signaled to indicate whether the second mode is applied and/or a second syntax element is signaled to indicate whether the first mode is applied.

13. The method of clause 1, wherein the rule specifies that the first mode and the second mode share a logic used to calculate a blending weight mask used to determine the final prediction.

14. The method of clause 1, wherein the rule specifies that the first mode and the second mode share a logic used to calculate a motion storage mask used to store motion.

15. The method of clause 13 or 14, wherein the blending weight mask or the motion storage mask is derived using a same table for the first mode and the second mode.

16. The method of any of clauses 1 to 15, wherein the conversion includes encoding the video into the bitstream representation.

17. The method of any of clauses 1 to 15, wherein the conversion includes decoding the bitstream representation to generate the video.

18. A video processing apparatus comprising a processor configured to implement a method recited in any one or more of clauses 1 to 17.

19. A computer readable medium storing program code that, when executed, causes a processor to implement a method recited in any one or more of clauses 1 to 17.

20. A computer readable medium that stores a coded representation or a bitstream representation generated according to any of the above described methods.

The third set of clauses describe certain features and aspects of the disclosed techniques in the previous section (e.g., items 16-18).

1. A method of video processing, comprising: performing a conversion between a current video block of a video and a bitstream representation of the video, wherein, during the conversion, a prediction of the current video block is determined as a weighted sum of two or more predictions of the current video block, and a motion vector storing process for the current video block is determined according to a rule, wherein the current video block uses a partitioning prediction mode that is a first mode which is based on multiple first partitioning schemes or a second mode which is based on multiple second partitioning schemes, and wherein the rule specifies that a process used for determining which motion vector and how many motion vectors are stored is same for the first mode or the second mode.

2. The method of clause 1, where the partitioning prediction mode is a geometric partitioning mode that splits the current video block that is a rectangular block into either two triangular sub-partitions or two non-triangular sub-partitions.

3. The method of clause 1, wherein the first mode and the second mode include partitioning the current video block to two or more partitions.

4. The method of clause 3, wherein at least one partition resulted from the partitioning of the current video block has an angular edge.

5. The method of clause 1, wherein the first mode is a triangular partitioning mode and the second mode is a geometric partitioning mode.

6. The method of clause 1, wherein the first mode is a triangular partitioning mode and the second mode is a non-triangular partitioning mode.

7. The method of clause 5, wherein the geometric partitioning mode includes the multiple second partitioning schemes and wherein at least one of the multiple second partitioning scheme divides the current video block into two sub-partitions such that at least one of the two sub-partitions is non-square and non-rectangular.

8. The method of clause 5, wherein the geometric partitioning mode comprises a triangular partitioning mode.

9. The method of clause 1, wherein the rule specifies which motion vector of two inter-predicted partitions is stored for the current video block.

10. The method of clause 1, wherein the rule specifies whether at least one of a L0 motion vector or a L1 motion vector is stored for the current video block.

11. The method of clause 1, wherein the rule specifies the motion vector storing only for allowable combinations of a width and a height of the current video block.

12. The method of clause 1, wherein the rule specifies that each element of the stored motion vector indicates i) one or more motion vectors for one of two or more partitions, ii) a number of motion vectors, and/or iii) an inter-prediction direction is stored for an N×N sub-block of the current video block, whereby N is an integer greater than 0.

13. The method of clause 12, wherein N is equal to 4.

14. The method of clause 1, wherein the rule specifies that the motion vector storing a logic, a rule, and/or a procedure is computed based on N pre-defined tables, whereby N is an integer greater than 0.

15. The method of clause 1, wherein the rule specifies that the motion vector storing a logic, a rule, and/or a procedure is calculated using computing equations.

16. A method of video processing, comprising: performing a conversion between a current block of a video and a bitstream representation of the video, wherein, during the conversion, a prediction block for the current block is determined using motion information in a 4×4 unit, and wherein the current block is coded with a partitioning mode.

17. The method of clause 16, wherein the current video block is partitioned to two or more partitions by using the partitioning mode.

18. The method of clause 16, wherein the partitioning mode is a geometric partitioning mode which includes multiple partitioning schemes and wherein at least one of the multiple partitioning schemes divides the current video block into two sub-partitions such that at least one of the two sub-partitions is non-square and non-rectangular.

19. The method of clause 18, wherein the geometric partitioning mode comprises a triangular partitioning mode.

20. The method of clause 16, wherein the partitioning mode is a geometric partitioning mode that splits the current video block that is a rectangular block into either two triangular sub-partitions or two non-triangular sub-partitions.

21. The method of clause 16, wherein at least one partition resulted from the partitioning mode has an angular edge.

22. The method of clause 16, wherein the partitioning mode is a triangular partitioning mode or a geometric partitioning mode.

23. The method of clause 17, wherein at least one of the two or more partitions has a corresponding motion vector used for motion compensation.

24. The method of clause 16, wherein the 4×4 unit includes a motion vector of the current video block stored for spatial or temporal motion vector candidates.

25. The method of clause 16, wherein each of 4×4 sub-blocks of the current video block has its own motion vectors stored in a buffer.

26. A method of video processing, comprising: performing a conversion between a current block of a video and a bitstream representation of the video, wherein the current block is coded using a partitioning mode, wherein, during the conversion, a prediction block for the current block is determined by blending two or more predictions in a blending area of the current video block according to a rule, and wherein the rule specifies that an L0 motion vector and an L1 motion vector are stored for sub-blocks that belong to the blending area of the current video block.

27. The method of clause 26, wherein the current video block is partitioned to two or more partitions by using the partitioning mode.

28. The method of clause 26, wherein the partitioning mode is a geometric partitioning mode which includes multiple partitioning schemes and wherein at least one partitioning scheme divides the current video block into two sub-partitions such that at least one of the two sub-partitions is non-square and non-rectangular.

29. The method of clause 28, wherein the geometric partitioning mode comprises a triangular partitioning mode.

30. The method of clause 26, wherein at least one partition resulted from the partitioning mode has an angular edge.

31. The method of clause 26, wherein the partitioning mode is a triangular partitioning mode or a geometric partitioning mode.

32. The method of clause 27, wherein the blending area indicates a region that is overlapped by the two or more partitions.

33. The method of clause 26, wherein, in a weighting process which is applied to generate a final prediction for a 4×4 subblock within the blending area as a weighted sum of prediction samples, none of weights of prediction samples of the 4×4 subblock within the blending area is equal to 0.

34. The method of clause 26, wherein the rule specifies that, for 4×4 sub-blocks outside the blending area of the current video block, a uni-prediction motion vector of a partition is stored.

35. The method of clause 27, wherein the rule specifies that, for 4×4 sub-blocks belonging to the blending area of the current video block, bi-prediction motion vector of the two or more partitions are stored.

36. The method of clause 35, wherein the rule specifies that in case that two partitions have motion vectors from a same direction, one of a minimum, maximum, average, or weighted motion vector among two motion vectors is stored for the sub-blocks.

37. The method of clause 35, wherein the rule specifies that in case that two partitions have motion vectors from a same direction, a predefined motion vector of the two partitions is stored for the sub-blocks.

38. The method of any of clauses 1 to 37, wherein the performing of the conversion includes generating the coded representation from the current video block.

39. The method of any of clauses 1 to 37, wherein the performing of the conversion includes generating the current video block from the coded representation.

40. A video processing apparatus comprising a processor configured to implement a method recited in any one or more of clauses 1 to 39.

41. A computer readable medium storing program code that, when executed, causes a processor to implement a method recited in any one or more of clauses 1 to 39.

42. A computer readable medium that stores a coded representation or a bitstream representation generated according to any of the above described methods.

The fourth set of clauses describe certain features and aspects of the disclosed techniques in the previous section (e.g., items 19 and 20).

Figure 20A:
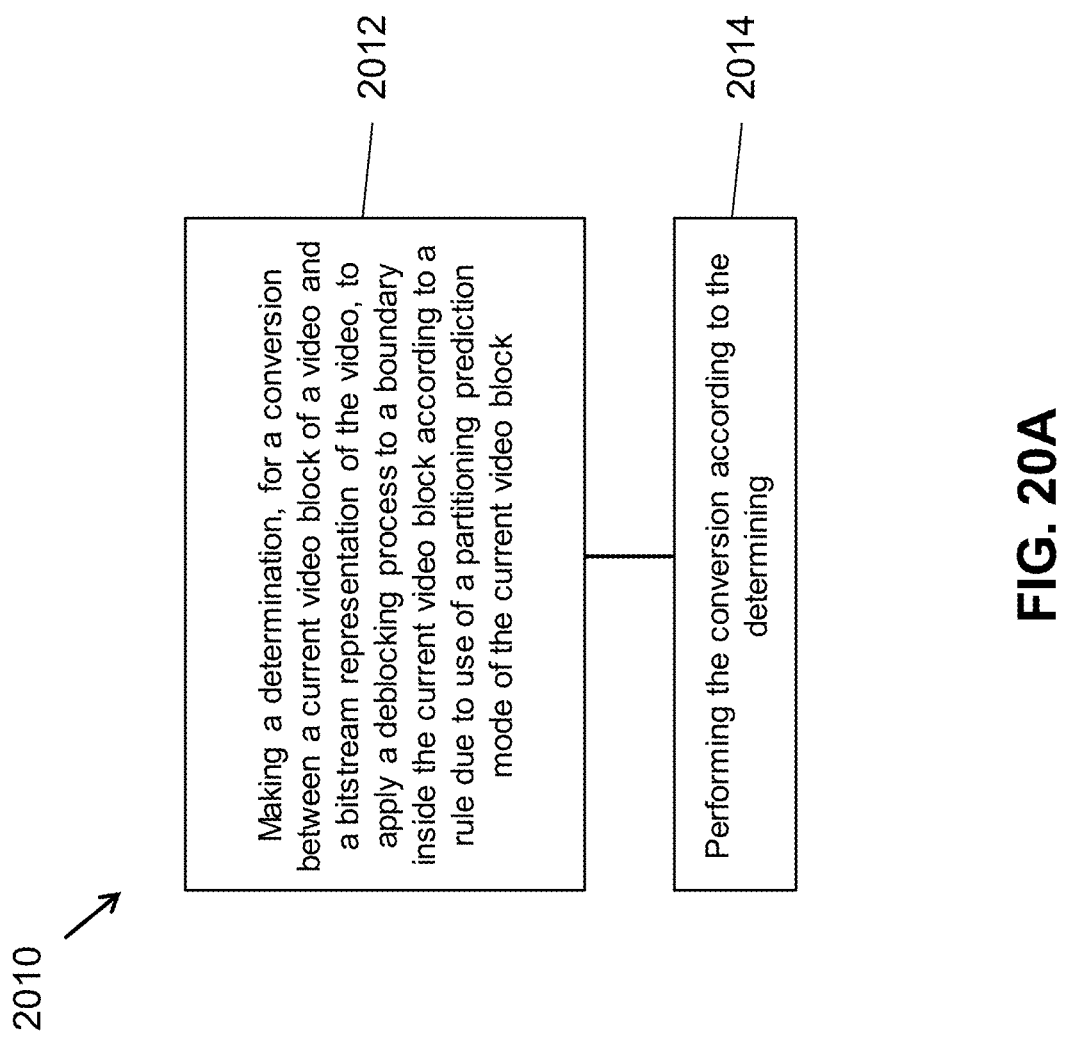
FIGS. 20A and 20B show flowcharts for example methods of video processing based on some implementations of the disclosed technology.

1. A method (e.g., method 2010 shown in FIG. 20A) of video processing, comprising: making (2012) a determination, for a conversion between a current video block of a video and a bitstream representation of the video, to apply a deblocking process to a boundary inside the current video block according to a rule due to use of a partitioning prediction mode of the current video block; and performing (2014) the conversion according to the determination, wherein use the partitioning prediction mode includes determining a final prediction for the current video block as a weighted sum of two or more predictions of the current video block.

2. The method of clause 1, wherein the current video block is split into two or more partitions.

3. The method of clause 1, wherein the partitioning prediction mode is a first mode in which the two or more predictions are based on multiple first partitioning schemes or a second mode in which the two or more predictions are based on multiple second partitioning schemes.

4. The method of clause 1, wherein the partitioning prediction mode is a first mode which is based on multiple first partitioning schemes or a second mode which is based on multiple second partitioning schemes.

5. The method of clause 1, wherein the first mode is a triangular partitioning mode and the second mode is a geometric partitioning mode.

6. The method of clause 5, wherein the geometric partitioning mode includes multiple second partitioning schemes and at least one of the multiple second partitioning scheme divides the current video block into two sub-partitions such that at least one of the two sub-partitions is non-square and non-rectangular.

7. The method of clause 5, wherein the geometric partitioning mode comprises a triangular partitioning mode.

8. The method of clause 1, wherein the rule specifies to apply the deblocking process across an edge across two sub-blocks of the current video block in case that the edge is a transform unit (TU) edge and one of the two sub-blocks has a non-zero coefficient, regardless of whether there is a motion difference between the two sub-blocks.

9. The method of clause 8, wherein there is no non-zero coefficients in the two sub-blocks.

10. The method of clause 9, wherein the rule specifies to apply the deblocking process in case that the two sub-blocks have all zero coefficient but a motion difference of the two sub-blocks is greater than a certain value, the deblocking process is applied.

11. The method of clause 9, wherein the rule specifies to apply the deblocking process in case that the two sub-blocks have all zero coefficient but a motion difference of the two sub-blocks is greater than a certain value, the deblocking process is not applied.

12. The method of clause 1, wherein the rule specifies that whether to trigger the deblocking process for an edge of two sub-blocks of the current video block that are coded in the partitioning prediction mode is dependent on whether the edge corresponds to a transform unit (TU) edge or a motion vector (MV) edge of the two sub-blocks.

13. The method of clause 12, wherein the rule specifies that the deblocking process is triggered in case that a motion difference of the two sub-blocks is greater than a certain value for the MV edge.

14. The method of clause 12, wherein the rule specifies that the deblocking process is triggered in case that there is non-zero coefficient in a sub-block that is located on a side of the TU edge.

15. The method of clause 1, wherein the rule specifies that the deblocking process is triggered for the edge that is both the TU edge and the MV edge, in case that 1) a motion difference of two sub-blocks of the current video block is greater than a certain value for the MV edge, or 2) that there is non-zero coefficient in a sub-block.

16. The method of clause 8 or 12, wherein the transform unit (TU) edge indicates an actual transform unit edge.

17. The method of clause 12, wherein the motion vector (MV) edge indicates a prediction unit (PU) edge or a sub-block edge that is aligned with a filtering gird.

18. The method of any of clauses 8, 10, 11, 13, 15, wherein the motion difference includes i) a motion vector difference of the two sub-blocks that is greater than T, and/or ii) different reference frame indexes, and/or iii) different reference POCs (picture order counts), and/or iv) different numbers of reference frames.

Figure 20B:
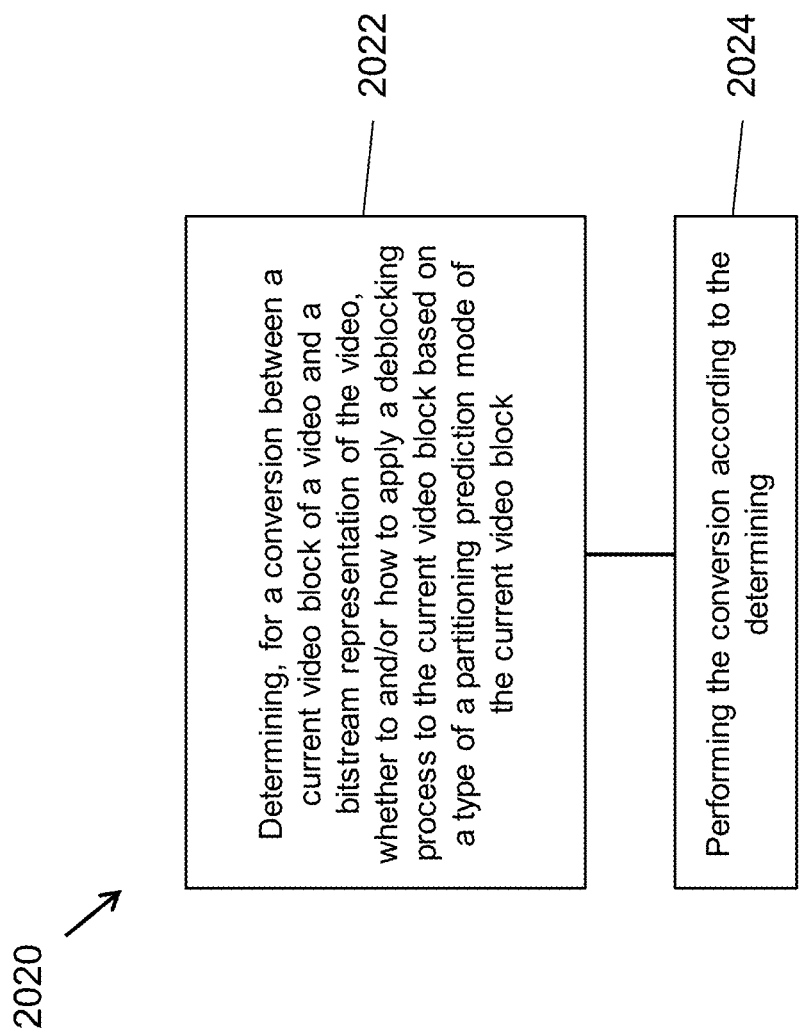

19. A method (e.g., method 2020 shown in FIG. 20B) of video processing, comprising: determining (2022), for a conversion between a current video block of a video and a bitstream representation of the video, whether to and/or how to apply a deblocking process to the current video block based on a type of a partitioning prediction mode of the current video block; and performing (2024) the conversion according to the determining, and wherein use of the partitioning prediction mode includes determining a final prediction for the current video block as a weighted sum of two or more predictions of the current video block.

20. The method of clause 19, wherein the type of the partitioning prediction mode includes a first mode in which the two or more predictions are based on a first partitioning scheme or a second mode in which the two or more predictions are based on a second partitioning scheme.

21. The method of clause 19, wherein the first mode is a triangular partitioning mode and the second mode is a geometric partitioning mode.

22. The method of clause 19, wherein a boundary between two sub-blocks of the current video block is filtered in the deblocking process.

23. The method of clause 19, wherein a vertical or horizontal boundary across two partitions of the current video block is filtered in the deblocking process.

24. The method of clause 19, wherein a boundary strength is equal to 1 or 2.

25. The method of any of clauses 1 to 24, wherein the performing of the conversion includes generating the coded representation from the current video block.

26. The method of any of clauses 1 to 24, wherein the performing of the conversion includes generating the current video block from the coded representation.

27. A video processing apparatus comprising a processor configured to implement a method recited in any one or more of clauses 1 to 26.

28. A computer readable medium storing program code that, when executed, causes a processor to implement a method recited in any one or more of clauses 1 to 26.

29. A computer readable medium that stores a coded representation or a bitstream representation generated according to any of the above described methods.

The fifth set of clauses describe certain features and aspects of the disclosed techniques in the previous section (e.g., items 21-29).

Figure 21A:
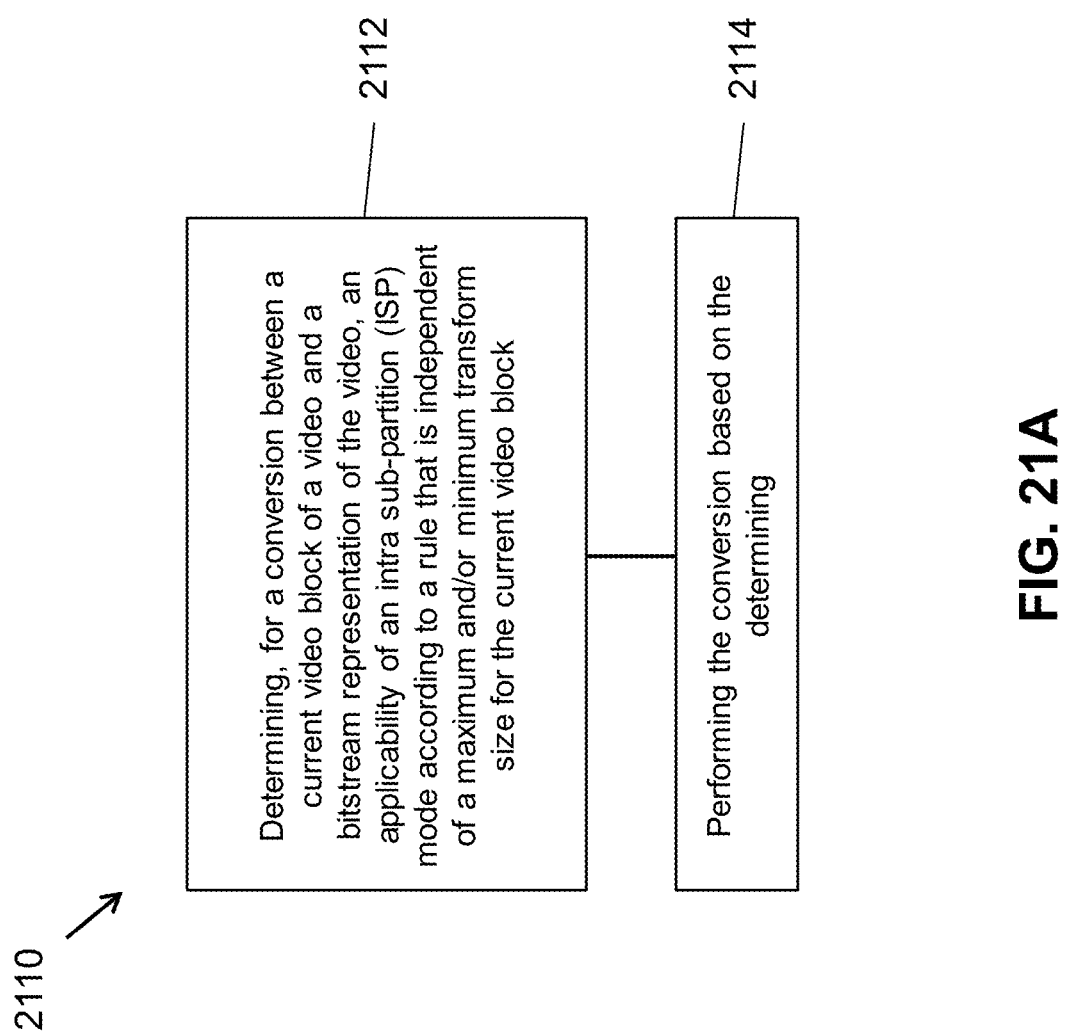
FIGS. 21A to 21E show flowcharts for example methods of video processing based on some implementations of the disclosed technology.

1. A method (e.g., method 2110 shown in FIG. 21A) of video processing, comprising: determining, for a conversion between a current video block of a video and a bitstream representation of the video, an applicability of an intra sub-partition (ISP) mode according to a rule that is independent of a maximum and/or minimum transform size for the current video block; and performing the conversion based on the determining.

2. The method of clause 1, wherein the ISP mode includes partitioning the current video block into subblocks.

3. The method of clause 1, wherein the rule specifies that signaling of an ISP flag is not dependent on whether a width of the current video block is less than or equal to the maximum transform size, and/or is not dependent on whether a height of current video block is less than or equal to the maximum transform size.

4. The method of clause 1, wherein the rule specifies that signaling of an ISP flag is not dependent on whether a multiplication of a width and a height of the current video block is greater than a square of the minimum transform size.

5. The method of clause 1, wherein the rule specifies that signaling of an ISP flag is dependent on whether a multiplication of a width and a height of the current video block is greater than N, whereby N is an integer greater than 0.

6. The method of clause 5, wherein N is a fixed value.

7. The method of clause 6, wherein N is 16.

8. The method of clause 5, wherein N is dependent on a minimum allowed transform size for a video unit.

9. The method of clause 1, wherein the rule specifies that signaling of an ISP flag is dependent on whether a width of the current video block is less than or equal to N, and/or dependent on whether a height of the current video block is less than or equal to N.

10. The method of clause 9, wherein N is a fixed value.

11. The method of clause 10, wherein N is 64.

12. The method of clause 9, wherein N is dependent on a maximum allowed transform size for a video unit.

Figure 21B:
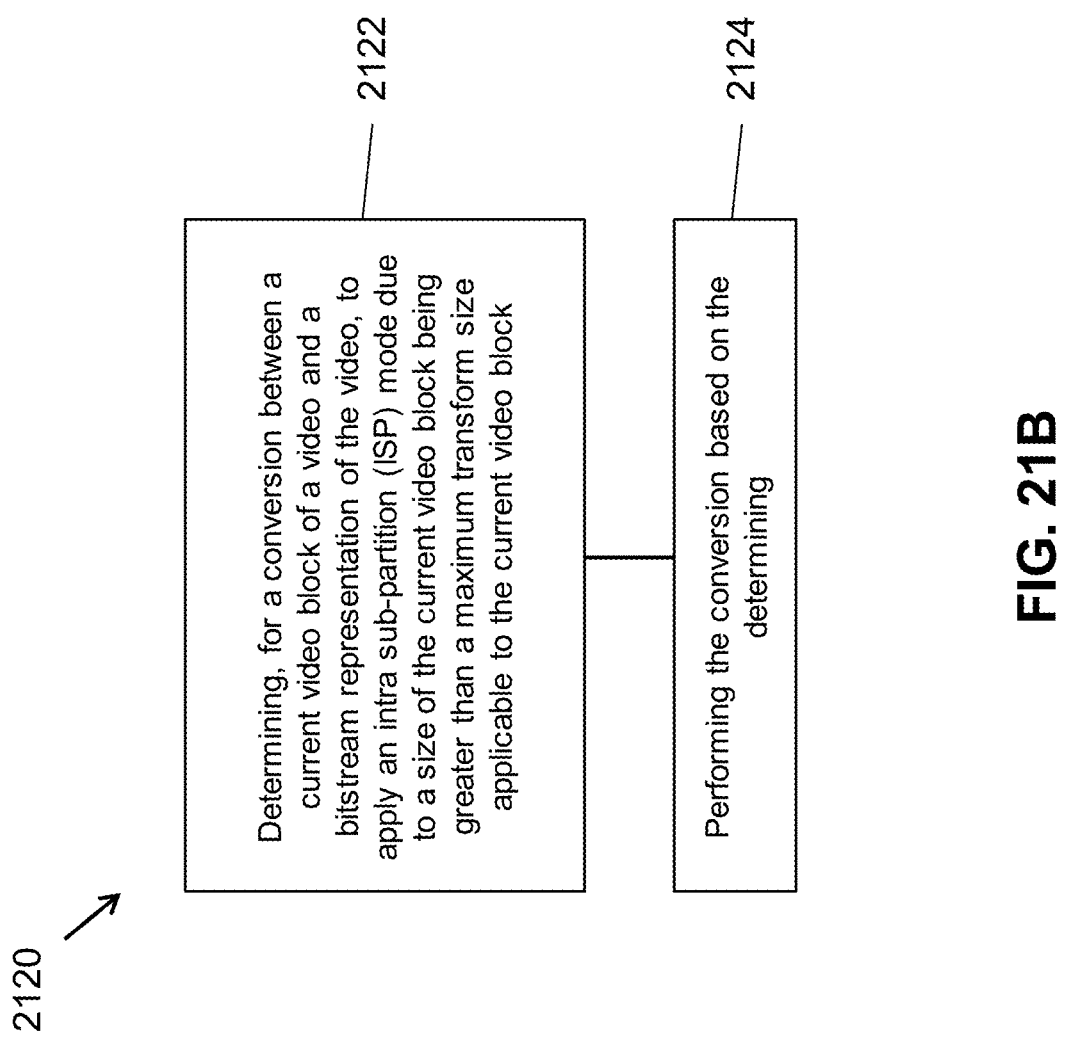

13. A method (e.g., method 2120 shown in FIG. 21B) of video processing, comprising: determining (2122), for a conversion between a current video block of a video and a bitstream representation of the video, to apply an intra sub-partition (ISP) mode due to a size of the current video block being greater than a maximum transform size applicable to the current video block; and performing (2124) the conversion based on the determining.

14. The method of clause 13, wherein the ISP mode includes partitioning the current video block into subblocks.

15. The method of clause 13, wherein in case that the current video block coded using the ISP mode is greater than the maximum transform size, the current video block is implicitly split by a recursive way until a subblock has a size of 64.

16. The method of clause 13, wherein in case that the current video block coded using the ISP mode is greater than the maximum transform size, the current video block is implicitly split by a recursive way until a subblock has a size of the maximum transform size.

Figure 21C:
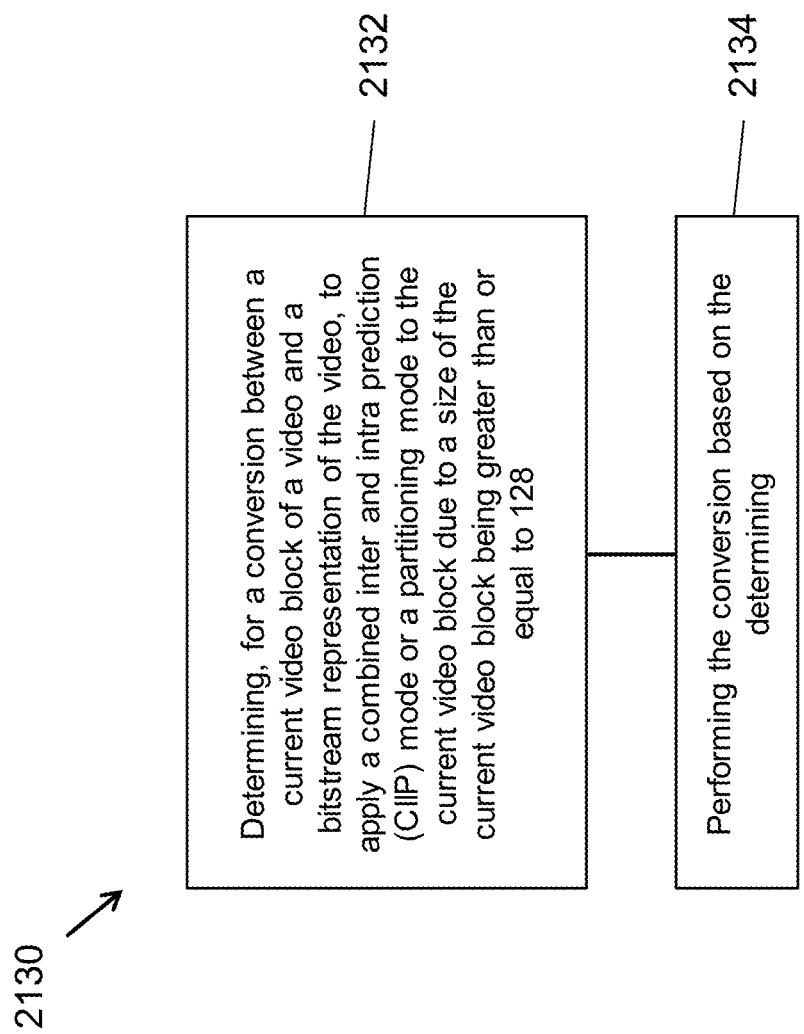

17. A method (e.g., method 2130 shown in FIG. 21C) of video processing, comprising: determining (2132), for a conversion between a current video block of a video and a bitstream representation of the video, to apply a combined inter and intra prediction (CIIP) mode or a partitioning mode to the current video block due to a size of the current video block being greater than or equal to 128; and performing (2134) the conversion based on the determining.

18. The method of clause 17, wherein the size refers to a width or a height of the current video block.

19. The method of clause 17, wherein the size refers to a total number of pixels in the current video block.

20. The method of clause 17, wherein the CIIP mode include combining an intra prediction signal and a inter prediction signal using weighted coefficients, and wherein the partitioning mode includes partitioning the current video block to two or more partitions, wherein at least one partition has an angular edge.

21. The method of clause 17, wherein the partitioning mode includes a triangular partitioning mode or a geometric partitioning mode.

22. The method of clause 21, wherein the geometric partitioning mode includes multiple partitioning schemes and at least one of the multiple partitioning schemes divides the current video block into two partitions such that at least one of the two partitions is non-square and non-rectangular.

23. The method of clause 21, wherein the geometric partitioning mode comprises a triangular partitioning mode.

24. The method of clause 17, wherein a maximum coding tree unit (CTU) size is set to greater than 128.

25. A method of video processing, comprising: performing a conversion between a current video block and a bitstream representation of the video, wherein the bitstream representation conforms to a format rule that specifies information included in the bitstream representation based on a size of the current video block.

26. The method of clause 25, wherein the format rule specifies that merge data is included in the bitstream representation due to the size of the current video block being greater than 128.

27. The method of clause 26, wherein a merge flag indicating the merge data is dependent on whether the size of the current video block is less than a maximum coding tree unit (CTU) size.

28. The method of clause 25, wherein the format rule specifies that at least one of cu_skip_flagorpred_mode_ibc_flagisincludedinthebitstreamrepresentation due to a dimension of the current video block being greater than 128.

29. A method of video processing, comprising: performing a conversion between a current video block and a bitstream representation of the video, wherein the bitstream representation conforms to a format rule that specifies that a syntax element indicating use of an intra block copy (IBC) prediction mode is omitted from the bitstream representation in case that a width and/or height of the current video block is equal to or greater than X, whereby X is an integer.

30. The method of clause 29, wherein the format rule specifies that a value of the syntax element is inferred to be 0.

31. The method of clause 29, wherein the format rule specifies that the IBC prediction mode is not used for the current video block.

32. The method of clause 29, wherein the syntax element corresponds to pred_mode_ibc_flag.

33. The method of clause 29, wherein X is 64 or 128.

34. The method of clause 29, wherein the format rule specifies that the value of the syntax element is inferred to be 0 in case that the width and the height of the current video block are greater than 64.

35. The method of clause 29, wherein the format rule specifies that the value of the syntax element is inferred to be 0 in case that the width or the height of the current video block is greater than 64.

Figure 21D:
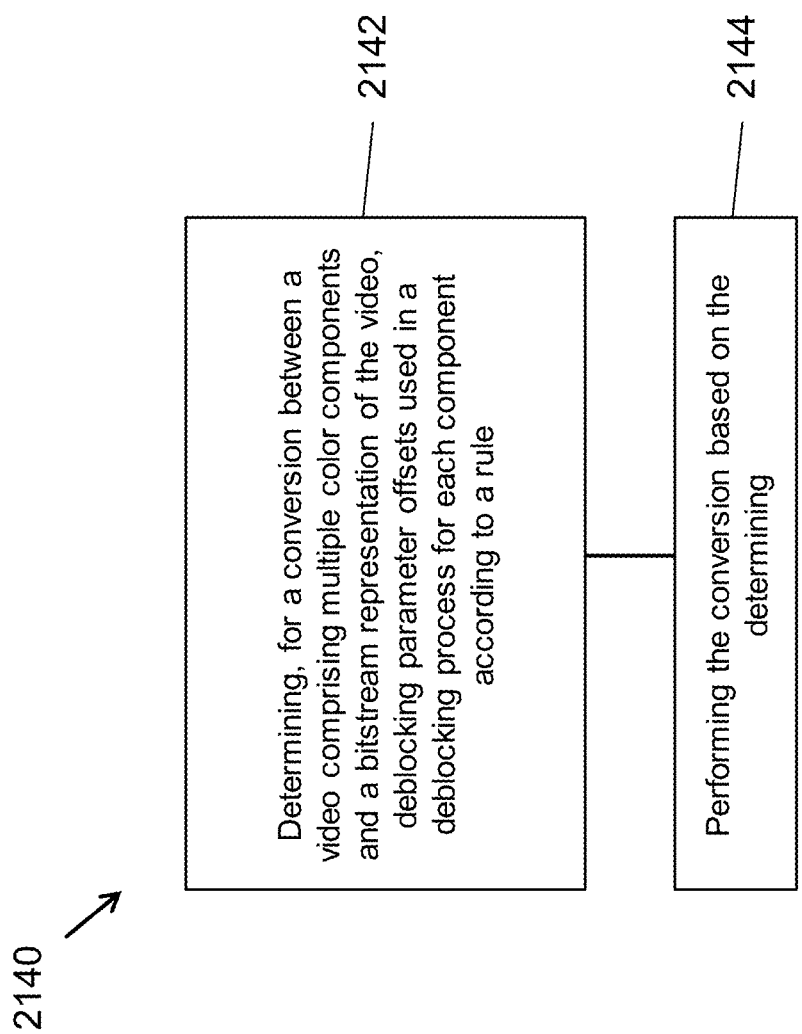

36. A method (e.g., method 2140 shown in FIG. 21D) of video processing, comprising: determining (2142), for a conversion between a video comprising multiple color components and a bitstream representation of the video, deblocking parameter offsets used in a deblocking process for each component according to a rule; and performing (2144) the conversion based on the determining, wherein the rule specifies that the deblocking parameter offsets at a picture level and/or a slice level are different for each component of the video.

37. The method of clause 36, wherein the rule further specifies that the deblocking parameter offsets at the picture level for a luma component, a Cb component, and a Cr component are different and indicated by different syntax elements.

38. The method of clause 36, wherein the rule further specifies that the deblocking parameter offsets at the picture level for a joint coding mode are different from those of non-joint-mode and indicated by different syntax elements, wherein the joint coding mode generating a prediction residual block of the current video block jointly for a Cb component and a Cr component.

39. The method of clause 36, wherein the rule further specifies that the deblocking parameter offsets at the slice level for a luma component, a Cb component, and a Cr component are different and indicated by different syntax elements.

40. The method of clause 36, wherein the rule further specifies that the deblocking parameter offsets at the picture level for a joint coding mode are different from those of non-joint-mode and indicated by different syntax elements, wherein the joint coding mode generating a prediction residual block of the current video block jointly for a Cb component and a Cr component.

Figure 21E:
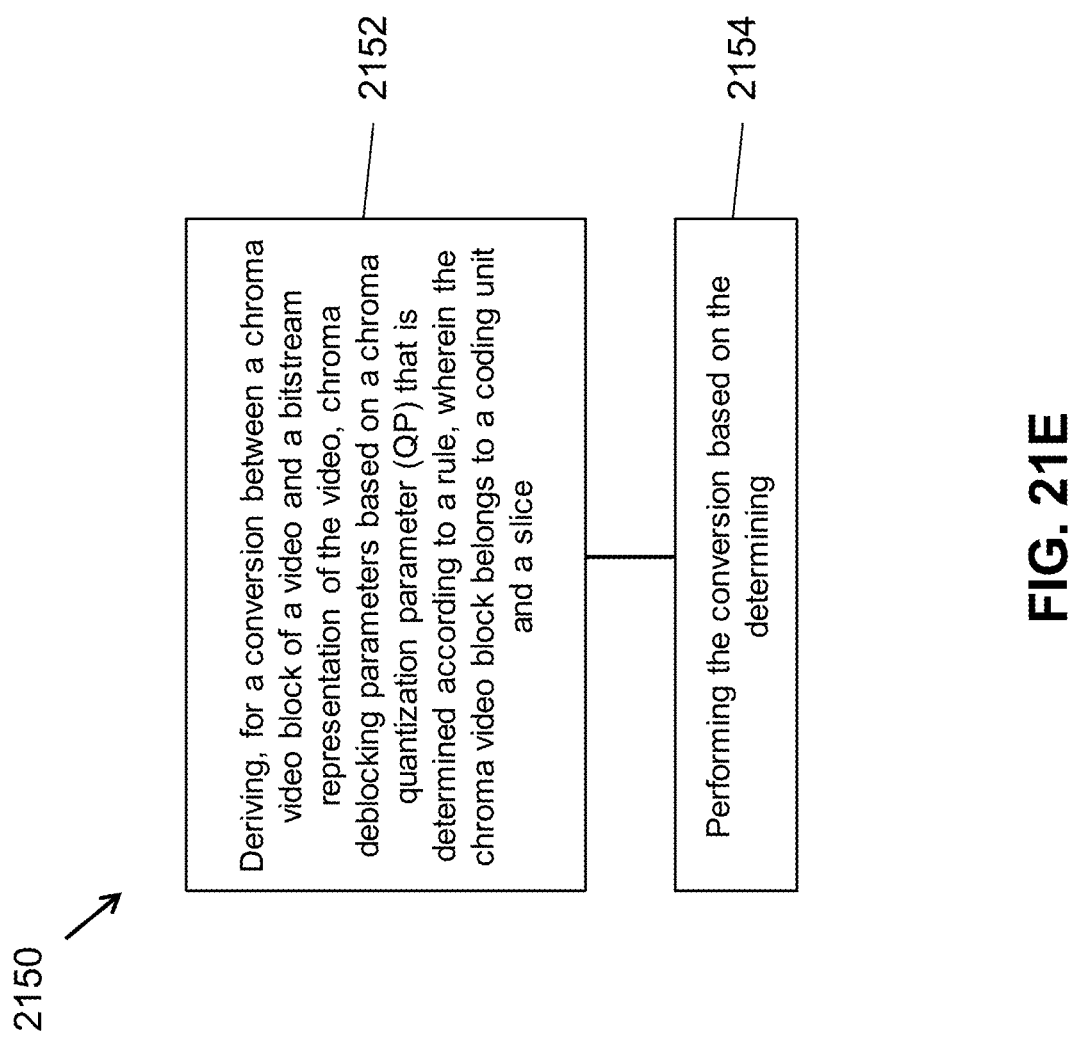

41. A method (e.g., method 2150 shown in FIG. 21E) of video processing, comprising: deriving (2152), for a conversion between a chroma video block of a video and a bitstream representation of the video, chroma deblocking parameters based on a chroma quantization parameter (QP) that is determined according to a rule, wherein the chroma video block belongs to a coding unit and a slice; and performing (2154) the conversion based on the chroma deblocking parameters, and wherein the rule specifies that the chroma QP is based on a picture level chroma QP offset of the chroma video block and a coding unit level chroma QP offset but independent of a slice level chroma QP offset.

42. The method of clause 41, wherein the rule further specifies that the chroma QP depends on pps_cb_qp_offset, pps_cr_qp_offset, pps_cbcr_qp_offset, CuQpOffset$_{Cb}$, CuQpOffsetc$_{Cr}$, and CuQpOffset$_{CbCr}$, but independent of slice_cb_qp_offset, slice_cr_qp_offset and slice_cbcr_qp_offset, wherein pps_cb_qp_offset, pps_cr_qp_offset, pps_cbcr_qp_offset specify offsets on the picture level used in a derivation of Qp'$_{Cb}$, Qp'$_{Cr}$, and QP'$_{CbCr}$, respectively, and CuQpOffset$_{Cb}$, CuQpOffsetc$_{Cr}$, and CuQpOffset$_{CbCr}$, specify values to be used when determining respective values of the Qp'$_{Cb}$, Qp'$_{Cr}$, and QP'$_{CbCr}$ quantization parameters for the chroma video block, respectively.

43. The method of any of clauses 1 to 42, wherein the performing of the conversion includes generating the coded representation from the current video block.

44. The method of any of clauses 1 to 42, wherein the performing of the conversion includes generating the current video block from the coded representation.

45. A video processing apparatus comprising a processor configured to implement a method recited in any one or more of clauses 1 to 44.

46. A computer readable medium storing program code that, when executed, causes a processor to implement a method recited in any one or more of clauses 1 to 44.

47. A computer readable medium that stores a coded representation or a bitstream representation generated according to any of the above described methods.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
   determining, during a conversion between a first block of a video and a bitstream of the video, that the first block is coded with a geometric partitioning mode;
   determining, for the first block, a first motion information and a second motion information;
   performing the conversion based on the first motion information and the second motion information, wherein the conversion comprises applying a weighting process to generate a final prediction for the first block based on a weighted sum of prediction samples derived from the first motion information and the second motion information; and
   calculating motion vector stored information for each 4×4 subblock of the first block,
   wherein in case a first 4×4 subblock is within a non-weighted area, uni-prediction motion information is stored as the motion vector stored information for samples of the first 4×4 subblock;
   wherein in case a second 4×4 subblock is within a weighted area, bi-prediction motion information is allowed to store as the motion vector stored information for samples of the second 4×4 subblock,
   wherein the first block is split into two transform blocks, one transform block has non-zero coefficients, the other transform block does not have non-zero coefficients, and a first size of the transform block having non-zero coefficients is smaller than or equal to a second size of the transform block not having non-zero coefficients, and
   wherein a deblocking filter process is applied to a boundary between the two transform blocks, and during the deblocking filter process, picture level parameter offsets used to derive deblocking parameters β and tC for Cb and Cr components are indicated by a single syntax element included in the bitstream when a joint chroma residual coding is used for Cb and Cr components.

2. The method of claim 1, wherein only when the first block has a specific combination of a block width and a block height, the first block is coded with a geometric partitioning mode and motion vector stored information for the first block is stored.

3. The method of claim 2, wherein during calculating the motion vector stored information, whether the uni-prediction motion information or the bi-prediction motion information is stored is based on the block width and the block height of the first block.

4. The method of claim 1, wherein during the deblocking filter process, the picture level parameter offsets used to derive deblocking parameters β and $t_C$ for different components are indicated by different syntax elements included in the bitstream when the joint chroma residual coding is not used for the Cb and Cr component.

5. The method of claim 1, wherein during the deblocking filter process, slice level parameter offsets used to derive deblocking parameters β and $t_C$ for different components are indicated by different syntax elements included in the bitstream when the joint chroma residual coding is not used for the Cb and Cr component.

6. The method of claim 1, wherein during the deblocking filter process, slice level parameter offsets used to derive deblocking parameters β and $t_C$ for Cb and Cr components are indicated by a single syntax element included in the bitstream when the joint chroma residual coding is used for Cb and Cr components.

7. The method of claim 1, wherein the geometric partitioning mode includes multiple partition schemes, and one of the multiple partition schemes is a diagonal partitioning or an anti-diagonal partitioning.

8. The method of claim 1, further comprising:
   determining, during a conversion between a second block of the video and the bitstream, whether the second block is coded with an intra block copy prediction mode;
   performing the conversion between the second block and the bitstream,
   wherein a value of a syntax element indicating whether the second block is coded with the intra block copy prediction mode is inferred to be 0, when a width or a height of the second block is greater than 64.

9. The method of claim 1, wherein the conversion includes encoding the first block into the bitstream.

10. The method of claim 1, wherein the conversion includes decoding the first block from the bitstream.

11. An apparatus for processing video data comprising a processor and a non-transitory memory with instructions thereon, wherein the instructions upon execution by the processor, cause the processor to:
   determine, during a conversion between a first block of a video and a bitstream of the video, that the first block is coded with a geometric partitioning mode;
   determine for the first block, a first motion information and a second motion information;
   perform the conversion based on the first motion information and the second motion information, wherein the conversion comprises applying a weighting process to generate a final prediction for the first block based on a weighted sum of prediction samples derived from the first motion information and the second motion information; and
   calculate motion vector stored information for each 4×4 subblock of the first block,
   wherein in case a first 4×4 subblock is within a non-weighted area, uni-prediction motion information is stored as the motion vector stored information for samples of the first 4×4 subblock;
   wherein in case a second 4×4 subblock is within a weighted area, bi-prediction motion information is allowed to store as the motion vector stored information for samples of the second 4×4 subblock,
   wherein the first block is split into two transform blocks, one transform block has non-zero coefficients, the other transform block does not have non-zero coefficients, and a first size of the transform block having non-zero coefficients is smaller than or equal to a second size of the transform block not having non-zero coefficients, and wherein a deblocking filter process is applied to a boundary between the two transform blocks, and during the deblocking filter process, picture level parameter offsets used to derive deblocking parameters $\beta$ and $t_C$ for Cb and Cr components are indicated by a single syntax element included in the bitstream when a joint chroma residual coding is used for Cb and Cr components.

12. The apparatus of claim 11, wherein during the deblocking filter process, the picture level parameter offsets used to derive deblocking parameters $\beta$ and $t_C$ for different components are indicated by different syntax elements included in the bitstream when the joint chroma residual coding is not used to the Cb and Cr component,
wherein during the deblocking filter process, slice level parameter offsets used to derive deblocking parameters $\beta$ and $t_C$ for different components are indicated by different syntax elements included in the bitstream when the joint chroma residual coding is not used to the Cb and Cr component, or during the deblocking filter process, the slice level parameter offsets used to derive deblocking parameters $\beta$ and $t_C$ for Cb and Cr components are indicated by a single syntax element included in the bitstream when the joint chroma residual coding is used for Cb and Cr components.

13. A non-transitory computer-readable storage medium storing instructions that cause a processor to:
determine, during a conversion between a first block of a video and a bitstream of the video, that the first block is coded with a geometric partitioning mode;
determine for the first block, a first motion information and a second motion information;
perform the conversion based on the first motion information and the second motion information, wherein the conversion comprises applying a weighting process to generate a final prediction for the first block based on a weighted sum of prediction samples derived from the first motion information and the second motion information; and
calculate motion vector stored information for each 4×4 subblock of the first block,
wherein in case a first 4×4 subblock is within a non-weighted area, uni-prediction motion information is stored as the motion vector stored information for samples of the first 4×4 subblock;
wherein in case a second 4×4 subblock is within a weighted area, bi-prediction motion information is allowed to store as the motion vector stored information for samples of the second 4×4 subblock,
wherein the first block is split into two transform blocks, one transform block has non-zero coefficients, the other transform block does not have non-zero coefficients, and a first size of the transform block having non-zero coefficients is smaller than or equal to a second size of the transform block not having non-zero coefficients, and
wherein a deblocking filter process is applied to a boundary between the two transform blocks, and during the deblocking filter process, picture level parameter offsets used to derive deblocking parameters $\beta$ and $t_C$ for Cb and Cr components are indicated by a single syntax element included in the bitstream when a joint chroma residual coding is used for Cb and Cr components.

14. The non-transitory computer-readable storage medium of claim 13, during the deblocking filter process, the picture level parameter offsets used to derive deblocking parameters $\beta$ and $t_C$ for different components are indicated by different syntax elements included in the bitstream when the joint chroma residual coding is not used for the Cb and Cr component,
wherein during the deblocking filter process, slice level parameter offsets used to derive deblocking parameters $\beta$ and $t_C$ for different components are indicated by different syntax elements included in the bitstream when the joint chroma residual coding is not used for the Cb and Cr component, or during the deblocking filter process, the slice level parameter offsets used to derive deblocking parameters $\beta$ and $t_C$ for Cb and Cr components are indicated by a single syntax element included in the bitstream when the joint chroma residual coding is used for Cb and Cr components.

15. A non-transitory computer-readable recording medium storing a bitstream of a video which is generated by a method performed by a video processing apparatus, wherein the method comprises:
determining that a first block of the video is coded with a geometric partitioning mode;
determining, for the first block, a first motion information and a second motion information;
generating the bitstream of the video based on the first motion information and the second motion information, wherein the generating comprises applying a weighting process to generate a final prediction for the first block based on a weighted sum of prediction samples derived from the first motion information and the second motion information; and
calculating motion vector stored information for each 4×4 subblock of the first block,
wherein in case a first 4×4 subblock is within a non-weighted area, uni-prediction motion information is stored as the motion vector stored information for samples of the first 4×4 subblock;
wherein in case a second 4×4 subblock is within a weighted area, bi-prediction motion information is allowed to store as the motion vector stored information for samples of the second 4×4 subblock,
wherein the first block is split into two transform blocks, one transform block has non-zero coefficients, the other transform block does not have non-zero coefficients, and a first size of the transform block having non-zero coefficients is smaller than or equal to a second size of the transform block not having non-zero coefficients, and
wherein a deblocking filter process is applied to a boundary between the two transform blocks, and during the deblocking filter process, picture level parameter offsets used to derive deblocking parameters $\beta$ and $t_C$ for Cb and Cr components are indicated by a single syntax element included in the bitstream when a joint chroma residual coding is used for Cb and Cr components.

16. The non-transitory computer-readable recording medium of claim 15, wherein during the deblocking filter process, picture level parameter offsets used to derive deblocking parameters $\beta$ and $t_C$ for different components are indicated by different syntax elements included in the bitstream when the joint chroma residual coding is not used for the Cb and Cr component,
wherein during the deblocking filter process, slice level parameter offsets used to derive deblocking parameters $\beta$ and $t_C$ for different components are indicated by different syntax elements included in the bitstream when the joint chroma residual coding is not used for the Cb and Cr component, or during the deblocking filter process, the slice level parameter offsets used to derive deblocking parameters β and $t_C$ for Cb and Cr components are indicated by a single syntax element included in the bitstream when the joint chroma residual coding is used for Cb and Cr components.

17. The method of claim 1, wherein the geometric partitioning mode includes multiple partition schemes, and one of the multiple partition schemes is neither a diagonal partitioning nor an anti-diagonal partitioning.

* * * * *